United States Patent
Stam et al.

(10) Patent No.: US 6,611,610 B1
(45) Date of Patent: Aug. 26, 2003

(54) VEHICLE LAMP CONTROL

(75) Inventors: Joseph S. Stam, Holland, MI (US); Jon H. Bechtel, Holland, MI (US); Spencer D. Reese, Fort Wayne, IN (US); John K. Roberts, East Grand Rapids, MI (US); William L. Tonar, Holland, MI (US); G. Bruce Poe, Hamilton, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/528,389

(22) Filed: Mar. 20, 2000

Related U.S. Application Data

(63) Continuation-in-part of application No. 09/151,487, filed on Sep. 11, 1998, now Pat. No. 6,255,639, which is a continuation of application No. 08/831,232, filed on Apr. 2, 1997, now Pat. No. 5,837,994.

(51) Int. Cl.[7] .................................................. G06K 9/00
(52) U.S. Cl. ........................ 382/104; 340/930; 340/933
(58) Field of Search ...................... 382/104; 250/208.1, 250/208, 214, 226, 573, 574; 340/930, 933

(56) References Cited

U.S. PATENT DOCUMENTS

| | | |
|---|---|---|
| 2,632,040 A | 3/1953 | Rabinow |
| 2,827,594 A | 3/1958 | Rabinow |
| 4,139,801 A | 2/1979 | Linares |
| 4,236,099 A | 11/1980 | Rosenblum |
| 4,357,558 A | 11/1982 | Massoni et al. |
| 4,376,909 A | 3/1983 | Tagami et al. |
| 4,599,544 A | 7/1986 | Martin |
| 4,665,321 A | 5/1987 | Chang et al. |
| 4,692,798 A | 9/1987 | Seko et al. |
| 4,727,290 A | 2/1988 | Smith et al. |
| 4,768,135 A | 8/1988 | Kretschmer et al. |
| 4,862,037 A | 8/1989 | Farber et al. |

(List continued on next page.)

FOREIGN PATENT DOCUMENTS

| | | |
|---|---|---|
| DE | 2946561 | 5/1981 |
| FR | 2641237 | 7/1990 |
| FR | 2726144 | 4/1996 |
| JP | 8-166221 | 6/1996 |
| WO | 8605147 | 9/1986 |
| WO | 9735743 | 10/1997 |
| WO | 9843850 | 10/1998 |
| WO | 9947396 | 9/1999 |
| WO | 0022881 | 4/2000 |

OTHER PUBLICATIONS

Christopher M. Kormanyos, SAE Paper No. 980003, pp. 13–18.
Franz–Josef Kalze, SAE Paper No. 980005, pp. 23–26.
J.P. Löwenau et al., SAE Paper No. 980007, pp. 33–38.
Tohru Shimizu et al., SAE Paper No. 980322, pp. 113–117.

*Primary Examiner*—Jayanti K. Patel
*Assistant Examiner*—Abolfazl Tabatabai
(74) *Attorney, Agent, or Firm*—Price, Heneveld, Cooper, DeWitt & Litton; Randall S. Vaas

(57) ABSTRACT

A system and method of automatically controlling vehicle headlamps includes an image sensor and a controller to generate headlamp control signals.

84 Claims, 27 Drawing Sheets

U.S. PATENT DOCUMENTS

| | | | |
|---|---|---|---|
| 4,891,559 A | 1/1990 | Matsumoto et al. | |
| 4,930,742 A | 6/1990 | Schofield et al. | |
| 4,967,319 A | 10/1990 | Seko | |
| 5,008,946 A * | 4/1991 | Ando | 382/104 |
| 5,036,437 A | 7/1991 | Macks | |
| 5,072,154 A | 12/1991 | Chen | |
| 5,086,253 A | 2/1992 | Lawler | |
| 5,124,549 A | 6/1992 | Michaels et al. | |
| 5,182,502 A | 1/1993 | Slotkowski et al. | |
| 5,187,383 A | 2/1993 | Taccetta et al. | |
| 5,235,178 A | 8/1993 | Hegyi | |
| 5,329,206 A | 7/1994 | Slotkowski et al. | |
| 5,379,104 A * | 1/1995 | Takao | 356/121 |
| 5,416,318 A | 5/1995 | Hegyi | |
| 5,426,294 A | 6/1995 | Kobayashi et al. | |
| 5,434,407 A | 7/1995 | Bauer et al. | |
| 5,451,822 A | 9/1995 | Bechtel et al. | |
| 5,471,515 A | 11/1995 | Fossum et al. | |
| 5,508,592 A | 4/1996 | Lapatovich et al. | |
| 5,537,003 A | 7/1996 | Bechtel et al. | |
| 5,550,677 A | 8/1996 | Schofield et al. | |
| 5,614,788 A | 3/1997 | Mullins et al. | |
| 5,660,454 A | 8/1997 | Mori et al. | |
| 5,666,028 A | 9/1997 | Bechtel et al. | |
| 5,715,093 A | 2/1998 | Schierbeek et al. | |
| 5,796,094 A * | 8/1998 | Schofield et al. | 250/208.1 |
| 5,811,888 A | 9/1998 | Hsieh | |
| 5,812,321 A | 9/1998 | Schierbeek et al. | |
| 5,837,994 A * | 11/1998 | Stam et al. | 250/208 |
| 5,841,126 A | 11/1998 | Fossum et al. | |
| 5,877,897 A * | 3/1999 | Schofield et al. | 359/604 |
| 5,912,534 A | 6/1999 | Benedict | |
| 5,923,027 A | 7/1999 | Stam et al. | |
| 5,942,853 A | 8/1999 | Piscart | |
| 5,990,469 A | 11/1999 | Bechtel et al. | |
| 6,008,486 A | 12/1999 | Stam et al. | |
| 6,049,171 A | 4/2000 | Stam et al. | |
| 6,097,023 A | 8/2000 | Schofield et al. | |
| 6,130,421 A | 10/2000 | Bechtel et al. | |
| 6,144,158 A | 11/2000 | Beam | |
| 6,396,397 B1 | 5/2002 | Bos et al. | 340/461 |
| 2002/0040962 A1 | 4/2002 | Schofield et al. | 250/208.1 |

* cited by examiner

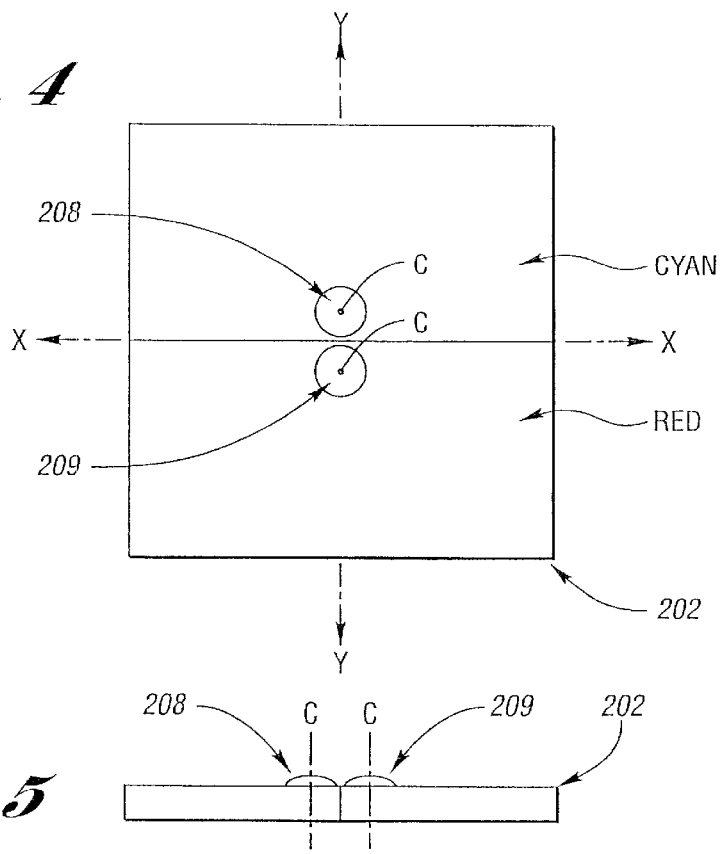
Fig. 4
Fig. 5
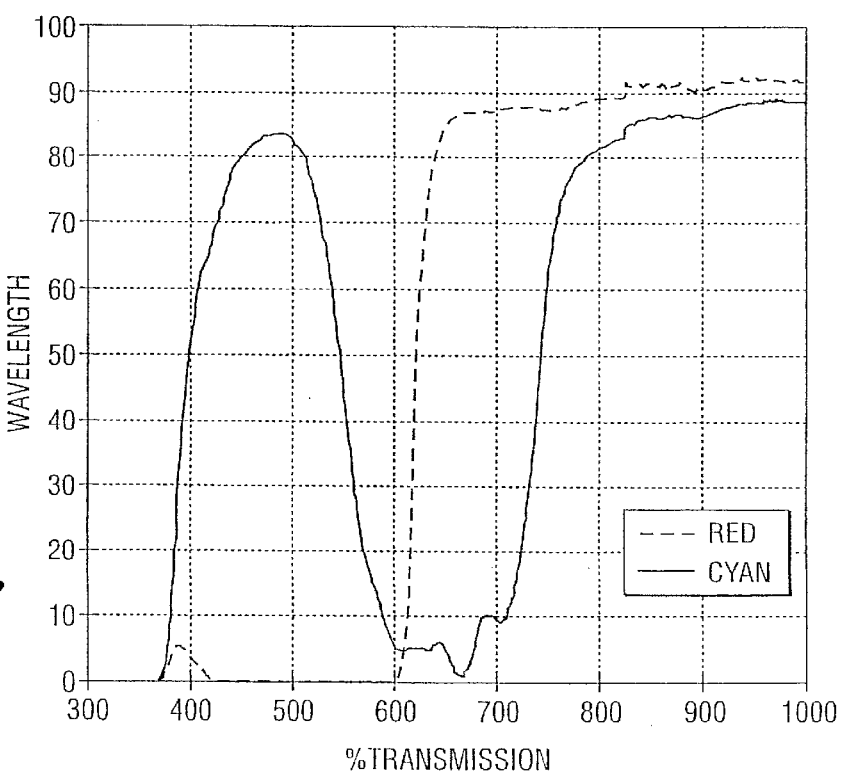
Fig. 6

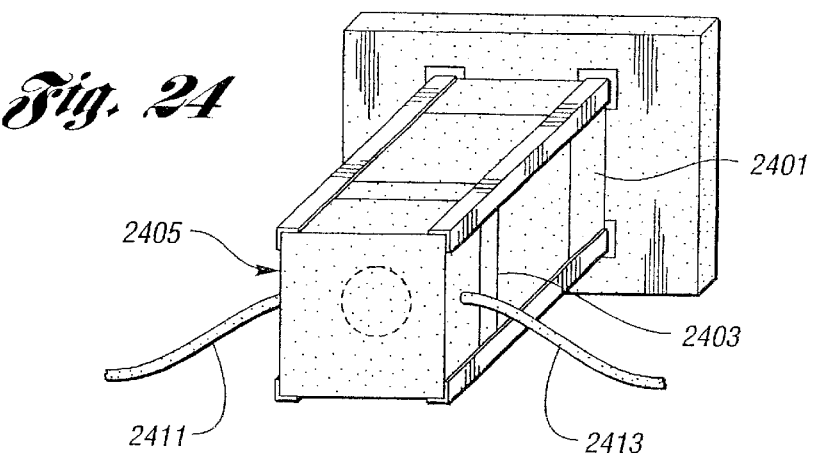
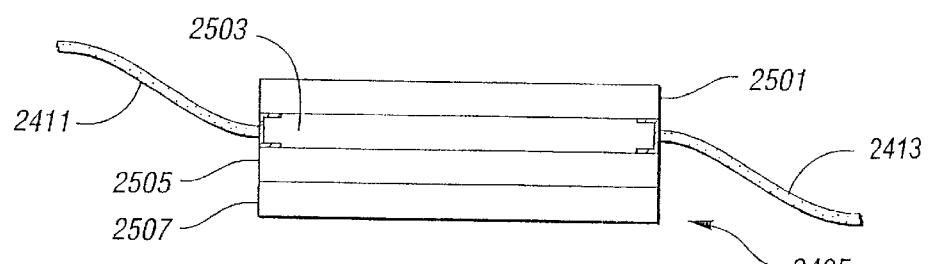
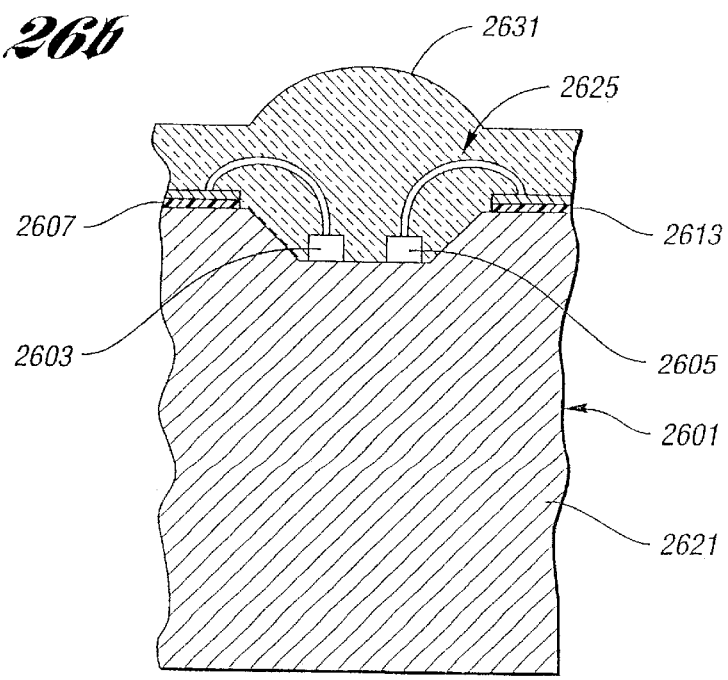

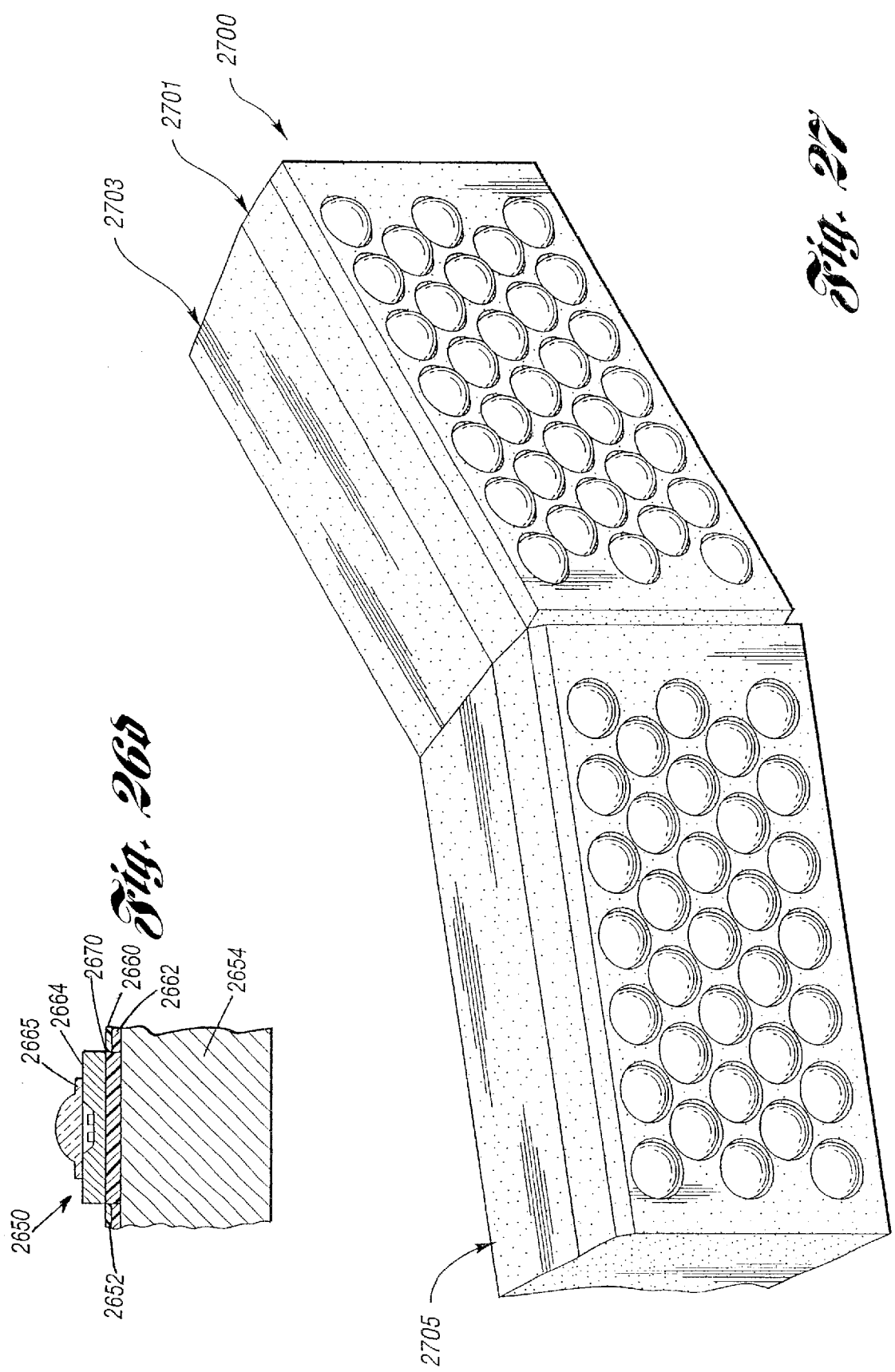

VEHICLE LAMP CONTROL

CROSS-REFERENCE TO RELATED APPLICATIONS

This application is a continuation-in-part of U.S. patent application Ser. No. 09/151,487 entitled "CONTROL SYSTEM TO AUTOMATICALLY DIM VEHICLE HEAD LAMPS," filed on Sep. 11, 1998, by Joseph S. Stam et al., now U.S. Pat. No. 6,255,639, which is a continuation of Ser. No. 08/831,232 U.S. Pat. No. 5,837,994, entitled "CONTROL SYSTEM TO AUTOMATICALLY DIM VEHICLE HEAD LAMPS," filed on Apr. 2, 1997, by Joseph S. Stam et al. Priority under 35 U.S.C. §120 is hereby claimed on both the above-identified patent applications.

FIELD OF THE INVENTION

The present invention pertains to headlamp dimmers and components that can be used with a headlamp dimmer.

BACKGROUND OF THE INVENTION

Modem automotive vehicles include a variety of different lamps to provide illumination under different operating conditions. Headlamps are typically controlled to alternately generate low beams and high beams. Low beams provide less illumination, and are used at night to illuminate the forward path when other vehicles are present. High beams output significantly more light, and are used to illuminate the vehicle's forward path when other vehicles are not present. Daytime running lights have also begun to experience widespread acceptance.

Laws in various countries regulate vehicle illumination, and vehicle manufacturers must build cars that comply with these regulations. For example, regulations set forth by the United States Department of Transportation (DOT) regulate the light emissions of a vehicle's high beam headlamps. Various state regulations are used to control the amount of glare experienced by drivers due to preceding vehicles (other vehicles traveling in the same direction) and oncoming vehicles (vehicles traveling in the opposite direction).

Known vehicle high beam head lamp emissions in accordance with the DOT regulations limit the intensity to 40,000 cd at 0, 10,000 cd at 3, 3250 cd at 6, 1500 cd at 9, and 750 cd at 12. An example of an emission pattern meeting this regulation is illustrated in FIG. 1 of U.S. Pat. No. 5,837,994, entitled CONTROL SYSTEM TO AUTOMATICALLY DIM VEHICLE HEAD LAMPS, issued to Joseph Scott Stam et al. on Nov. 17, 1998, the disclosure of which is incorporated herein by reference. In order to avoid an illuminance of 0.1 foot candles (fc) incident on another vehicle at these angles, the vehicle high beam head lamps should be dimmed within 700 feet of another vehicle if the vehicles are at an angle of 0, within 350 feet of another vehicle if the vehicles are at a horizontal position of 3, and 200 feet of the other vehicle if the position of the other vehicle is at an angle of 6 to the longitudinal axis of the controlled vehicle. It can thus be seen that a preceding vehicle directly in front of the controlled vehicle (i.e., at an angle of 0) will need to be identified well prior to the controlled vehicle catching up to the preceding vehicle, although the distance by which the controlled vehicles headlamps must be dimmed for a preceding vehicle can be somewhat less than for an oncoming vehicle because glare from behind is usually less disruptive than oncoming glare.

In order to automatically control the vehicle headlamps, various headlamp dimmer control systems have been proposed. In order to prevent drivers of other vehicles from being subjected to excessive glare levels, an automatic headlamp dimmer system must sense both the head lights of oncoming vehicles as well as the tail lights of a preceding vehicles. Some systems that effectively detect headlights are unable to adequately detect taillights. Most prior systems are unable to distinguish nuisance light sources, such as reflectors, street signs, streetlights, house lights, or the like, from light sources that require headlight control. Accordingly, these systems are subject to undesirable dimming of the high beams when no other traffic is present and turning on the high beams when other vehicles are present. In addition to the undesirable performance, it is difficult for prior systems to comply with the legal requirements as described above for high beam control while avoiding unnecessary dimming of the vehicle headlamps.

Fog lights are examples of other vehicle lights that are difficult to control automatically. Vehicles are known to include forward and rearward directed fog lights. In Europe, it is known to provide a very bright red or white light on the back of vehicle which is illuminated under foggy conditions. The fog lights must be turned ON as soon as the fog reduces visibility by a predetermined amount and must turn OFF when the fog drops below that density. A reliable method of automatically controlling such fog lights has not been available.

Accordingly, there is a need for a more reliable and intelligent automatic lamp control for a vehicle.

BRIEF DESCRIPTION OF THE DRAWINGS

The subject matter that is regarded as the invention is particularly pointed out and distinctly claimed in the claim portion that concludes the specification. The invention, together with further objects and advantages thereof, may best be understood by reference to the following description taken in conjunction with the accompanying drawings, where like numerals represent like components, and in which:

FIG. 4 is a top plan view illustrating a lens structure used in the optical sensor system according to FIGS. 2a and 2b.

FIG. 5 is a side elevation view illustrating the lens structure according to FIG. 4.

FIG. 6 is a graph illustrating wave transmissivity as a function of light wavelength for the lens.

FIG. 8 is a cross section illustrating another image sensor assembly taken along the same plane as the assembly in FIG. 2a.

FIG. 9 is a cross section illustrating yet another light sensor assembly taken along the same plane as the assembly in FIG. 2a.

FIG. 24 is a front perspective view illustrating an image sensor assembly including an electronically alterable filter.

FIG. 25 is a side elevation view of the liquid crystal filter in the image sensor assembly according to FIG. 24.

FIG. 26b is a fragmentary cross section taken along plane 26b—26b in FIG. 26a.

FIG. 26d is a fragmentary cross section taken along plane 26d—26d in FIG. 26c.

FIG. 27 is a top, front perspective view of an LED headlamp for projecting light in more than one horizontal direction.

DETAILED DESCRIPTION OF THE INVENTION

Figure 1:
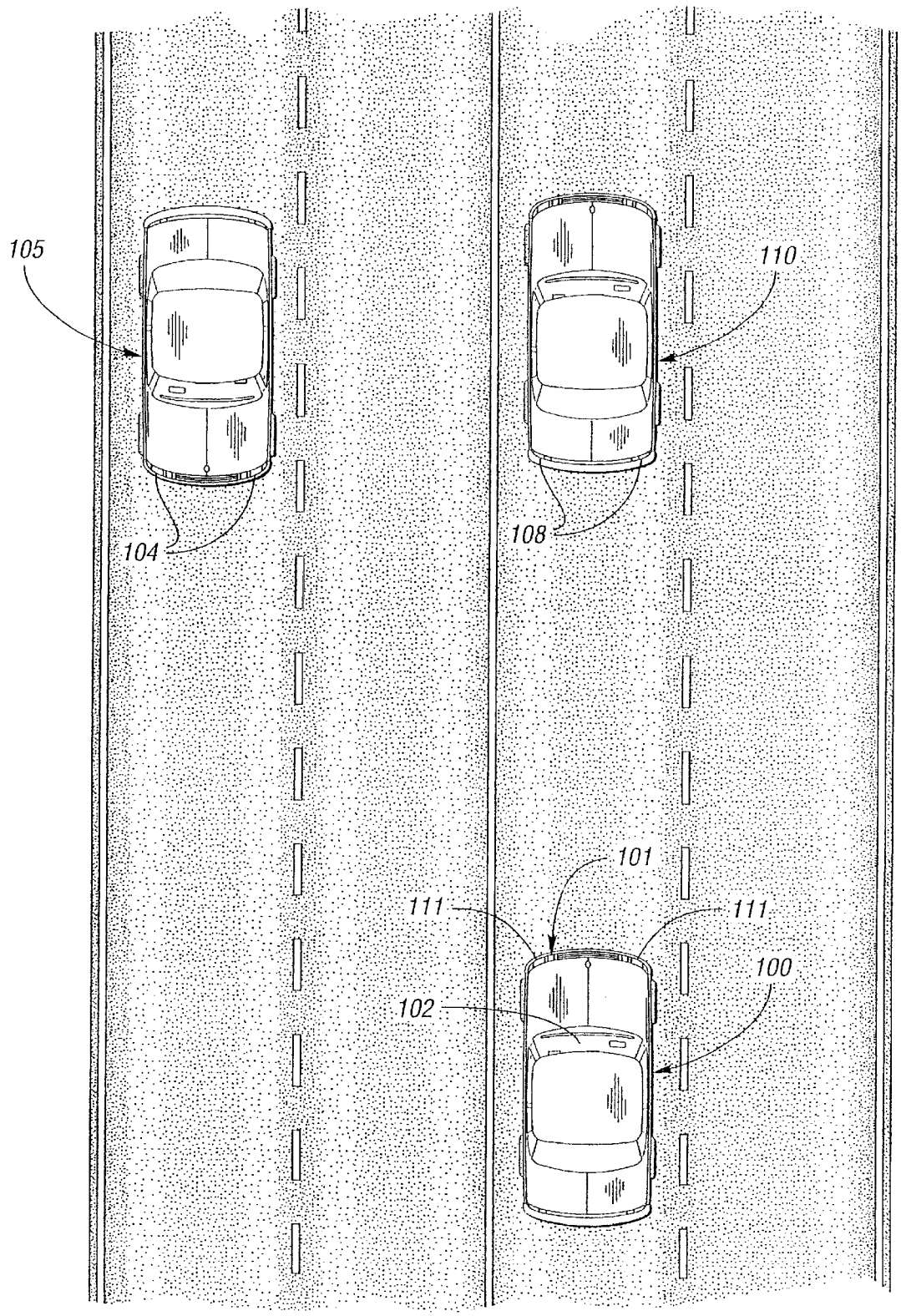
FIG. 1 illustrates vehicles traveling on a common road.

A controlled vehicle 100 (FIG. 1) having an automatic headlamp dimmer includes an optical sensor system 102 for detecting the headlamps 104 of an oncoming vehicle 105 and the taillights 108 of a preceding vehicle 110. The headlights 111 of the controlled vehicle 100 are controlled automatically to avoid shinning the high beams, or bright lights, directly into the eyes of a driver of oncoming vehicle 105 or by reflection into the eyes of the driver of the preceding vehicle 110. The optical sensor assembly 102 is illustrated mounted in the windshield area of the vehicle, but those skilled in the art will recognize that the sensor could be mounted at other locations that provide the sensor with a view of the scene in front of the vehicle. One particularly advantageous mounting location is high on the vehicle windshield to provide a clear view, which view can be achieved by mounting the optical sensor assembly 102 in a rearview mirror mount, a vehicle headliner, a visor, or in an overhead console. Other views that may be advantageously employed include mounting the optical sensor assembly 102 on the A-pilar, the dashboard, or at any other location providing a forward viewing area. However, the most advantageous mounting locations are those that position the image sensor to view a forward scene through an area kept clean by the vehicle's windshield wipers.

Figure 2A:
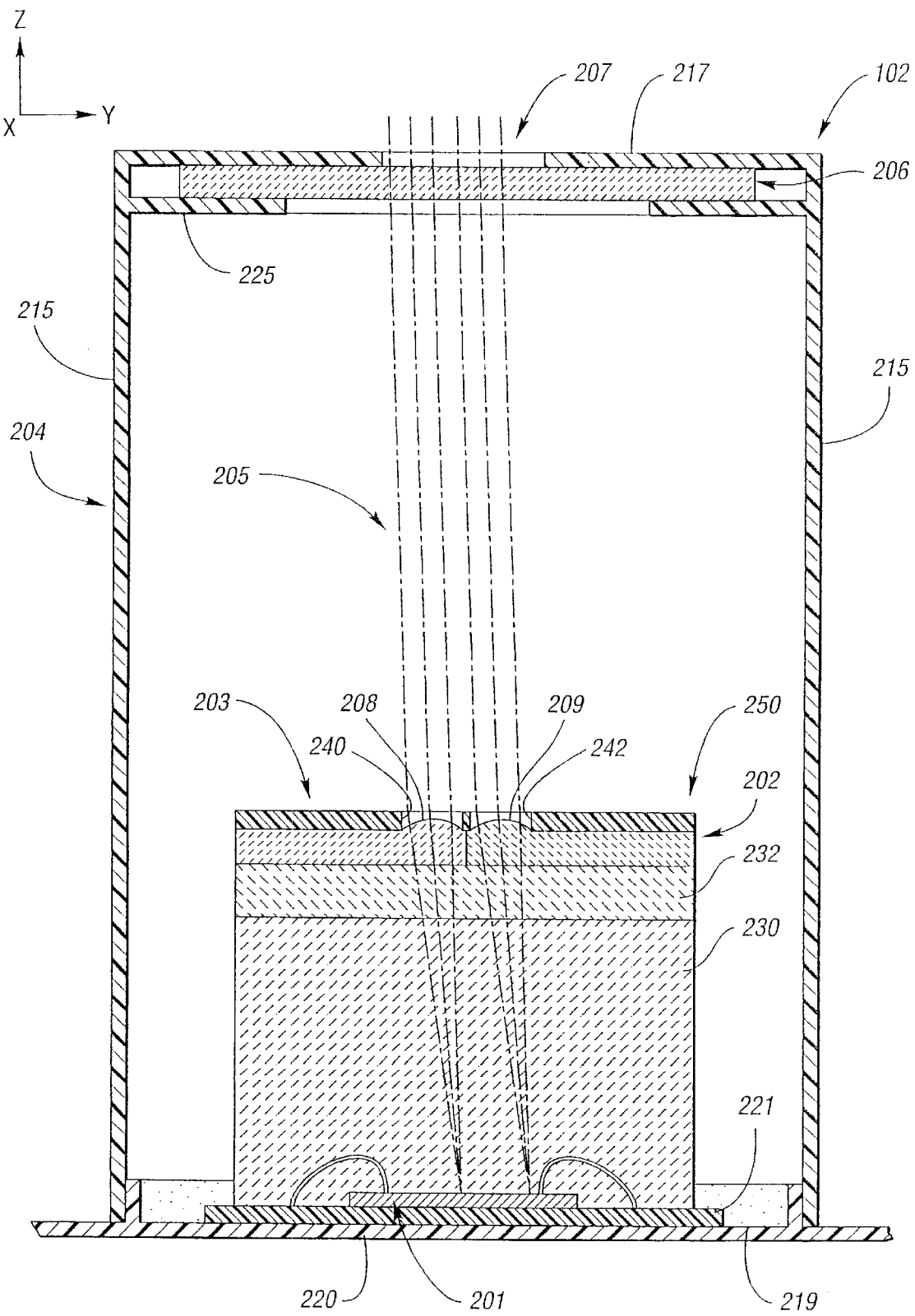
FIGS. 2a and 2b illustrate an optical sensor system, FIG. 2b showing a perspective view and FIG. 2a showing a cross section of the optical sensor system taken along plane 2a—2a in FIG. 2b.
Figure 2B:
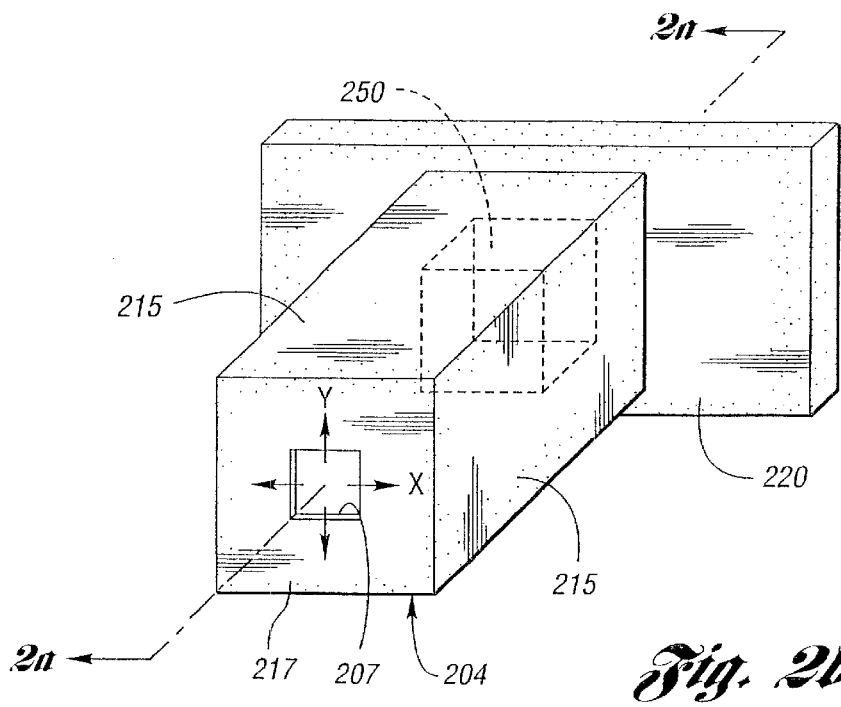

With reference to FIGS. 2a and 2b, the optical sensor assembly 102 includes an electronic image sensor 201 and an optical system to direct light onto the image sensor 201. The image sensor 201 generally comprises an array of light sensitive components and associated circuitry to output electronic pixel light level signals responsive to light impacting on the surface of the image sensor 201. The optical system generally contains four components: lens structure 202; aperture stop member 203; far field baffle 204; and optional infrared filter 206. The optical system controls the scene viewed by the image sensor 201. In particular, the optical system focuses light rays 205 passing through opening 207 of the far field baffle onto the array 201 contained within the image sensor assembly 201.

The Image Sensor

Figure 3:
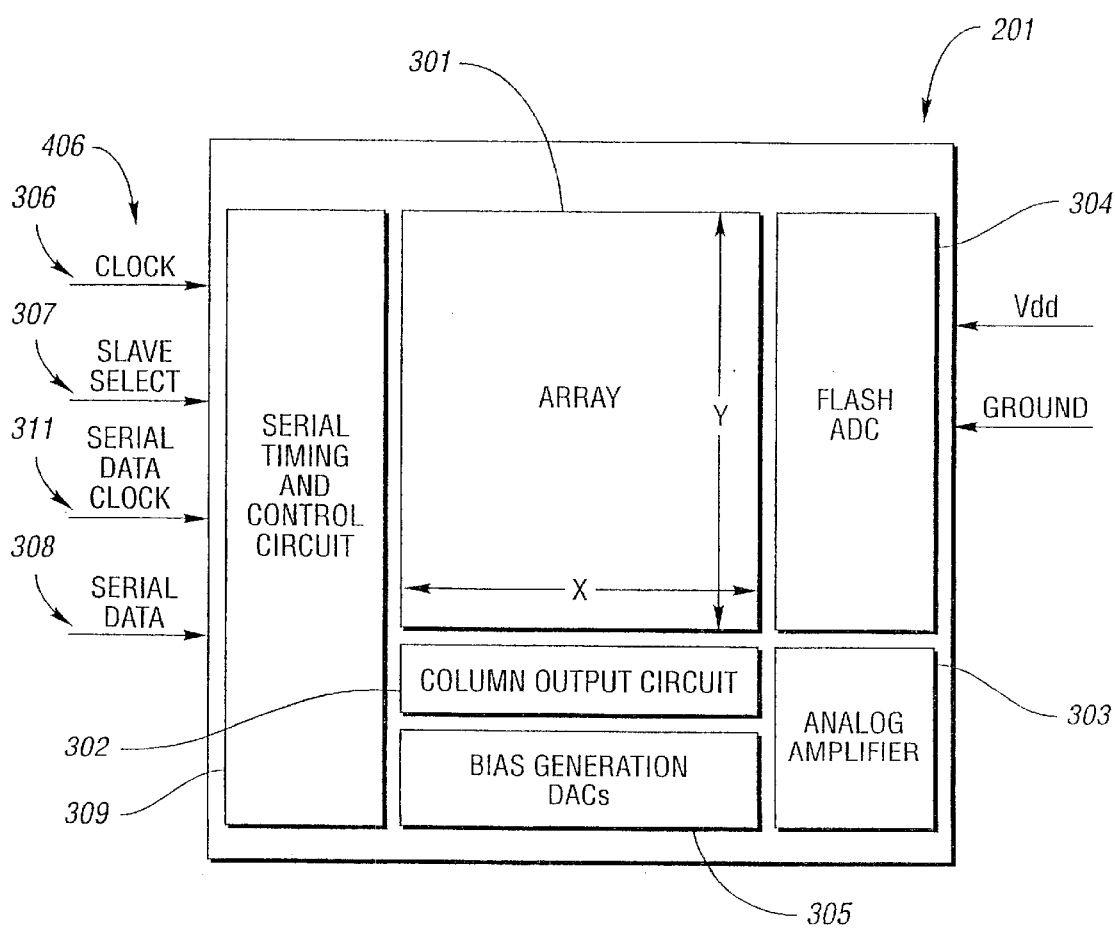
FIG. 3 is a plan view illustrating an image sensor used in the optical sensor system according to FIGS. 2a and 2b.

The configuration of the image sensor 201 is illustrated in FIG. 3. The image sensor includes an image array 301 (FIG. 3) that can be made from any one of a variety of sensors, such as CMOS image sensors, charge coupled device (CCD) image sensors, or any other suitable image sensor. In one embodiment, the image sensor is a CMOS photo gate active pixel image sensor. A CMOS photo gate active pixel image sensor is described in U.S. Pat. No. 5,471,515, entitled ACTIVE PIXEL SENSOR WITH INTER-PIXEL CHARGE TRANSFER, issued to Eric R. Fossum et al., on Nov. 28, 1995, the disclosure of which is incorporated herein by reference thereto. Sensor systems including arrays are disclosed in U.S. patent application Ser. No. 09/448,364, entitled CONTROL CIRCUIT FOR IMAGE SENSORS, filed Nov. 23, 1999, by Jon Bechtel et al.; U.S. patent application Ser. No. 08/933,210, entitled CONTROL CIRCUIT FOR IMAGE SENSORS, filed on Sep. 16, 1997, by Jon Bechtel et al., now U.S. Pat. No. 5,990,469; and U.S. patent application Ser. No. 08/831,232, filed Apr. 2, 1997, entitled CONTROL SYSTEM TO AUTOMATICALLY DIM VEHICLE HEADLAMPS, by Joseph Stam et al., now U.S. Pat. No. 5,837,994, the disclosures of all of the these applications and patents incorporated herein by reference thereto.

The array 301 may for example comprise photogate active pixels, such as 10 to 50 $\mu$m pixels. It is advantageous for the array to be a low resolution array, which is an array that has a resolution of less than 7000 pixels per square millimeter and more preferably less than 2500 pixels per square millimeter. The array may have 25 $\mu$m or larger photo gate active pixels. In particular the array may include 30 $\mu$m or larger pixels arranged in a grid smaller than 200 rows by 200 columns, and may advantageously comprise a rectangular array having 64 columns and 80 rows of pixels. Such an image sensor is described in detail in U.S. Pat. No. 5,471, 515, incorporated herein above by reference thereto. The optically active region of array 301 is approximately 1.9 mm in the X direction by 2.4 mm in the Y direction. Using such a low resolution image sensor array to monitor the forward field of the controlled vehicle 100 results in a relatively low resolution sensor system that can be supported by high speed processing in a cost effective manner while enabling a vehicle headlight control to be highly reliable and accurate. The low resolution array reduces the memory and processor requirements of associated circuitry. The use of such larger pixels increases sensitivity and thus allows the use of slower, and thus lower cost, optics. However, one skilled in the art will recognize that the use of a higher resolution array with smaller pixels may be advantageous to reduce the area of the sensor array and thus potentially reduce the cost at the array itself. In the case where a high resolution image sensor is employed, faster components and higher quality optics may be required to accommodate the high resolution image sensor. With advances in optical manufacturing, such optics may become cost effective such that use of a higher resolution array becomes economically practical. Additionally, it is expected that in future years the cost of a processor and memory required to process an image containing more pixels will be reduced making a higher resolution system feasible. However, at this time it is preferred to use a low resolution array with relatively few pixels to maintain the economy of the invention and thus enable widespread acceptance in the market place.

An image sensor and control circuit therefore will be described in greater detail herein below, and such a system is disclosed in U.S. Pat. No. 5,990,469, the disclosure of which is incorporated herein above by reference.

In addition to the array 301, the image sensor 201 includes: serial timing and control circuit 309; column output circuit 302; bias generating digital-to-analog converters (DACs) 305; flash analog-to-digital converters (ADCs) 304; and analog amplifier 303. Serial timing and control circuitry 309 provides a high-speed synchronous bidirectional interface between a microcontroller 1105 (FIG. 11) and the image sensor 201. As described in U.S. Pat. No. 5,990,469, the control circuit 309 allows the microcontroller 1105 to output parameters that control the selection of pixels exposed for measurement (i.e., selects the area of array 301 exposed; which area is referred to herein as the "window"); exposure time which affects sensitivity; bias voltages generated by the bias voltage generation DACs 305; and the analog gain of amplifier 303. Additional features include the ability to expose two windows simultaneously, using the same or different gain settings for the amplifier 303 for pixels of the respective windows, and the ability to acquire a sequence of multiple frames. The control circuit 309 also enables a sleep feature that disables the analog components of the image sensor assembly 201 to reduce power consumption when the image sensor is not in use. The image sensor also includes: a power supply input Vdd; a ground input; serial data bus input/output (I/O) 308; serial data clock I/O 311; slave select input 307; and clock input 306.

The Lens Structure

Lens structure 202 (FIG. 2*a*) includes lenses 208 and 209. Although two lenses are disclosed, the image sensor 201 could use a single lens or more than two lenses. The two lenses 208,209 are used to produce two different images of the same scene through different color filters to assist in properly discriminating headlamps from tail lamps using the image sensor 201 as described below and in U.S. Pat. Nos. 5,837,994 and 5,990,469, the disclosures of which are incorporated herein above by reference. The image system allows the acquisition of an image of a scene through at least one color filter 208, 209. In one embodiment, the lens structure is constructed to image the forward scene onto one region of the image array 301 through a first color filter and to image the forward scene onto another region of the image array through a second filter. For example, filter 209 (FIGS. 2*a* and 2*b*) may be a red filter and filter 208 may be either a blue filter, a green filter, a cyan filter, a clear filter (which is for example the absence of a color filter), or any other suitable filter. There are various places within the optical system that the filters could be incorporated other than the lens 208, 209, such as on the image sensor surface. However, incorporating the filters into the lens structure has the advantage that the light is not focused at the point of the filter. Locating the filter in the image plane, i.e., on the sensor, would leave an organic filter susceptible to thermal damage should the sun fall within the sensor's field of view such that the sun's rays are focused on the filters. Typically, filter materials are much more vulnerable to thermal damage than the image sensor itself. A possible exception would be dichroic interference filters, which are highly resistant to thermal damage. A method by which such thermal resistant filters can be deposited onto a semiconductor image sensor surface is described in greater detail herein below.

Figure 7:
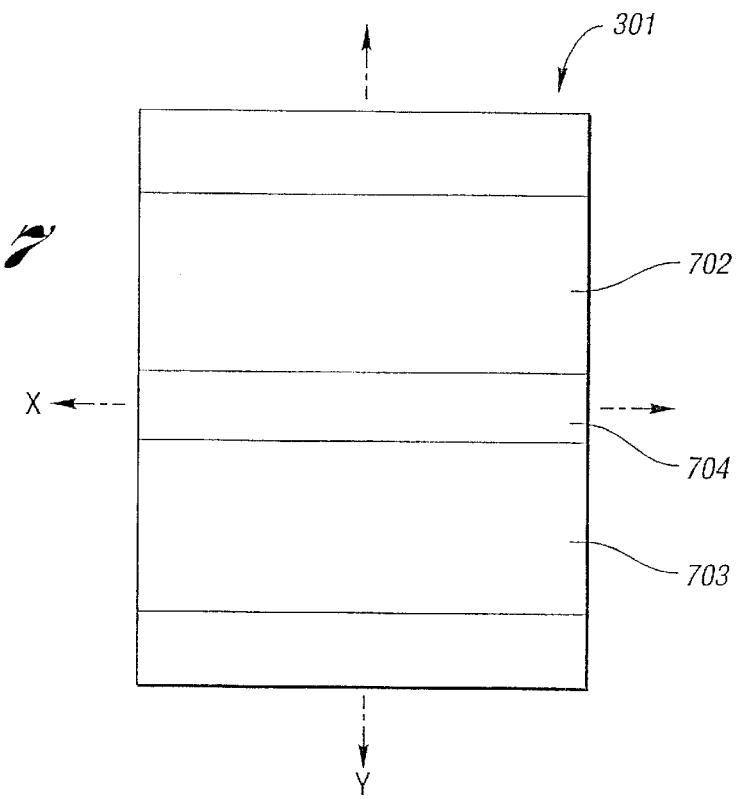
FIG. 7 shows a light sensitive surface of the image sensor and illustrates the regions of the image array which are impacted by the light from each of the lenses.

The lens structure 202 will now be described in greater detail with reference to FIGS. 2*a*, 4, 5, and 7. The lens structure 202 includes a first lens 208 and a second lens 209 that focus light from other vehicles onto the image array 301 (FIG. 7). The two lens elements 208, 209, image the forward scene onto different respective regions 702, 703 of the image sensor image array 301. Each lens element 208, 209 contains a spectral band pass filter, such that the forward image scene projected onto the respective regions of the image array 301 each represents a different color component of the image, where it is advantageous to determine the relative color of objects in the field of view. It is particularly advantageous for the lens elements 208 (FIG. 2*a*) and 209 to comprise cyan and red filters, respectively, as mentioned above and shown in FIGS. 4 and 5. Alternatively, it may be advantageous for lens 209 to contain a red spectral filter and for lens 208 to be clear.

The sensor system may for example employ lens elements 208 and 209 that are 0.5 mm to 1.5 mm in diameter, and may advantageously comprise lenses that are 1.0 to 2.5 mm in diameter, such as being 2.2 mm in diameter. In the Y direction, the lens center axes $C_1$ and $C_2$ may be spaced by 0.6 to 1.6 mm, and may for example be spaced by 1.1 to 1.4 mm, and may advantageously be spaced 1.3 mm in the Y direction (as indicated in FIG. 5). A portion of the lens may be truncated on one side to achieve this spacing. The lens center $C_1$, $C_2$ may be aligned in the X direction as shown in FIG. 4, or offset. Lens element 208 may for example include a cyan filter with an aspheric lens having a curvature of 0.446 mm$^{-1}$ and a conic constant of −0.5 to achieve the desired focal length. Lens element 209 may in contrast, be a red filter, aspheric lens with a curvature of 0.450 mm$^{-1}$ and a conic constant of −0.5 to achieve the same desired focal length. At the center, each lens is 0.5 to 1.5 mm thick, and may advantageously be 1.0 mm thick. The difference in curvature of the two lenses compensates for the dispersion in the lens material and optimizes each lens for the spectral band passed by the filter. These parameters result in a lens with an effective focal length of 4.5 mm and thus have an F# of 2. It will be recognized that these optics are exemplary, and that other optics could be provided, such that the focal length and F# could be different.

The lens structure 202 may be molded out of a light-transmissive plastic such as acrylic, manufactured from glass, or may be produced by any other suitable construction. Where the lenses 208, 209 are molded from plastic, the filters may be formed integrally with the plastic by the inclusion of dyes within the material or they may be molded of a clear transparent material, particularly where the image sensor has a surface mounted filter as described herein below. An example of an acrylic material which includes a red filter dye is part number RD-130 available form OptiColor, Inc. of Huntington Beach, Calif., USA.

An acrylic material incorporating a Cyan filter is Opti-Color part number BL-152. The spectral transmission of these two materials is shown in FIG. 6. Using the optional infrared filter 206 will remove light above approximately 700 nm.

The lens structure 202 including integral filters may be manufactured using a bi-color injection molding process. First one half of the lens, for example the red half including lens 209, is molded in a tool containing features to form the red half of the lens. Next the molded red half of the lens is inserted into a tool containing features for the cyan half of the lens structure 202 in addition to features to hold the red lens 209. The cyan lens 208 half of the lens structure 202 is then injection molded against the red lens 209 half forming one bi-color lens. Alternatively, each of the lenses 208 and 209 can be provided by lens elements such as disclosed in copending U.S. patent application Ser. No. 09/093,993, entitled IMAGING SYSTEM FOR VEHICLE HEADLAMP CONTROL, filed Jun. 9, 1998, by Jon H. Bechtel et al., the disclosure of which is incorporated herein by reference thereto.

While red and cyan filtered lens elements are used in the illustrated embodiment, other combinations of lenses may also be suitable for this application. For example, it is possible to replace cyan lens element 208 with a clear lens. Also, it is possible to use three lenses with respective color filters, and in particular red, green, and blue filters, to obtain a full color image. Such an arrangement could use a sequence of three lenses aligned along the Y axis of FIG. 4, with one lens positioned on the center axis and the other two lenses positioned adjacent this center lens. The spacing of the lenses might advantageously be uniform to provide uniformly spaced regions on the light sensitive surface of the image array 301. The red and cyan filter colors described above are thus only presented herein as an example, and any combination of filters which pass at least two isolated or overlapping spectral bands of light and allow for the distinction of tail lamps from head lamps may be used. Those skilled in the art will recognize that other methods can be used to incorporate the filters, such as screen printing dyes applied to the flat back surface of the lens structure 202, or application of a filter material to the surface of-the of a clear lens structure. Additionally, an advantageous system using a single lens is described herein below with reference to FIGS. 24 and 25.

The Aperture Stop

Aperture stop 203 comprises an opaque member, including apertures 240 (FIG. 2a) and 242, positioned over lenses 208, 209. The aperture stop 203 can be manufactured of any suitable material, such as molded plastic, and it can be painted or otherwise treated so as to block the passage of light if the material of which the plastic is manufactured is not opaque. Aperture stop 203 defines the apertures 240, 242 for lens elements 208 and 209. Aperture stop 203 also prevents passage of stray light through regions of lens structure 202 other than the lens elements 208 and 209. It will be recognized that the aperture stop 203 can be paint applied directly to the surface of lens structure 202, and optionally to the sidewalls of light sensor assembly 250, such that the paint blocks passage of stray light through regions of lens 202 other than the lens elements 208 and 209.

The Far Field Baffle

The far field baffle 204 (FIGS. 2a and 2b) is an opaque enclosure to be positioned over the image sensor 201. The baffle includes an opening 207, which is the sole light passage into the image sensor. The illustrated far field baffle 204 is a generally rectangular box including four sidewalls 215 (only two of the four being visible in FIG. 2b), an end wall 217 including opening 207, and an open end 219. The open end is secured to the support 220 on which image sensor 201 is carried. The support 220 may for example be a circuit board, or a housing, and is preferably opaque to block the passage of light into the chamber defined by the far field baffle. The walls 215, 217 of the far field baffle 204 are opaque, and may be of any suitable construction such as stamped from metal, molded from plastic, or the like. If the material from which the walls are made is not opaque, it may be painted or otherwise treated to block the admission of light. The far field baffle defines the forward scene viewed by image sensor array 208. The side walls 215 and end wall 217 prevent light at angles outside of the desired field of view from entering and are also used to keep light input through one lens from crossing over to the region of the array reserved for the other lens. The far field baffle aperture 207 is ideally about 4–6 focal lengths, or approximately 18 mm in the illustrated embodiment, from the front of the lens (for the sake of clarity, the figures of the application are not to scale). The field of view through aperture 207, aperture stop 203, and lenses 208 and 209, in the illustrated embodiment, is about 10 in the vertical direction and 25 in the horizontal direction in front of the vehicle. This field of view can be achieved with a rectangular or elliptical far field baffle opening 207 that is 6 to 7 mm in the Y direction and 9 to 10 mm in the X direction, in the above described embodiment.

In particular the far field baffle 204 has an opening 207 in an end wall 217. The sidewalls 215 of the image array sensor extend orthogonally from the end wall 217. The walls 215, 217 may be formed integrally in a molding or stamping process or they may be joined after construction using an adhesive, fasteners or the like. The far field baffle is preferably a black plastic molded member, although it may be provided using any material that will absorb most or all of the light striking the sidewalls. By providing wall surfaces on the inside of the far field baffle that absorb light, the walls will not reflect light that enters though opening 207 onto the image array sensor 201. In the illustrated embodiment, the baffle is rectangular, but those skilled in the art will recognize that the baffle could be square, cylindrical, or any other suitable shape. An imaging system including a far field baffle is described in co-pending U.S. patent application Ser. No. 09/093,993, entitled IMAGING SYSTEM FOR VEHICLE HEADLAMP CONTROL, filed on Jun. 9, 1998, by John H. Bechtel et al, the disclosure of which is incorporated herein by reference thereto.

Infrared Filter

The far field baffle holds an optional infrared filter 206 (FIG. 2a). Infrared filter 206 prevents light of wavelengths longer than about 700 nm from being imaged by the optical system. This is advantageous as light above 700 nm (FIG. 6) will pass through the red and cyan filters. By removing this light, the only light that will be considered is visible light in the pass band of the red and blue filters. Infrared filters are available from Optical Coating Laboratories of Santa Rosa Calif. and are called Wide Band Hot Mirrors. The infrared filter 206 may be mounted to the end wall 217 using an adhesive, mechanical fasteners such as a snap connector, or the like, and may seal off the chamber within the far field baffle to prevent dust and moisture from entering the system and degrading the performance of the system.

Alternatively infrared filter 206 may be incorporated as a dye within the lens, a coating on the lens, a coating on the image sensor surface, a lid on an image sensor package, or elsewhere in the image sensor assembly. If the IR filter is not such that it can be used to close the opening 217 of far field baffle 204, it may be desirable to place a clear window, such as glass, plastic, or the like in the opening 217 to prevent dust from entering into the interior of the far field baffle and interfering with the performance of the sensor system 102.

Assembly of the Image Sensor Assembly

Figure 8:
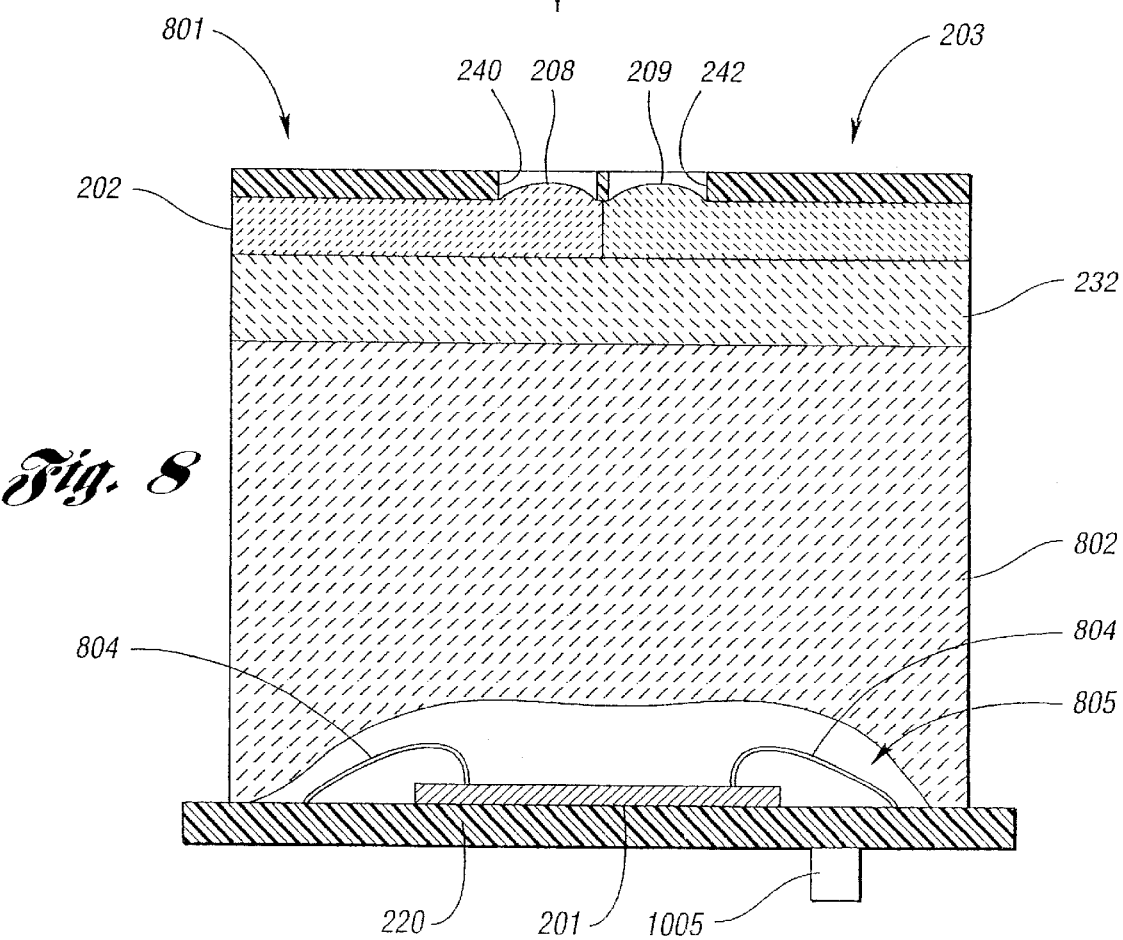

Assembly of the image sensor will now be described with reference to image sensor assembly 801 of FIG. 8, which is identical to the image sensor assembly 250 except for the gel 805 in image sensor assembly 801. The image sensor 201, lens structure 202, and aperture stop 203 are combined to form an integral image sensor assembly 250 (FIG. 2) or 801 (FIG. 8). The image sensor 201, which is advantageously a single integrated circuit (IC), is attached to printed circuit board 220 by any suitable conventional means such as using chip-on-board technology. Connections to the image sensor chip are made by any suitable means, such as wire bonds 804. The bonded IC is then optionally covered with an optically clear stress relieving gel 805. Examples of materials that can be used for this coating are Silicon Semi-Gel type C from Transene Co. of Danvers, Mass., or Dielectric Gel 3-6211 from Dow Coming Corp. of Midland Mich. The coated IC is then encapsulated in a hard optically clear enclosure 802, which may for example comprise epoxy. The epoxy is formed into a desired shape, and may for example form a cube. The cube can be dimensioned to occupy a very small volume, and may for example have length and width dimensions of about 1 cm on a side, and a thickness of about 5 mm. The enclosure 802 (FIG. 8) may be selected to have approximately the same index of refraction as the stress relieving gel 805 to prevent any refraction at the interface between these two materials. Examples of suitable epoxies are: Epo-Tek 301-2FL from Epoxy Technology, Inc. of Billerica, Mass., or Epoxy 50 from Transene Co, or Dexter-Hysol OS 1900. If the coefficient of thermal expansion of the enclosure 802 is sufficiently low that its expansion and contraction will not break wire bonds 804 at the expected operating temperature range for the image array sensor 201, stress-relieving gel 805 can be omitted, as is shown by enclosure 230 over wire bonds 234 in image sensor assembly 250 in FIG. 2a.

Lens structure 202 is attached to the enclosure 802 (FIG. 8) or enclosure 230 (FIG. 2) using a UV curable optically clear adhesive 232. UV curable adhesive 232 is dispensed onto the epoxy cube 802 and lens 202 is juxtaposed with UV curable adhesive 232. Lens structure 202 is spaced from the image sensor 201 by a distance such that images at "infinity" are focused on the desired image regions 702 and 703. The UV curable adhesive 232 is exposed to UV light and cured, locking lens structure 202 into position and permanently attaching lens structure 202 to enclosure 802. The total distance between the back surface of the lens structure 202 and the top of the image sensor 201 die is 6.7 mm in the illustrated example. This distance is significantly longer than the effective focal length of 4.4 mm because the entire optical path between the back of the lens 202 and the front of the image array 201 is through a material with a higher index of refraction than air. Ideally the process of aligning the lens to the image sensor and curing the UV adhesive to hold it in place is accomplished while actively focusing the lens to accommodate variations in the manufacture of the lens and other image sensor assembly components. This is process is accomplished by powering the image sensor during assembly and acquiring images of a far field scene from the image sensor into a host computer. The UV curable adhesive is dispensed onto the surface of the sensor and the lens is positioned on the UV curable adhesive using a multi-axis robot or positioner. The position of the lens is adjusted by the robot until the images acquired by the sensor appear in focus. At this point, the UV curable adhesive is exposed to UV light, cementing the lens into place.

UV curable adhesive 232 serves to fill the space between the lens 202 and enclosure 802, and thus fills in any ripples or other non-planar surfaces of enclosure 802 thereby precluding the creation of air gaps between the lens 202 and the enclosure 802. To accomplish the desirable optical characteristics described hereinabove, UV curable adhesive 232 should have approximately the same index of refraction as enclosure 802. This structure has the distinct advantage of minimizing the number of optical surfaces wherein a significant mismatch of indices of refraction between two different mediums can occur, thus increasing the optical efficiency of the imaging system and reducing stray light. A suitable optically clear UV cured adhesive is Norland Optical Adhesive 68 manufactured by Norland Products, Inc., of New Brunswick, N.J. Other materials suitable for making the image sensor assembly 801 are available from Dymax.

The block 802 is completed by attaching the aperture stop 203 to lens 202. If the aperture stop is a member, it may be attached to the outer surface of the lens using an adhesive, one or more mechanical fasteners, or the like. If the aperture stop is paint, it may be applied directly to the surface of the lens element 202 after the lenses 208 and 209 are covered with a removable mask, such as tape. After the paint dries, the mask can be removed. The optical assembly 801 is then mounted to a support 220. In particular, the image sensor array 201 is physically mounted on a base substrate 221 by conventional means, and electrically connected to circuitry (not shown in FIG. 2b) by electrical connectors such as wire bonds, solder, one or more connectors, or the like. The base substrate 221 may for example be a printed circuit board.

The support 220 may be constructed of the same material as the far field baffle 204, or it may be constructed of a different material. The base substrate 221 may be omitted if the far field baffle and the image sensor are mounted directly to either the support 220 or the housing (not shown) that carries the optical sensor assembly. For example, the support 220 may be a printed circuit board to which the image sensor 201 and the far field baffle are connected. Regardless of whether the base substrate is provided, the far field baffle is mounted to the support 220 or the housing (not shown) using an adhesive, a snap connector, a mechanical fastener, or the like.

Figure 9:
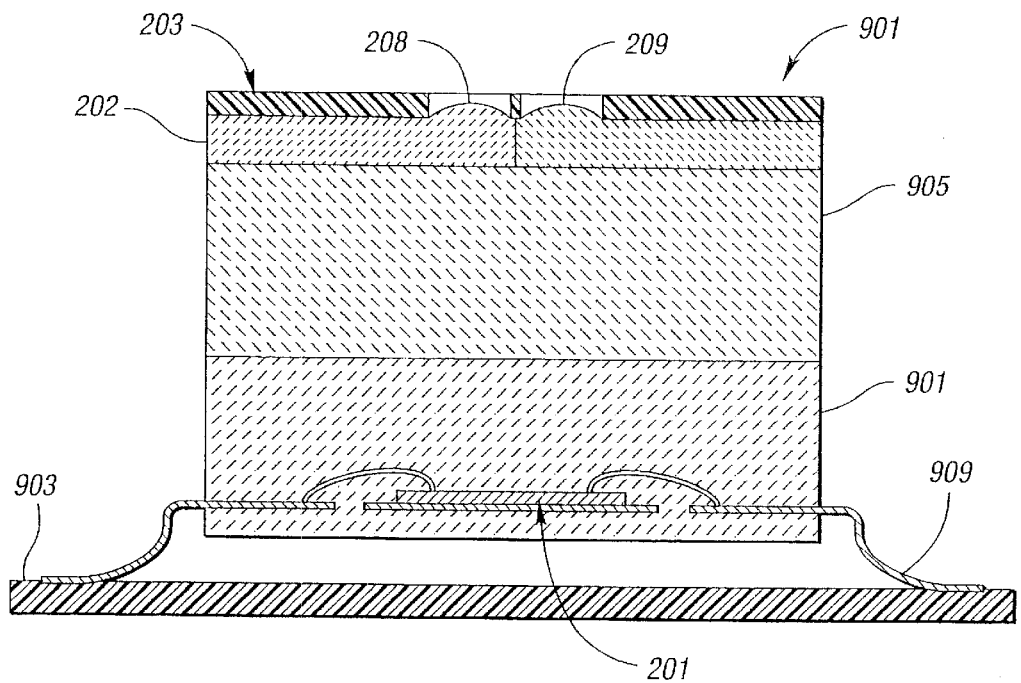

An image sensor assembly 901 according to an alternate embodiment is illustrated in FIG. 9. In this embodiment, the image sensor 201 is packaged using more conventional electronic packaging, such as a ceramic package with a glass lid or a clear plastic package, which may for example be a quad flat pack or a dual-in-line (DIP) package. The packaged image sensor 901 is mounted, by suitable conventional means such as by soldering, to printed circuit board 902. An ultraviolet (UV) curable adhesive 905 is then dispensed onto the packaged image sensor 901. The adhesive used can be the same adhesive described above with respect to adhesive 232. The thickness of the UV curable adhesive is dependent on the packaged image sensor 901 type. If the required thickness is too great, layers of the UV curable adhesive can be built up or another material, such as an epoxy layer, can be sandwiched between the UV curable adhesives to decrease the thickness of the adhesive layer 905. The epoxy may be the same material described above with respect to the enclosure 230, 802. The lens structure 202 is juxtaposed with the UV curable adhesive 905 and focused in the manner previously described. Finally, the aperture stop 203 is attached to the lens structure 202 using an adhesive (not shown), mechanical fastener or the like.

In addition to the means described herein above, the lens structure 202 may be supported relative to the image sensor by other means, such as a mechanical support. Such a structure is disclosed in U.S. patent application Ser. No. 09/093,993, entitled IMAGING SYSTEM FOR VEHICLE HEADLAMP CONTROL, filed on Jun. 9, 1998, the disclosure of which is incorporated herein by reference thereto. The same may also be used to position and maintain the relative relationship between the components of the optical assembly including the aperture stop and the far field baffle. A mechanical fastening arrangement is disclosed hereinbelow with respect to FIG. 24.

Mirror Mounted Image Sensor Assembly

Figure 10:
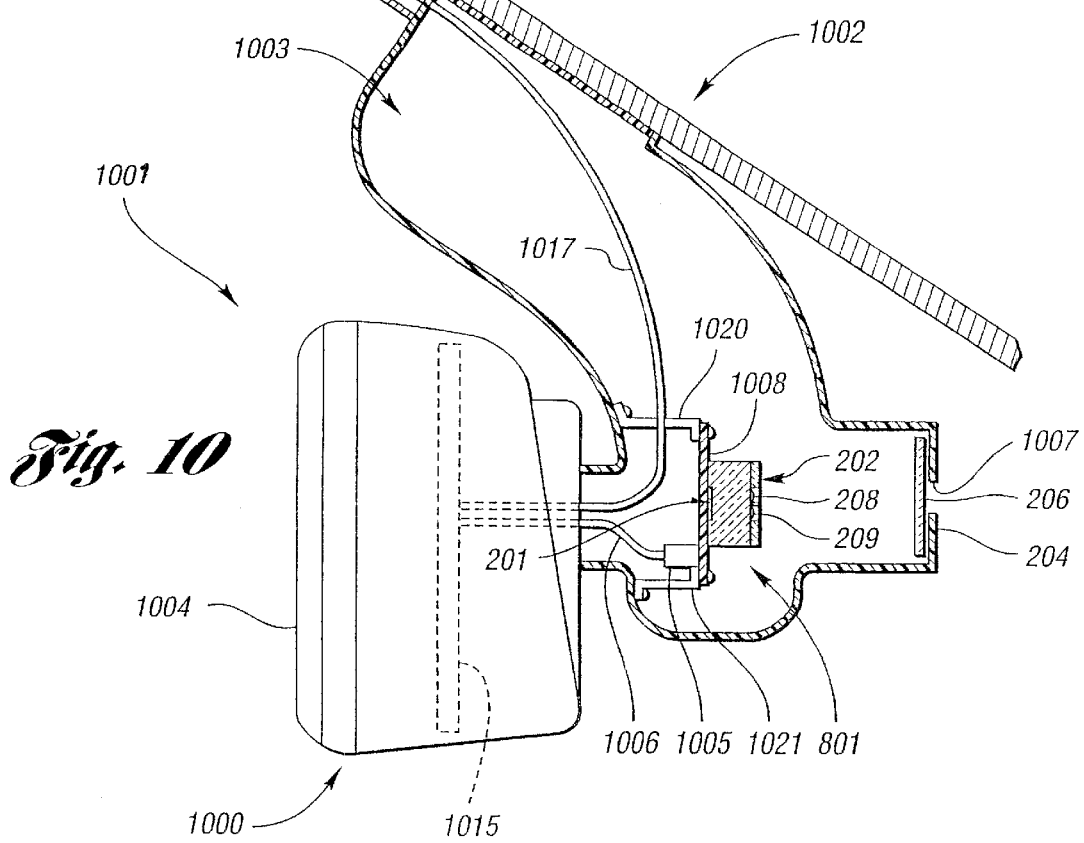
FIG. 10 is a partial cross section of a rearview mirror assembly illustrating an optical sensor system.

As mentioned above, the headlamp dimmer can be advantageously integrated into a rearview mirror 1000 as illustrated in FIG. 10, wherein the light sensor assembly 201 is integrated into an automatic dimming electrochromic (EC) mirror subassembly 1001, or other variable reflectance mirror assembly. This location provides an unobstructed forward view through a region of the windshield of the vehicle that is typically cleaned by the vehicle's windshield wipers (not shown). Additionally, mounting the image sensor in the mirror assembly permits sharing of circuitry such as the power supply, microcontroller and light sensors. More specifically, the same ambient light sensor may be used to provide and ambient light measurement for both the auto-dimming mirror function and the headlamp control function.

Referring to FIG. 10, light sensor assembly 801 is mounted within a rearview mirror mount 1003, which is mounted to the vehicle windshield 1002. The rearview mirror mount 1003 provides an opaque enclosure for the image sensor. The infrared filter 206 can be mounted over a hole 1007 in the rear view mirror mount 1003, as is shown. Alternatively, the far field baffle 214 can be used with the infrared filter 206 mounted therein. If the far field baffle 214 is used, it is mounted to the circuit board 1008 with the image sensor assembly 202. Regardless of whether the far field baffle is used, the circuit board 1008 is mounted to rear view mirror mount 1003 using mounting brackets 1020 and 1021. The mounting brackets may be implemented using any suitable construction, such as metal brackets, plastic brackets which can be formed either integrally with the housing 1003 or as separate components, mechanical fasteners which engage the circuit board 1008, or the like. The separate brackets can be attached using an adhesive, metal fasteners or other mechanical fastening means. Image sensor assembly 201 is thus attached to, and held stationary by, the rear view mirror mount 1003 which is securely attached to the vehicle windshield or roof by conventional means.

A connector 1005 is connected to circuit board 1008 using a suitable commercially available circuit board connector (not shown), which in turn is connected to the image sensor 201 through circuit board 1008. The connector 1005 is connected to a main circuit 1015 through a cable 1006. The main circuit board is mounted within rear view mirror housing 1004 by conventional means. Power and a communication link with the vehicle electrical system, including the headlamps 111 (FIG. 1), are provided via a vehicle wiring harness 1017 (FIG. 10).

The Electrical System

Figure 11:
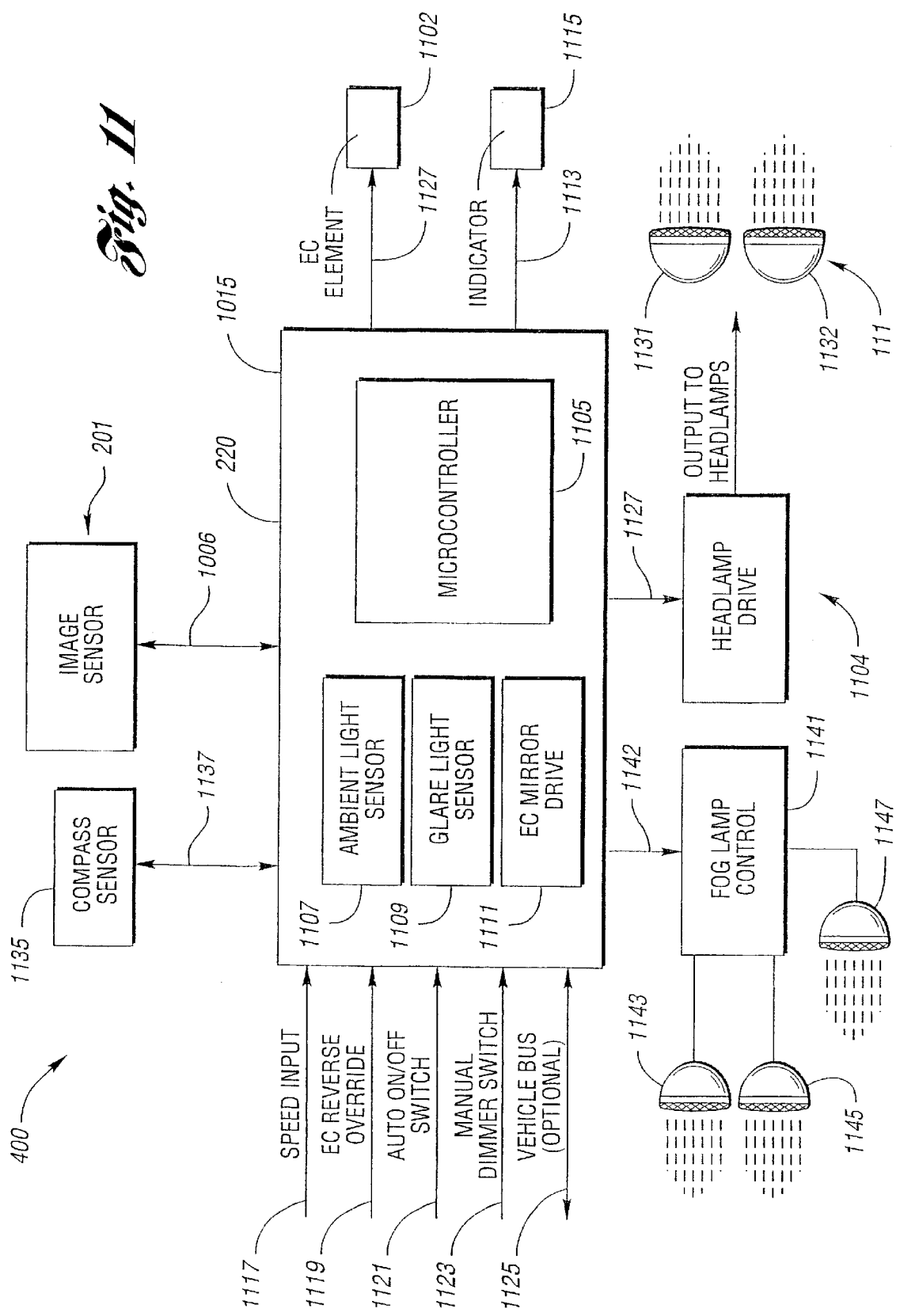
FIG. 11 is a circuit schematic illustrating a circuit for an optical sensor system and an electrochromic mirror.

The image sensor 201 electrically connected to the main circuit board 1015 and mounted in the vehicle rearview mirror housing 1004 (FIG. 10) is represented in FIG. 11. The microcontroller 1105 receives image signals from the image sensor 201, processes the images, and generates output signals. Although described with reference to a circuit board mounted in a rearview mirror housing, the circuit board 1105 can be mounted in a vehicle accessory, such as a sun visor, overhead console, center console, dashboard, prismatic rearview mirror, A-pillar, or at any other suitable location in the vehicle. Should the controlled vehicle (100 in FIG. 1) include an electrochromic mirror, the circuitry for the electrochromic mirror preferably shares the circuit board 1015 (FIG. 10) with microprocessor 1105. Thus, the main circuit board 1015 is mounted within the mirror housing 1004. The EC circuitry further includes ambient light sensor 1107 and glare light sensor 1109, which may advantageously be digital photodiode light sensors as described in U.S. patent application Ser. No. 09/491,192 entitled PHOTODIODE LIGHT SENSOR, filed Jan. 25, 2000, and U.S. patent application Ser. No. 09/307,191 entitled VEHICLE EQUIPMENT CONTROL WITH SEMICONDUCTOR LIGHT SENSORS, filed May 7, 1999, now U.S. Pat. No. 6,359,274, the disclosures of which are incorporated herein by reference. Microcontroller 1105 uses inputs from ambient light sensor 1107 and glare lights sensor 1109 to determine the appropriate state for the electrochromic mirror element 1102. The mirror is driven by EC mirror drive circuitry 1111, which may be a drive circuit described in U.S. Pat. No. 5,956,012, entitled "SERIES DRIVE CIRCUIT," filed by Robert R. Turnbull et al. on Sep. 16, 1997, and PCT Application Serial No. PCT/US97/16946, entitled "INDIVIDUAL MIRROR CONTROL SYSTEM," filed by Robert C. Knapp et al. on Sep. 16, 1997; and U.S. patent application Ser. No. 09/236,969, entitled "AUTOMATIC DIMMING MIRROR USING SEMICONDUCTOR LIGHT SENSOR WITH INTEGRAL CHARGE COLLECTION", filed May 7,1999, by Jon H. Bechtel et al., now abandoned, the disclosures of which are incorporated herein by reference thereto. Other driver circuits are known that can be used to drive the EC element 1102. The EC mirror drive circuit 1111 provides current to the EC element 1102 through signal output 1127.

The microcontroller 1105 can take advantage of the availability of signals (such as vehicle speed) communicated over the vehicle's electrical bus in making decisions regarding the operation of the headlamps 111, represented by high beams 1131 and low beams 1132 in FIG. 11, and the electrochromic mirror 1102. In particular, speed input 1117 provides vehicle speed information to the microcontroller 1105, from which vehicle speed criteria can be used for determining the control state for the headlamps 111. The reverse signal 1119 informs microcontroller 1105 that the vehicle is in reverse, responsive to which the microcontroller 1105 clears the electrochromic mirror element 1102 regardless of the signals output from the light sensors 1107, 1109. Auto ON/OFF switch input 1121 is connected to a switch having two states to dictate to microcontroller 1105 whether the vehicle headlamps 1131, 1132 should be automatically or manually controlled. The auto ON/OFF switch (not shown) connected to the ON/OFF switch input 1121 may be incorporated with the headlamp switches that are traditionally mounted on the vehicle dashboard or incorporated into steering wheel column levers. Manual dimmer switch input 1123 is connected to a manually actuated switch (not shown) provides a manual override signal for the high beam state. Should the current controlled state of the high beams be ON, the microcontroller will respond to actuation signal manual override signal control input 1123 to turn the high beams OFF temporarily until the driver restores operation or, optionally, until a predetermined time has elapsed. Alternatively, should the high beams be OFF, the microcontroller 1105 will respond to an actuation signal on input 1123 to turn the high beams ON. The manual high beam control switch can be implemented using a lever switch located on the steering column of controlled vehicle 100 (FIG. 1).

The circuit board 1101 has several outputs. The control signal on electrochromic output 1127 provides current to the electrochromic element 1102. Additional outputs (not shown) may optionally be provided to control exterior electrochromic rear view mirrors (not shown) if such additional mirrors are provided. The microcontroller 1105 communicates the current state of the low beam headlamps 1131 and the high beam headlamps 1132 to the headlamp drive 1104 via headlamp control output 1127 The microcontroller 1105 generates control signals communicated over conductor 1113 (FIG. 11) to an optional visual indicator 1115 which displays the current state of the high beam headlamps to the driver of controlled vehicle 100. The high beam indicator is traditionally located in or near the vehicle's instrument cluster on the vehicle dashboard. A compass sensor 1135 may be connected to the circuit board 1015 via a bidirectional data bus 1137. The compass can be implemented using a commercially available compass of the type generating digital or analog signals indicative of the vehicle's heading, such as those described in U.S. Pat. No. 5,239,264 entitled ZERO-OFFSET MAGNETOMETER HAVING COIL AND CORE SENSOR CONTROLLING PERIOD OF AN OSCILLATOR CIRCUIT; U.S. Pat. No. 4,851,775 entitled DIGITIAL COMPASS AND MAGNETOMETER HAVING A SENSOR COIL WOUND ON A HIGH PERMEABILITY ISOTROPIC CORE; U.S. Pat. No. 5,878,370 entitled VEHICLE COMPASS SYSTEM WITH VARIABLE RESOLUTION; U.S. Pat. No. 5,761,094, entitled VEHICLE COMPASS SYSTEM; U.S. Pat. No. 5,664,335, entitled VEHICLE COMPASS CIRCUIT; U.S. Pat. No. 4,953,305 titled VEHICLE COMPASS WITH AUTOMATIC CONTINUOUS CALIBRATION; U.S. Pat. No. 4,677,381 entitled FLUX-GATE SENSOR ELECTRICAL DRIVE METHOD AND CIRCUIT; U.S. Pat. No. 4,546,551 entitled ELECTRICAL CONTROL SYSTEM; U.S. Pat. No. 4,425,717 entitled VEHICLE MAGNETIC SENSOR; and U.S. Pat. No. 4,424,631 entitled ELECTRICAL COMPASS, the disclosures of all of these patents are hereby incorporated herein by reference. A fog lamp control 1141 can be connected to receive via fog light control output 1142 control signals generated by microcontroller 1105. Fog lamp control 1141 controls front fog lamps 1143 and rear fog light 1145 to turn ON and OFF.

Some or all of the inputs 1117, 1119, 1121, 1123, and 1135, and outputs 1127, 1113, 1127, and 1142, as well as any other possible inputs or outputs, can optionally be provided through a vehicle communications bus 1125 shown in FIG. 11. Vehicle bus 1125 may be implemented using any suitable standard communication bus, such as a Controller Area Network (CAN) bus. If vehicle bus 1125 is used, microcontroller 1105 may include a bus controller or the control interface may be provided by additional components on the main control board 1015.

Figure 12:
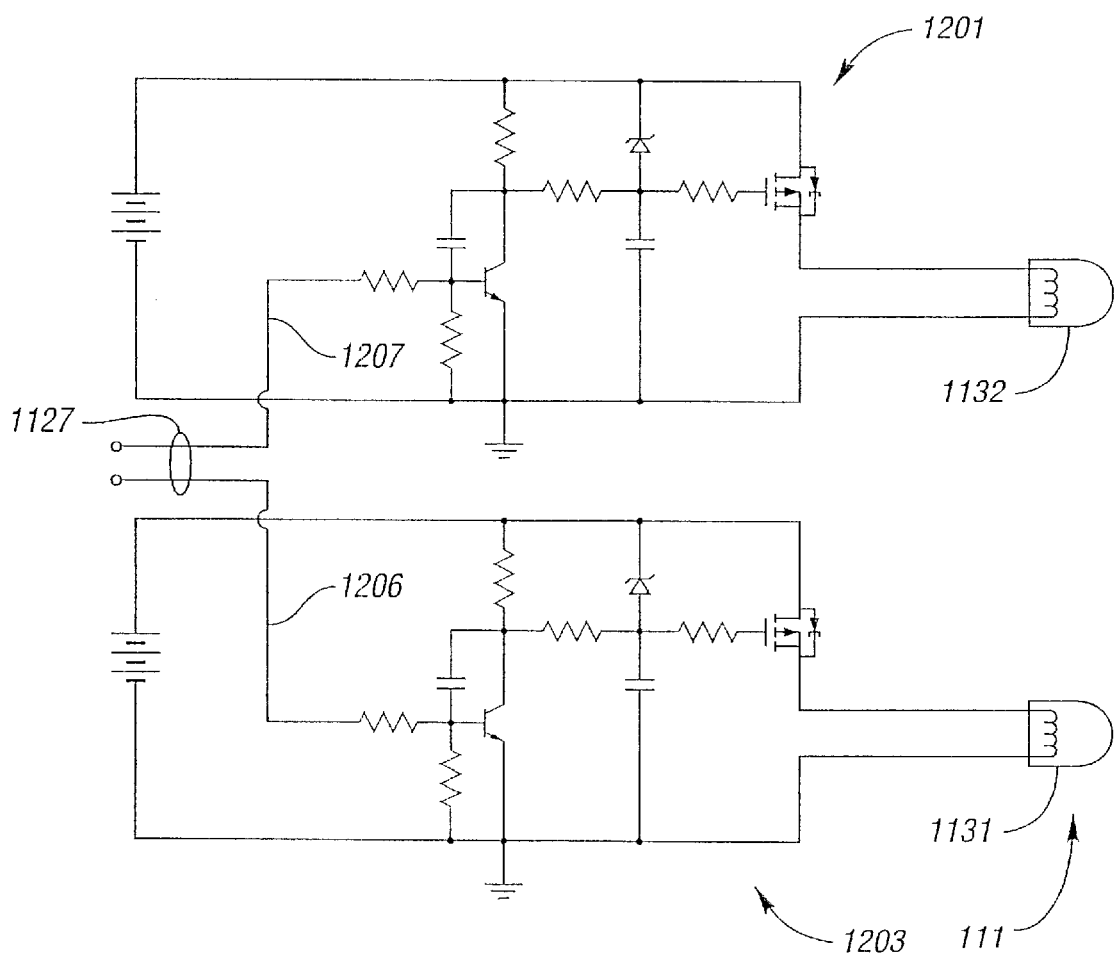
FIG. 12 is a circuit schematic illustrating a headlamp drive for the circuit according to FIG. 11.

FIG. 12 illustrates a headlamp drive 1104 including a drive circuit 1203 for low beam headlamps 1131 and a drive circuit 1201 for high beam headlamps 1132. Bus 1127 includes respective wires 1206 and 1207 carrying pulse width modulated (PWM) signals generated by microcontroller 1105 for driving low beam headlamps 113 1 and high beam headlamps 1132. Alternatively, headlamp drive 1104 may contain a DC power supply to vary the voltage supplied to the lamps 1131, 1132, and thus their brightness, in response to control signals on output 1127 Yet another alternative envisioned is to vary the aim of the high beam headlamps 1131 as is described hereinbelow and as taught in US patent application Ser. No. 09/157,063, entitled CONTINUOUSLY VARIABLE HEADLAMP CONTROL, filed by Joseph Stam et al. on Sep. 18, 1998, the disclosure of which is incorporated herein by reference.

Headlamp drive 1104 provides power to the high beam 1131 and low beam 1132 headlamps. In the simplest case, the headlamp drive contains relays engaged in response to signal 1127 to turn ON or OFF the headlamps. In a more preferred embodiment, low and high beam headlamps 1131 and 1 132 fade ON or OFF under the control of headlamp drive 1104 which generates a variable control signal. Such a control system is described in copending U.S. patent application Ser. No. 09/157,063, incorporated herein above by reference thereto. In general, the patent teaches variable emission control of the headlamps can be provided by energizing the headlamps using a pulse width modulation (PWM) supply, wherein the duty cycle of the drive varied between 0% and 100% to effect a continuously variable brightness from the headlamps 1131, 1132.

Figure 13:
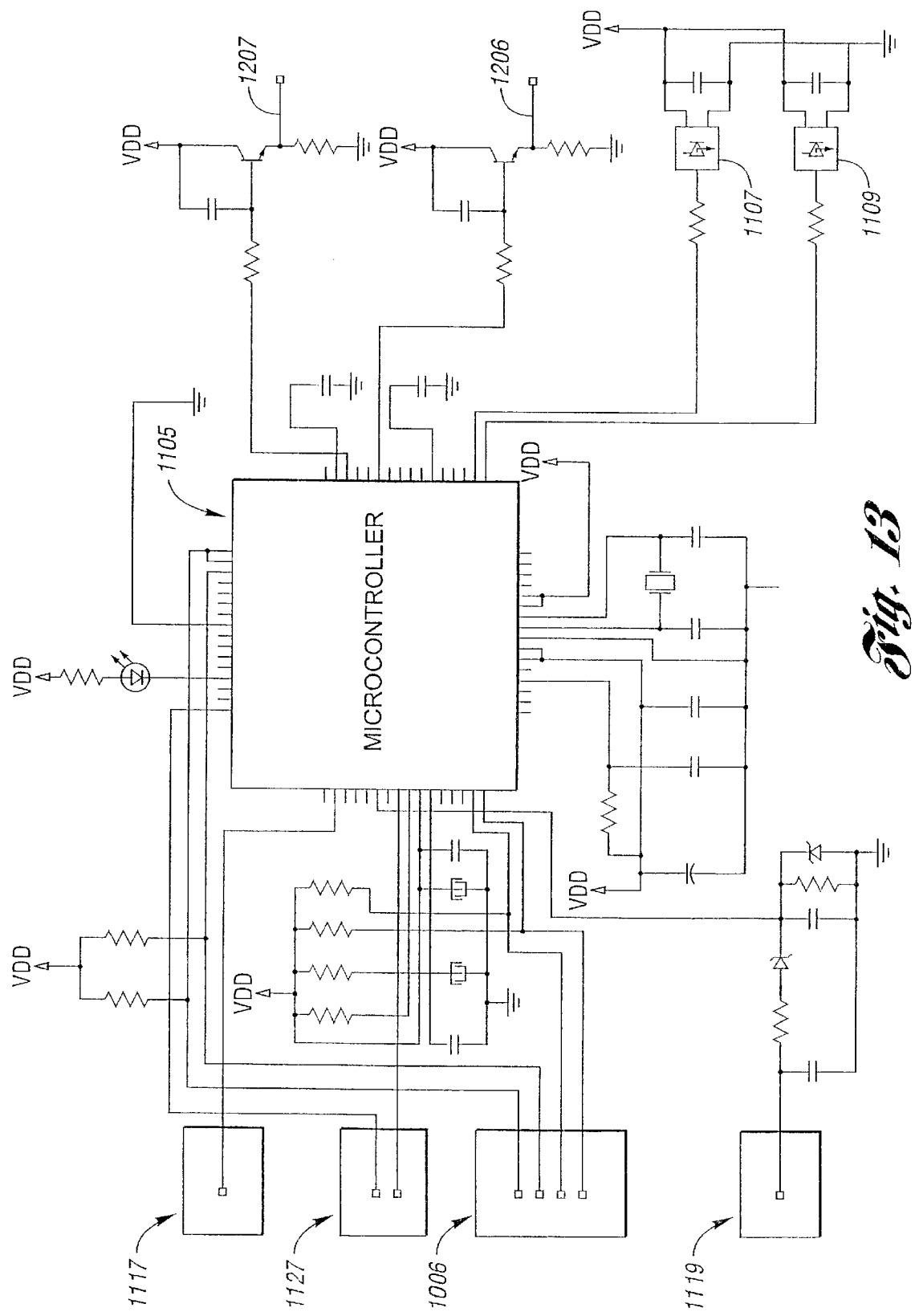
FIG. 13 is a circuit schematic illustrating a microcontroller circuit for the circuit according to FIG. 11.

The microcontroller 1105 analyzes images acquired by the image sensor assembly 201 responsive to which it detects oncoming or preceding vehicles in the forward field of view. The microcontroller 1105 uses this information in conjunction with the various other inputs thereto to determine the current control state for the headlamps 1131, 1132. The current control state of the headlamps refers to the brightness of the high beams and the low beams. In a variable control system, this brightness is varied by changing the duty cycle of the beams or the DC voltage applied to the lamps as described above. In a non-variable system, the control state refers to whether the high beams and low beams are ON or OFF. A more detailed schematic showing the connections to the microcontroller 1105 is shown in FIG. 13. The microcontroller 1105 can be implemented using a microcontroller, a microprocessor, a digital signal processor, a programmable logic unit, discrete circuitry or combination thereof. Additionally, the microcontroller may be implemented using more than one microprocessor.

Operation

The combined effect of the lens structure 202 and the far field baffle 204 will first be described with respect to FIGS. 2a and 7. As mentioned above, in one embodiment, the image array 301 contains 64 columns and 80 rows of 30 $\mu$m pixels. The forward scene imaged through the red lens 209 is located on one region 703 of the image array 301. The forward scene imaged through the other lens element 208 is located on region 702 of the image array 301. In the embodiment illustrated, each of these regions is a 60 wide by 20 high pixel subwindow of the image array. The centers of the two regions 702 and 703 are separated 1.2 mm in the Y direction, the same spacing as the center axis of lens 208 and 209. 14 pixel rows 704 define a band that lies between the two regions 702, 703 and serves as a border, or buffer, separating these two regions.

The image sensor assembly 250 provides several advantages. Because the block will be solid, it eliminates any surfaces between the image sensor 201 die and the lens structure 202. By eliminating these surfaces, stray light is reduced. Second, the preferred embodiment allows for the active alignment of the lens, which allows for compensation of various manufacturing variances, as is described in greater detail herein above. Finally, the assembly is inexpensive, eliminating the need for costly ceramic packaging. Some or all of the above mentioned advantages can be realized through variations on this structure. For example, the enclosure 230, UV curable adhesive 232 and possibly the stress relieving gel 805 (FIG. 8) can be replaced with a UV cured epoxy adhesive.

In operation, an image is exposed onto the image array 301 (FIG. 3) for an exposure period, which may also be referred to herein as an integration period. At the end of the exposure period, an output signal is stored for each of the pixels, and preferably is stored in the pixels as is the case with the photogate pixel architecture described in U.S. Pat. No. 5,471,515 previously incorporated herein by reference. The output signal from each of the pixels is representative of the illumination sensed by each pixel. This output signal is transferred to the column output circuitry 302 one row at a time. The column output circuitry includes capacitors storing the respective pixel output signals for each pixel in the row. Next, the pixel output signals are successively amplified by an analog amplifier 303. The amplifier gain is advantageously adjustable, and may for example be controlled to selectively increase the amplitude of the amplifier input signal by 1 (unity gain) to 15 times, in integer increments. Adjustment of the gain of the amplifier permits adjustment of the system sensitivity. The amplified analog signals output from amplifier 303 are sampled by a flash analog-to-digital converter (ADC) 404. The flash ADC 404 converts each of the amplified analog signals, which correspond to respective pixels, into eight-bit digital grey scale values. Various bias voltages for the sensor are generated by digital-to-analog converter (DAC) 105. Two of the voltages generated by the bias generators are the ADC high and low reference values, which determine the analog voltages that will correspond to digital values of 255 and 0, respectively, thus setting the range of the ADC.

Serial timing and control circuitry 309 dictates the timing sequence of the sensor operation, and is described in detail in co-pending U.S. Pat. No. 5,990,469, entitled CONTROL CIRCUIT FOR IMAGE ARRAY SENSORS, issued to Jon H. Bechtel et al on Nov. 23, 1999, the disclosure of which is incorporated herein by reference.

The image sensor control process will now be described beginning with reference to FIG. 14. The control process may include control of an electrochromic (EC) mirror. However, because processes for controlling an EC mirror are well known, such processes are not completely described herein. Electrochromic devices are generally known, and examples of electrochromic devices and associated circuitry, some of which are commercially available, are disclosed in Byker U.S. Pat. No. 4,902,108; Bechtel et al. Canadian Patent No. 1,300,945; Bechtel U.S. Pat. No. 5,204,778; Byker U.S. Pat. No. 5,280,380; Byker U.S. Pat. No. 5,336,448; Bauer et al. U.S. Pat. No. 5,434,407; Tonar U.S. Pat. No. 5,448,397; Knapp U.S. Pat. No. 5,504,478; Tonar et al. U.S. Pat. No. 5 679,283, Tonar et al. U.S. Pat. No. 5,682,267; Tonar et al. U.S. Pat. No. 5,689,370; Tonar et al. U.S. Pat. No. 5,888,431; Bechtel et al. U.S. Pat. Nos. 5,451,822; 5,956,012; PCT Application Ser. No. PCT/US97/16946; and U.S. patent application Ser. No. 09/236,969, now abandoned, the disclosures of which are incorporated herein by reference thereto.

Figure 14:
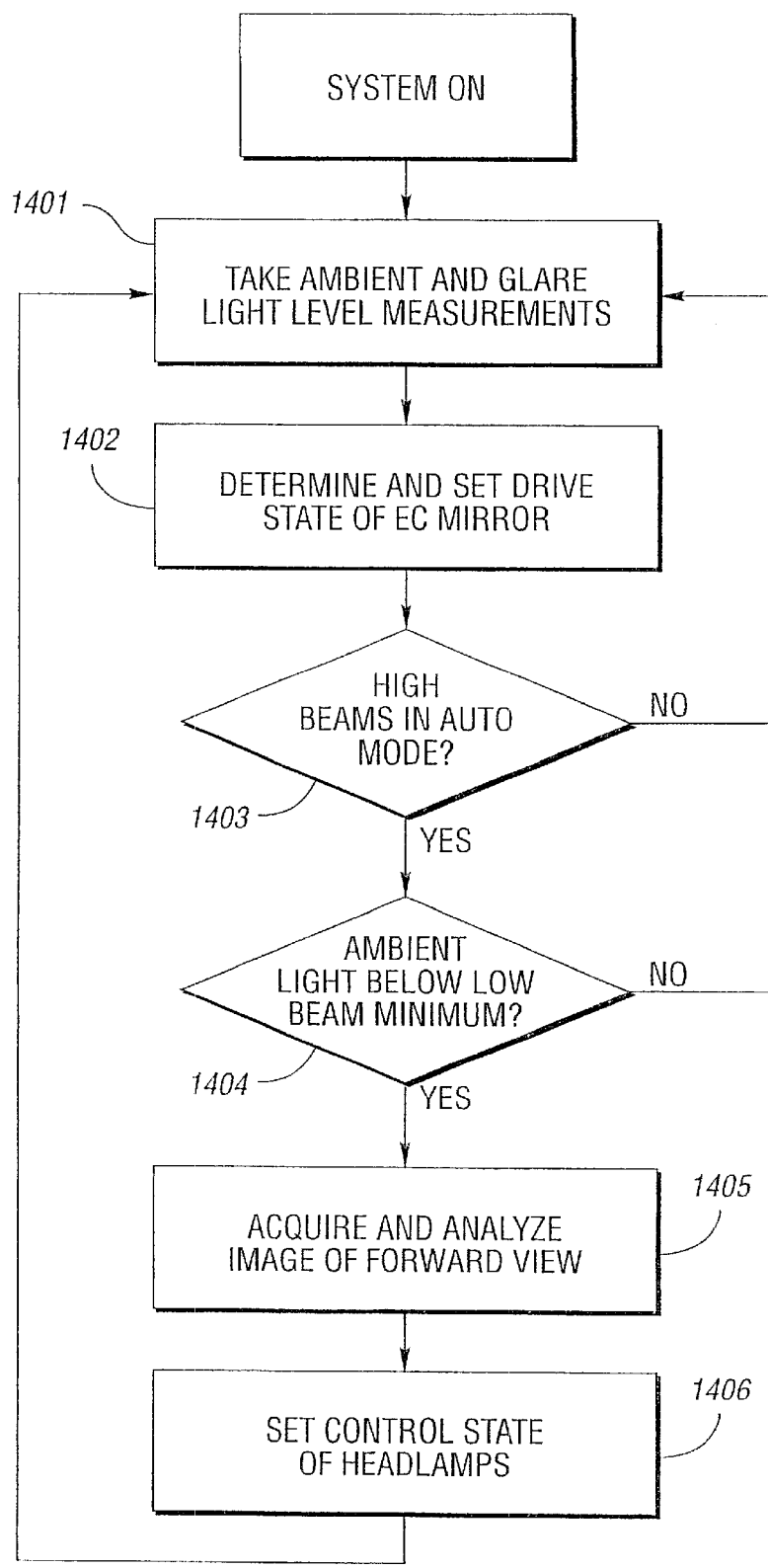
FIG. 14 is a flow chart illustrating operation of an electrochromic mirror and headlamp control.

The forward ambient light sensor 1107 and rear glare sensor 1109 measure the forward and rear light levels, as indicated in step 1401 (FIG. 14). The forward ambient measurement is used to control both the low beam and high beam headlamps 1131, 1132 and the electrochromic mirror 1102. The rear glare measurement is used for the control of the electrochromic mirror 1102 reflectivity. The forward ambient light level measurement is averaged with prior measurements to compute a forward time averaged ambient light level. This average light level is computed as the average of measurements taken over a 25–30 second interval. Responsive thereto, the microcontroller 1105 computes the control state for electrochromic element 1105 as a function of the light level measured by sensors 1107 and 1109 in step 1202. Where the microcontroller 1115 is a Hitachi H8S/2128 microcontroller, the electrochromic element drive state can be set by programming a pulse width modulated (PWM) duty cycle corresponding to the desired reflectance level of the electrochromic element into a pulse-width-modulated peripheral to the Hitachi H8S/2128 microcontroller. This PWM output is then fed to a series drive circuit. If the headlamps 1131, 1132 are not in auto mode as determined in step 1403, which is manually set responsive to the signal 1121, the microcontroller 1105 returns to step 1401, such that the microcontroller will continue to control the variable reflectance of the electrochromic element 1102. Decision 1403 provides the user with a manual override if the high beams are ON. Additionally, the high beam automatic control will be skipped in step 1403 (the decision will be NO) if the high beams are not ON.

If it is determined in step 1403 that the automatic mode is active, the microcontroller 1105 uses the average ambient light level measured in step 1401 to determine whether the ambient light level is below a low beam minimum threshold in step 1404. The threshold may for example be 1–3 lux, and in one implementation was 2 lux. If the ambient light level is above the threshold, indicating that high beam headlamps would not provide significant advantage, high beam control will not be used, and the microcontroller 1105 returns to step 1401. If the ambient light level is below the low beam minimum, for example below approximately 2 lux, the use of high beam headlamps may be desired. In this case, the microcontroller 1105 will operate to control the headlamps 1131, 1132. In addition to the average ambient light level discussed above it is also advantageous to consider the instantaneous ambient light level. Should the instantaneous ambient light level suddenly drop to a very low value, for example less than 0.5 lux, automatic high beam operation may begin immediately rather than waiting for the average ambient light level to reach the threshold for operation of the high beams. This situation may occur when a vehicle sitting under a well lit intersection suddenly crosses the intersection into a dark street where high beam operation is desired immediately. The microcontroller 1105 analyzes images of the forward scene acquired by image sensor 201 to detect the presence of oncoming or preceding vehicles as indicated in step 1405. Based upon the results of step 1405, the microcontroller sets the control state of the headlamps in step 1406. Setting the control state requires setting a duty cycle for the pulse drive in the preferred embodiment. The Hitachi H8S/2128 microcontroller includes timer/counter peripherals which can be used to generate pulse-width-modulated signals 1206 and 1207. In some vehicles, the low beam headlamps will always be on regardless of the state of the high beams. In such a vehicle, only the duty cycle of the high beams will be varied. Other vehicles will have the low beams OFF when the high beams are ON, in which case the duty cycle of the low beams will be reduced as the high beam duty cycle is increased. Control of the vehicle headlights using a PWM signal is disclosed in U.S. patent application Ser. No. 09/157,063, entitled CONTINUOUSLY VARIABLE HEADLAMP CONTROL, filed by Joseph Stam et al. on Sep. 18, 1998, the disclosure of which is incorporated herein by reference.

Figure 15:
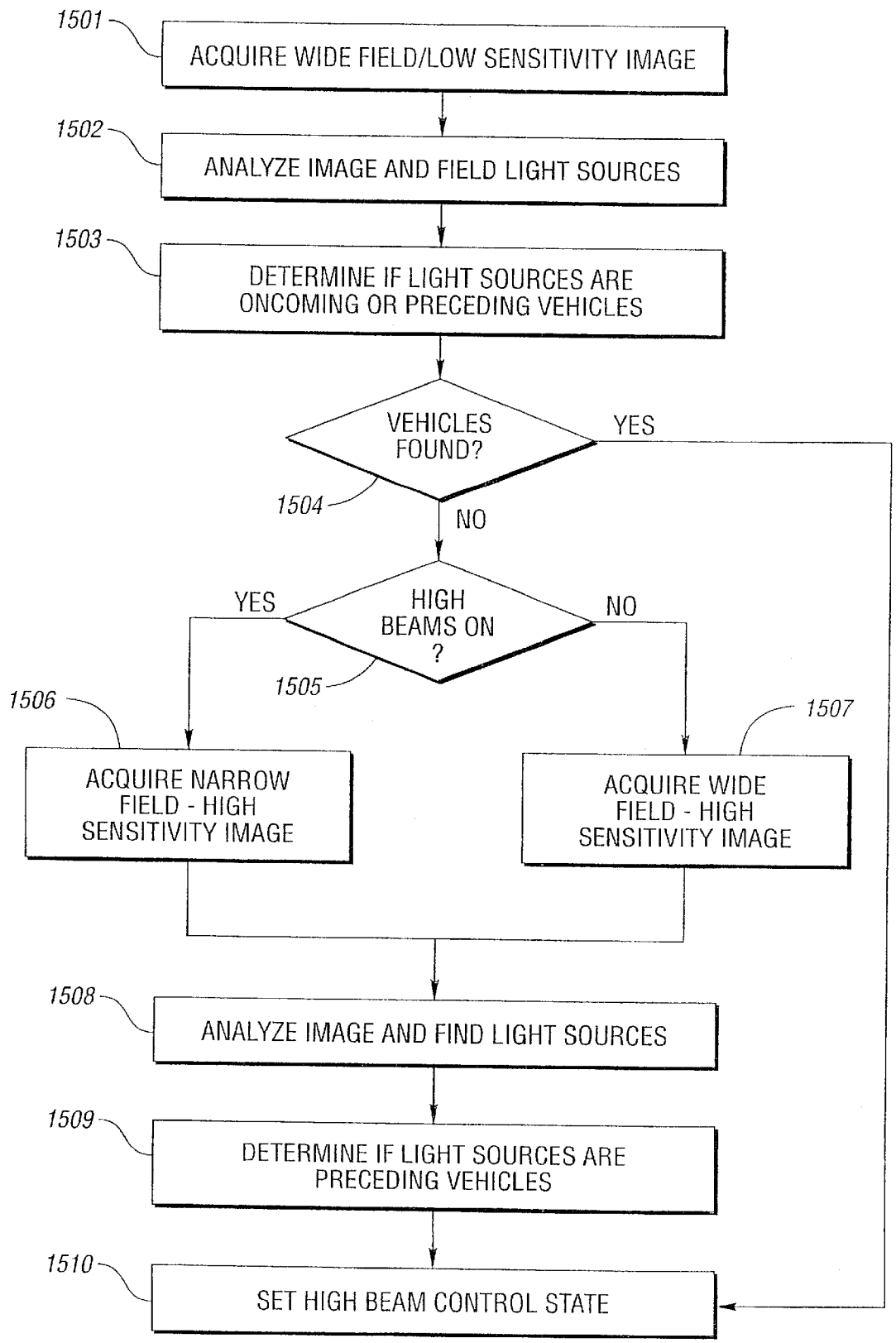
FIG. 15 is a flow chart illustrating operations to acquire and analyze an image.

Step 1405, which is the process of acquiring images in the forward field of the vehicle and analyzing such images, is described in greater detail with reference to FIG. 15. A first pair of images are acquired in step 1501 through both the red lens 209 and the cyan lens 208, corresponding to the two fields 702 and 703 shown in FIG. 7. The field of view of the resulting images are approximately 25 horizontally and 15 vertically using the 64 by 26 pixels, the lens optics, and the far field baffle described above. These images are taken at a low sensitivity. Sensitivity of the image sensor 201 may for example be dictated by the frame exposure time, the analog amplifier gain, and the DAC high and low references. The image sensor should be just sensitive enough to image oncoming headlamps at the maximum distance for which the controlled vehicle's headlamps should be dimmed. These images will be sufficient to detect oncoming headlamps at any distance of interest and nearby tail lamps without being washed out by bright headlamps or other noise light sources. In this mode, the sensor should not be sensitive enough to detect reflections off of signs or reflectors except in rare cases where the reflecting object is very near to the controlled vehicle. During dark ambient light conditions, this sensitivity will be low enough to detect only lighted objects.

The sensitivity of the image sensor when acquiring the images in step 1501 may also be varied according to whether the high beams are currently ON. When controlling high beams manually, a driver will typically wait until an oncoming vehicle 105 (FIG. 1) or a preceding vehicle 110 is almost close enough for the controlled vehicle's high beams to be annoying before dimming the headlamps 111. However, if the high beams are OFF, most drivers will not activate their high beam headlamps even if an oncoming vehicle 105 is at a great distance. This is in anticipation that the oncoming vehicle 105 will soon come within a distance where the controlled vehicle's high beam headlamps will annoy the oncoming driver, such that the driver of the controlled vehicle 100 will have to turn the high beams OFF shortly after they were activated. To partially mimic this behavior, a higher sensitivity image is acquired if the high beams are OFF, enabling detection of vehicles at a greater distance, than if the high beams are ON. For example, the image sensor when the high beams are OFF can have 50% greater sensitivity than when the high beams are ON.

The images are analyzed in step 1502 (FIG. 15) to locate any light sources captured in the images. In step 1503, the properties of the light sources detected are analyzed to determine if they are from oncoming vehicles, preceding vehicles, or other objects. If a light source from a preceding vehicle 110 is bright enough to indicate that the high beams should be dim, the control process proceeds to step 1510 and the high beam state is set.

If no vehicles are detected in step 1503, a second pair of images are taken through lens 208, 209 at a greater sensitivity. First, a determination of the state of the high beams is made in step 1505. This determination is made because the sensitivity of the second pair of images may be five to ten times the sensitivity of the first pair. With a higher sensitivity image, more nuisance light sources are likely to be imaged by the image sensor 201. These nuisances are typically caused by reflections off of road signs or road reflectors, which become much more pronounced with the high beams ON. When the high beams are ON, it is advantageous to limit the forward field of view to the area directly in front of the controlled vehicle such that it is unlikely that reflectors or reflective signs will be in the field of view. An ideal narrowed field of view is about 13 horizontally, which is achieved by a reduction of the width of regions 702 and 703 to about 35 pixels. If the high beams are OFF, an image with the same field of view as the low sensitivity images acquired in step 1501 can be used since the reflections of low beam headlamps off of signs and reflectors are much less bright than those when high beams are used. Thus, the decision step 1505 is used to select either a narrow field of view image in step 1506 or a wide field of view in step 1507. For either field of view, a pair of images will be taken. As described above with respect to the acquisition of low sensitivity images in step 1501, the sensitivity of the high sensitivity images may also be varied according to the state of the high beam headlamps to provide additional control in avoiding nuisance light sources.

As with the low sensitivity images, the high sensitivity images are analyzed to detect light sources in step 1508. A determination is made if any of these light sources represent a vehicle close enough to the controlled vehicle to require dimming of the high beam headlamps.

Additional images, with greater sensitivity and/or different fields of view, may be acquired in addition to those mentioned above. Additional images may be necessary depending on the dynamic range of the image sensor. For example, it may be necessary to acquire a very high sensitivity image with a very narrow field of view to detect a preceding car's tail lamps at a great distance. Alternatively, should the image sensor have sufficient dynamic range, only one pair of images at one sensitivity may be needed. It is advantageous to use three sets of images, a low sensitivity set, a medium sensitivity set, and a high sensitivity set. The medium sensitivity set has about 5 times the sensitivity of the low gain and the high gain has about 20 times the sensitivity of the low gain. The low gain image set is primarily utilized for detection of headlamps while the medium and high gain images are primarily utilized for detection of taillamps.

Depending on the quantum efficiency of the image sensor at different wavelengths of light, and the filter characteristics of the filters used for the lens elements 208 and 209, it may be advantageous to use a different sensitivity for the two regions 702 and 703. The timing and control circuitry 309 described in the U.S. Pat. No. 5,990,469 can be enhanced to provide the capability to acquire two different windows of pixels simultaneously and use different analog gains for each window. This is accomplished by adding a register which contains the gain values for the analog amplifier used during acquisition of each subwindow. In this way, the relative sensitivity of the two regions can be automatically balanced to provide a similar output when a white light source is imaged through both lens elements. This may be of particular advantage if the image for region 703 is acquired without filtering the light rays, for example by using a clear lens instead of a cyan filter for rays passing through lens element 208. For this lens set, the pixels in region 702 will receive approximately 3 times as much light when imaging a white light source as those pixels in region 703 which receive light that has passed through a red filter. The analog gain can be set 3 times as high for pixels in red filtered region 703 to balance the output between the two regions.

Figure 16:
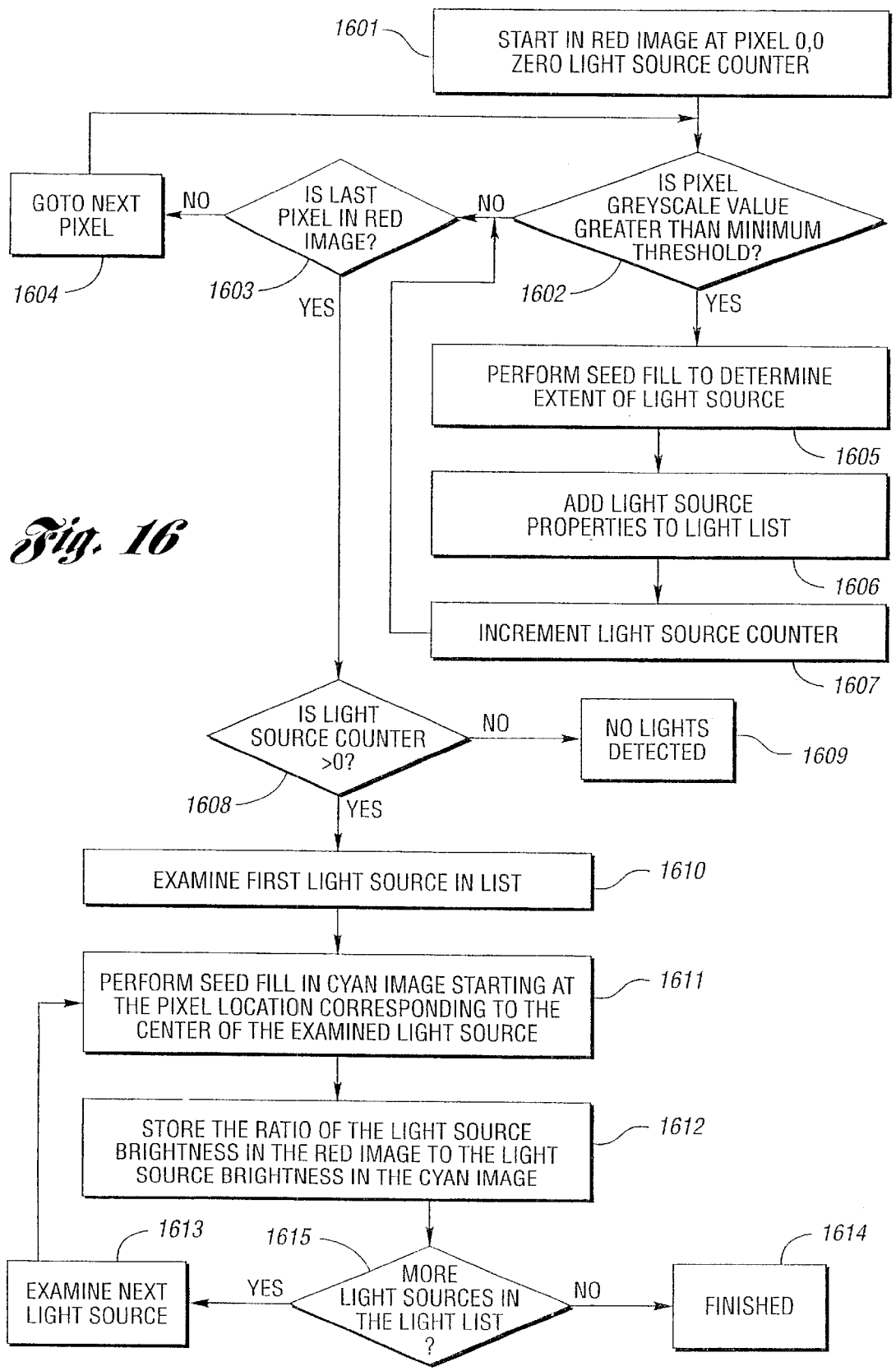
FIG. 16 is a flow chart illustrating operations to analyze an image and find a light source.

The analysis of images to detect light sources indicated in steps 1502 and 1508 is described with reference to FIG. 16. Analysis begins with the image in region 703 acquired through the red lens. It is advantageous to begin with the red filtered image because several nuisance light sources do not admit a significant amount of red light. These nuisance light sources include mercury vapor streetlights, green traffic lights, and reflections off of green and blue highway signs. Therefore, a number of potential nuisance light sources are eliminated from consideration. Pixel locations are referred to by X and Y coordinates with the 0,0 pixel location corresponding to a top left pixel. Beginning with the 0,0 pixel 1401 and raster scanning through the image, each pixel is compared to a minimum threshold in step 1602. The minimum pixel threshold dictates the faintest objects in the image that may be of interest. If the current pixel is below the pixel threshold and it is not the last pixel in the red image window, as determined in step 1603, analysis proceeds to the next pixel as indicated in step 1604. The next pixel location is determined by raster scanning through the image by first incrementing the X coordinate and examining pixels to the right until the last pixel in the row is reached, and then proceeding to the first pixel in the next row.

If it is determined that the current pixel value is greater than the minimum threshold, a seed fill analysis algorithm is entered in which step the size, brightness and other parameters of the identified light source are determined as indicated in step 1605. The seed fill algorithm is used to identify the pixels of the image sensor associated with a common light source, and thus identify associated pixels meeting a pixel criteria. This can be accomplished by identifying contiguous pixels exceeding their respective threshold levels. Upon completion of the seed fill algorithm, the properties of the light source are added to the light source list in step 1606 for later analysis (steps 1503 and 1509 in FIG. 15) to determine if certain conditions are met, which conditions are used to identify whether the light source represents an oncoming or preceding vehicle. A counter of the number of sources in the list is then incremented as indicated in step 1607. The microcontroller then goes to step 1603.

If it is determined in step 1603 that the last pixel in the red image has been examined, the microcontroller 1105 determines whether any light sources were detected, as indicated in step 1608. If no light source is detected, the analysis of the image terminates as indicated at step 1609. If one or more light sources are detected through the red lens 209, the cyan or clear image window 702 is analyzed to determine the brightness of those light sources as imaged through the other lens 208, in order to determine the relative color of the light sources. In this situation, the "brightness" of the sources refers to the sum of the grey scale values of all the pixels imaging the source; a value computed by the seed fill algorithm. The first source on the list is analyzed in step 1610. A seed fill algorithm is executed in step 1611, with the cyan image starting with the pixel having the same coordinates (relative to the upper left of the window) as the center of the light source detected in the red image. In this manner, only those pixels identified with a light source viewed through the lens associated with the red filter will be analyzed as viewed through the other filter, which is advantageous, as many nuisance light sources which would otherwise be analyzed when viewed through a clear or blue filter will be removed by the red filter. By only considering light sources identified through the red filter, the amount of memory required to store information associated with light sources viewed through the other filter will be reduced. The ratio of the brightness of the source in the red image 703 to the brightness of the source in the other image 702 is stored in the light list, as indicated in step 1612, along with the other parameters computed in step 1605 for the current light source. This procedure continues for other sources in the light list 1613 until the red to cyan ratios are computed for all sources in the list 1615, at which point the analysis terminates at step 1614.

It will be recognized that where it is desirable to count the number of light sources to determine the type of driving environment, and in particular to identify city streets or country roads, it may be desirable to count all of the light sources viewed through the cyan or clear filter. In this way, nuisance light sources can be counted. Alternatively, the number of light sources viewed through the red filter can be counted for purposes of inhibiting turning ON the high beams if a threshold number of sources are identified.

Figure 17A:
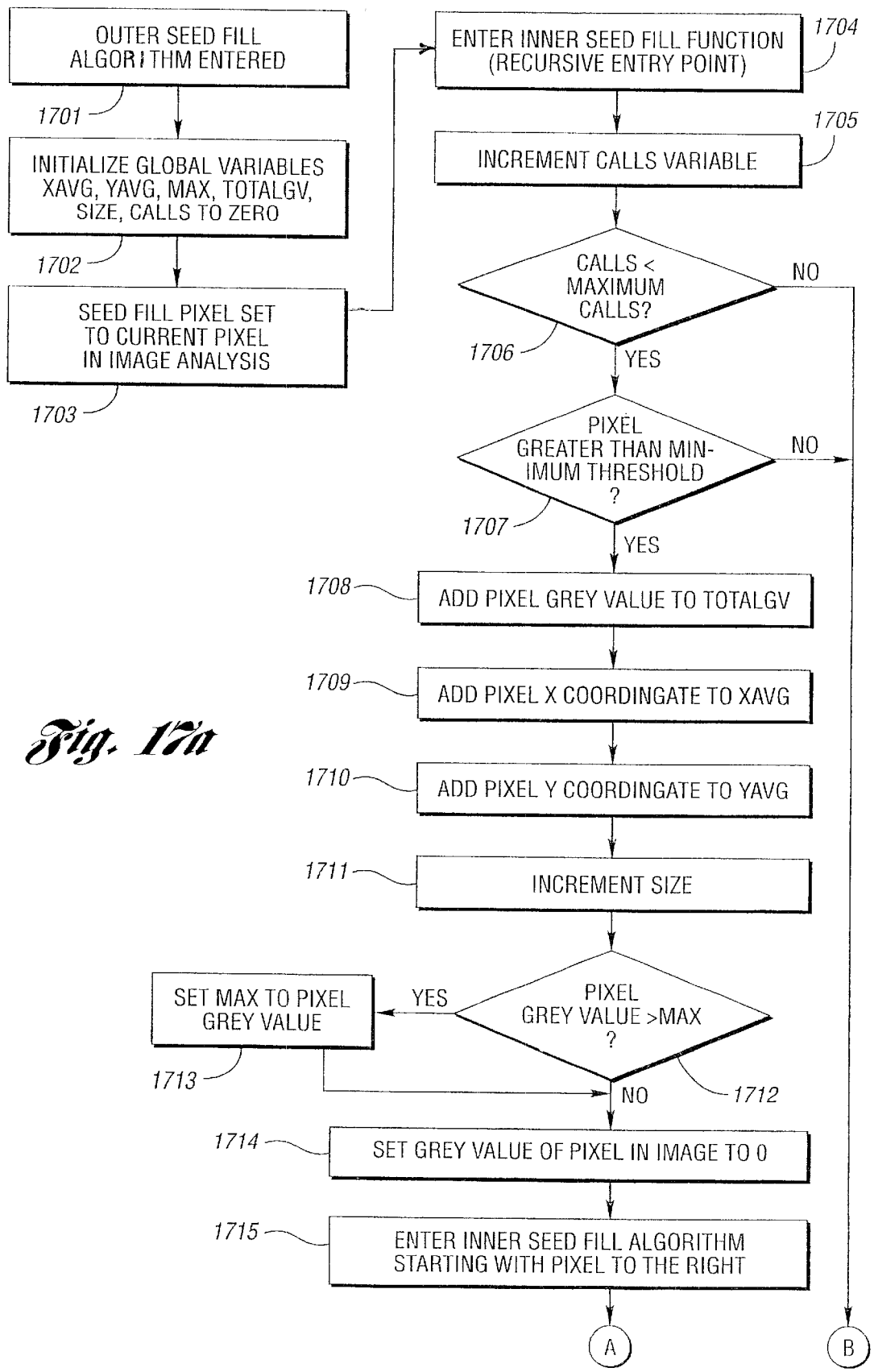
FIGS. 17a and 17b are a flow chart illustrating a seed fill algorithm.
Figure 17B:
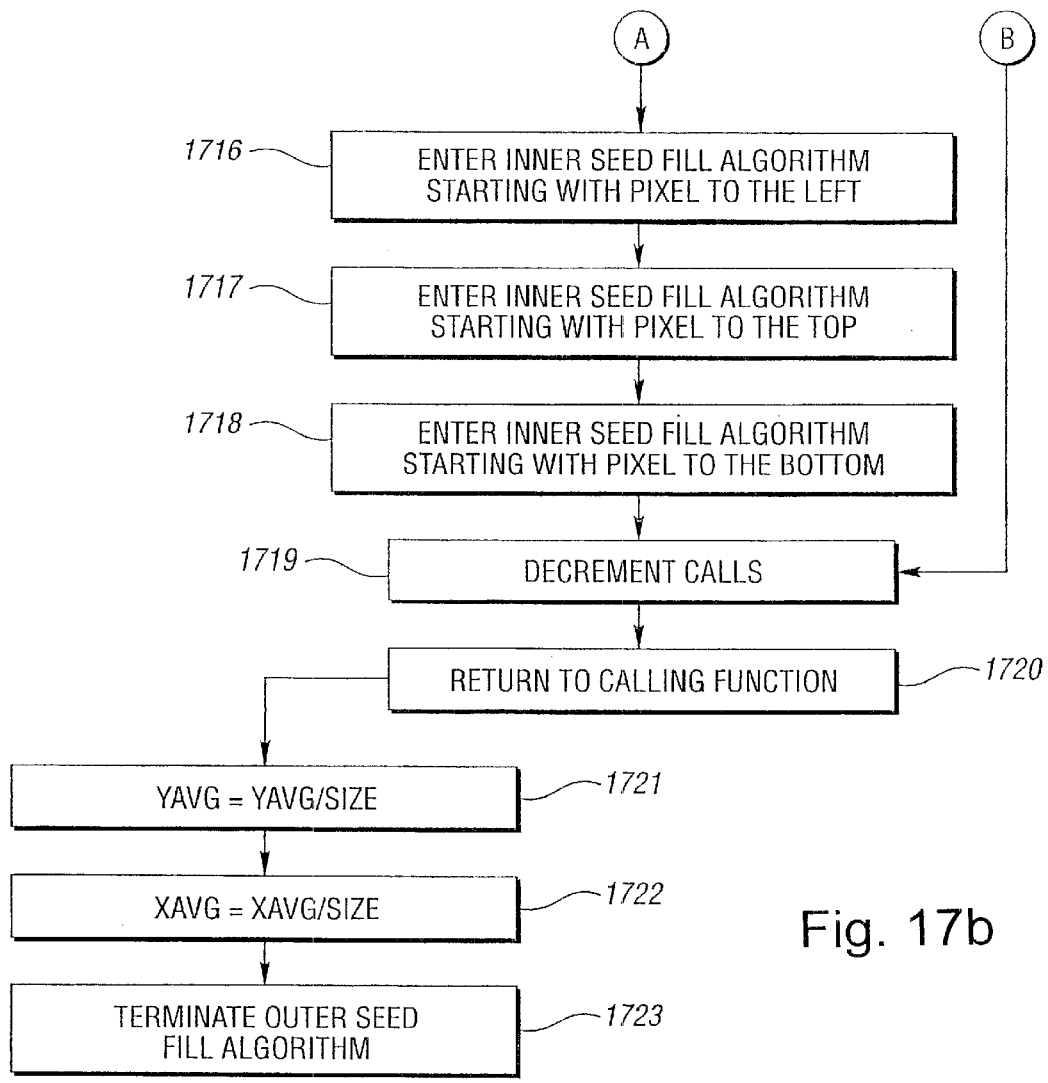

The seed fill algorithm used in steps 1605 and 1611 is shown in FIGS. 17*a* and 17*b*. The outer section of the seed fill algorithm is entered with the current pixel value at step 1605. The outer section of the seed fill algorithm is executed only once at each step 1605, while the inner recursive seed fill algorithm is entered many times until all contiguous pixels meeting a pixel criteria are identified. After the entry step 1701 of the outer section of the seed fill algorithm, several variables are initiated as indicated in step 1702. The variables XAVG and YAVG are set to zero. These variables will be used to compute the average X and Y coordinates of the pixels imaging a light source, which average coordinates will together correspond to the center of the light source. The TOTALGV variable is used to sum the grey scale values of all the pixels imaging the source. This value will define the brightness of the source. The SIZE variable is used to tally the total number of pixels imaging the source. The MAX variable stores the maximum grey scale value of any pixel imaging the source. A CALLS variable is used to limit the number of recursive calls to the recursive inner seed fill function to prevent memory overflow as well as for tracking.

The inner seed fill algorithm is first entered in step 1703. The start of the inner recursive seed fill function for the first and subsequent calls to the seed fill function is indicated by block 1704. The first step in the inner seed fill function is to increment the CALLS variable as indicated in step 1705. Next, microcontroller 1105 determines if the CALL variable is greater than the maximum allowable number of recursive calls as determined in step 1706. The number of recursive calls is limited by the amount of memory available for storing light source information. If it is determined that the number of recursive calls exceeds the threshold, the recursive function proceeds to step 1719, wherein the counter is decremented and then returns to the step from which the recursive function was called. Should this occur, a flag is set indicating that the current light source had too many recursive calls and parameters computed by the seed fill algorithm will be incorrect. This prevents too many levels of recursion from occurring which would overflow the memory of the microcontroller.

If the decision in step 1706 is that the CALL variable is not greater than the maximum allowable, the microcontroller 1105 next compares the current pixel with a minimum grey scale threshold in step 1707 to determine if the pixel is significantly bright to be included in the light source. The threshold considered in step 1707 can be constant or vary by position. If it varies, the variable thresholds may be stored in a spatial look-up table having respective pixel thresholds stored for each pixel, or each region of the image sensor. Where the threshold is variable by position, it is envisioned that where a pixel at one location exceeds its associated pixel threshold, the controller can continue to use that threshold for adjacent pixels while searching for a contiguous group of pixels associated with a single light source, or the controller can continue to use the respective pixel thresholds stored in the special look-up table.

If the decision step 1707 is not met, this inner recursive seed fill function terminates by advancing to step 1719. If the pixel has a high enough grey scale value as determined in step 1707, it's grey scale value is added to the global TOTALGV variable 1708, its X and Y coordinates are added to the XAVG and YAVG variables 1709 and 1710, and the size variable is incremented in step 1711. If the grey value of the pixel is greater than any other pixel encountered in the current seed fill, as determined in step 1712, the MAX value is set to this grey scale value 1713.

Following a no decision in step 1712, the grey scale value of the pixel is set to 0 to prevent further recursive calls from including this pixel. If a future recursive call occurs at this pixel, and the pixel is not zeroed, the pixel will be added the second time through. By zeroing the pixel, it will not be added again as the pixel's grey scale value is no longer greater than the minimum threshold. Additionally, this pixel will be ignored in step 1602 should it be encountered again while scanning the image during analysis.

The inner recursive seed fill algorithm next proceeds to recursively call to itself until it has looked to the right, left, above and below each pixel until all of the contiguous pixels exceeding the minimum pixel threshold value in decision step 1707 are considered. Step 1715 represents returning to step 1704 for the pixel to the right. The microcontroller will continue to move to the right until it reaches a pixel that does not meet the criteria of decision step 1706 or 1707. Step 1716 represents returning to step 1704 for the pixel to the left. Step 1717 represents returning to step 1704 to look at the pixel above. Step 1718 represents returning to step 1704 to look at the pixel below. The microcontroller will then look at the pixel to the left of the last pixel that did meet decision step 1707. The processor will look at pixels adjacent each pixel exceeding the threshold of step 1707 should the neighboring pixels exist (i.e., the immediate pixel is not an edge pixel). Step 1719 decrements the CALLS algorithm each time it occurs, and the microcontroller will return to the calling program until the CALLS value reaches 0. Returning to the function that called it may be another instance of the inner recursive function, or should this be the initial pixel examined, to the outer recursive algorithm 1721.

Figure 17C:
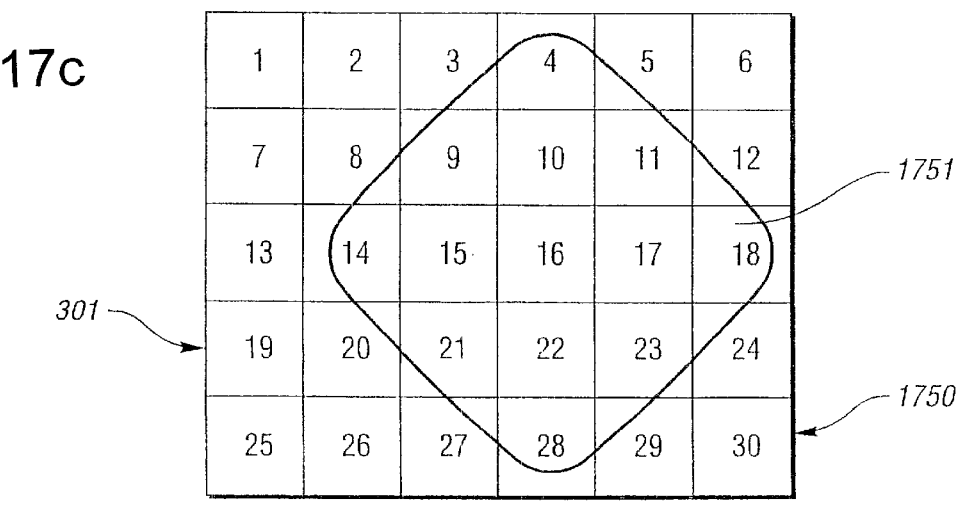
FIG. 17c illustrates a pixel array impacted by a light source.

An example of how the inner and outer seed fill algorithms operate will now be described with reference to FIG. 17c. The example is made with respect to an exemplary very small image sensor having 30 pixels. Pixels 4, 9, 10, 11, 14, 15, 16, 17, 18, 21, 22, 23, and 28 exceed the threshold in step 1707 in this example. Additionally, the number of calls required does not exceed the threshold in step 1706. The image array 302 is impacted by a light source 1751, indicated by contour 1751. The microcontroller will operate as follows in evaluating the pixels. For pixel 1, the microcontroller 1105 will enter the seed fill algorithm at step 1701, initialize the variables in step 1702, set the current pixel in step 1703. The microcontroller will next enter the inner seed fill function in step 1704. The CALLS variable will be incremented to 1 in step 1705, which is below the Maximum Calls threshold. Because there is no light on the pixel the minimum threshold is not exceeded and the microcontroller will got to step 1719, decrement the CALLS variable in step 1720, and because this is the first time through the inner seed fill program, the microcontroller will continue to steps 1721–1723. The process will be repeated for pixels 2 and 3, which are both below the minimum pixel threshold used in step 1707.

When the microcontroller gets to pixel 4, it will enter the outer seed fill at step 1701, set the variables to zero in step 1702, set the current pixel to pixel 4 in step 1703, and enter the inner seed fill algorithm. The CALLS variable will be incremented to 1, as it is the first pixel in this outer seed fill. The CALLS variable will be less than the Maximum Calls threshold and the pixels grey value will exceed the minimum threshold. Accordingly, the grey value will be added to TOTALGV, the pixel coordinates will be added to those that will be considered for XAVG and YAVG, and the SIZE will be incremented such that the size will be 1. The grey value for pixel 4 will be the MAX, as it is the only grey value in this outer seed fill. The grey value will be set to zero for pixel 4 in step 1714.

The microcontroller will then identify all of the contiguous pixels that exceed the threshold set in step 1707. In particular, through the inner seed fill routine disclosed in FIGS. 17a and 17b, the microcontroller will add the pixels as follows. Pixel 4, added first as it is the first with a grey value greater than the threshold ("the threshold" in this paragraph referring to the minimum threshold in step 1707). The program then calls the recursive function for pixel 5 to the right, which is not added as it is below the threshold (as used in this paragraph, "added" means the pixel's coordinates are added to XAVG and YAVG, the pixel's grey value is added to TOTALGV, SIZE is incremented, and the pixel's grey value becomes the maximum pixel grey value if it exceeds MAX). Pixel 3 to the left is called next, and is not added for the same reason. There is no pixel above pixel 4. Accordingly, the recursive function is next called for pixel 10 in step 1718. Pixel 10 will be added as its value is greater than the threshold. The microcontroller 1105 will then look to the right of pixel 10, namely at pixel 11, which is greater than threshold, so it will be added. The microcontroller will then look to the right of pixel 11, which is pixel 12. Pixel 12 will not be added as its grey value is below the threshold. Looking to the left of pixel 11, pixel 10 won't be added as it was zeroed when it was added previously. Looking above pixel 11, pixel 5 won't be added. Looking below pixel 11, pixel 17 will be added. Next, the recursive routine will be called for the pixel to the right of pixel 17. Pixel 18 will be added. Moving on to the recursive routine for pixel 18, there is no pixel to the right of pixel 18. Looking to the left of pixel 18, pixel 17 won't be added as it was zeroed when it was added. Looking above pixel 18, pixel 12 won't be added. Looking below pixel 18, pixel 24 wont be added as it is below the threshold. Moving back to the previous recursive function that was not exhausted, the microcontroller 1105 will move back and look to the left of pixel 17, which is pixel 16. Pixel 16 is added. Calling the recursive function again, the microcontroller will look to the right of pixel 16. Pixel 17 will not be added as was cleared after it was previously added. Looking to the left of pixel 16, pixel 15 is added. Calling the recursive function from pixel 15, the microcontroller will look to the right at pixel 16. Pixel 16 is not added, as it was zeroed after it was previously added. Looking to the left, pixel 14 is added. Calling the recursive function from pixel 14, the microcontroller will look to the right at pixel 15 which will not be added. Looking to the left of pixel 14, pixel 13 is not added. Looking above pixel 14, pixel 8 is not added. Looking below pixel 14, pixel 20 is not added. Moving back to the function that called the recursive function for pixel 14, the microcontroller will look above pixel 15 at pixel 9. Pixel 9 is added. Calling the recursive function for pixel 9, looking to the right pixel 10 is not added. Moving to the left, pixel 8 is not added as it is below the threshold. Looking above, pixel 3 is not added. Looking down, pixel 15 is not added as it was previously cleared. Moving back to the function that called the recursive function for pixel 9 has the microcontroller looking at the pixel below pixel 15. Pixel 21 is then added. Starting the recursive function for pixel 21, looking to the right pixel 22 is added. Starting the recursive function for pixel 22, pixel 23 is added as it exceeds threshold. Starting the recursive function for pixel 23, pixel 24 is not added as it is below threshold. Moving to the left, pixel 22 is not added as it was zeroed. Looking above, pixel 17 is not added as it was zeroed after it was added. Looking down, pixel 29 is not added as it is below the threshold. Moving back to the function that called the recursive function for pixel 23, has the microcontroller 1105 looking to the left of pixel 22. Pixel 21 is not added as it was not clear. Looking above pixel 22, pixel 16 is not added. Looking below pixel 22, pixel 28 is added. Performing the recursive function for pixel 28, pixel 29 to the right is not added, pixel 27 to the left is not added, pixel 22 above is not added, and there is no pixel below pixel 28. Moving back one function, the recursive function for pixel 22 was completed, so the microcontroller returns to pixel 21. Looking to the left of pixel 21, pixel 20 is not added. Pixel 15 above pixel 21 is not added and pixel 27 below pixel 21 is not added. The recursive function for pixel 15 was exhausted, so the microcontroller looks above pixel 16 to pixel 10 which is not added. Looking below pixel 16, pixel 22 is not added. Moving back one function has the microcontroller looking above pixel 17 at pixel 11, which is not added. Looking below pixel 17, pixel 23 is not added. The recursive function for pixel 11 was completed, the microcontroller returns to the last non-exhausted pixel of the contiguous lighted pixels. The microcontroller looks to the left of pixel 10, and pixel 9 is not added. The microcontroller looks above pixel 10, and pixel 4 is not added. Looking below, pixel 16 is not added. The inner seed fill is complete.

After the last pixel is added, YAVG, XAVG and size are used to select the center of the light in steps 1722 and 1723.

The seed fill scheme just described is the preferred seed fill algorithm for analysis of the red image 703. It requires some modification for the other image 702. This need can be seen from the following example. Where a pair of oncoming headlights is identified as two separate lights in the red image, it is possible that these sources may contain more light in the blue half of the spectrum than the red half (as is the case with High Intensity Discharge headlamps). In this case what was detected as two separate light sources in the red image can bloom into one source in the cyan image. Thus, there would only be one source in the cyan image to correspond to two light sources in the red image. After step 1611 is completed for the first source in the red image, the bloomed cyan image pixels would have been cleared in step 1714, such that they would not be available for the analysis of the second light source in the red image. Thus, after the source in the cyan image is determined to correspond to the first source in the red image, there would be no source on the cyan image to correspond to second source in the red image. To prevent this, it is useful to preserve the image memory for the cyan image rather than setting the grey value to zero as in step 1714 so that the bloomed source is detected as corresponding to both of the sources in the red image.

Since the red image has already been processed, the memory that stored the red image can be used as a map to indicate which pixels in the blue image have already been processed. All pixels in the red image memory will have been set to grey scale values less than the minimum threshold as a result of the processing. The pixels that were identified as light sources where zeroed whereas the light sources that were not cleared will have some low grey value. This characteristic can be used to set the pixels in the red image memory to serve as markers for processing pixels in the cyan image. In particular, when the seed fill algorithm is executed for the cyan image, step 1714 is replaced by a step that sets the value of the pixel in the red image memory corresponding to the currently analyzed cyan pixel to a marker value. This marker value could be, for example, 255 minus the index of the current light source in the light list. The number 255 is the largest value that can be stored for a grey scale value. In this way, there will be a unique marker stored in the red image memory for pixels analyzed each time step 1611 is executed for a light on the list. In addition to the above change to step 1714, a test must be added after step 1707 to determine if the value of the pixel stored in the red image memory corresponding to the currently analyzed pixel is equal to the marker value for the current light source index, indicating that this pixel has already been recursively visited, in which case the microcontroller would go to step 1719.

Figure 18:
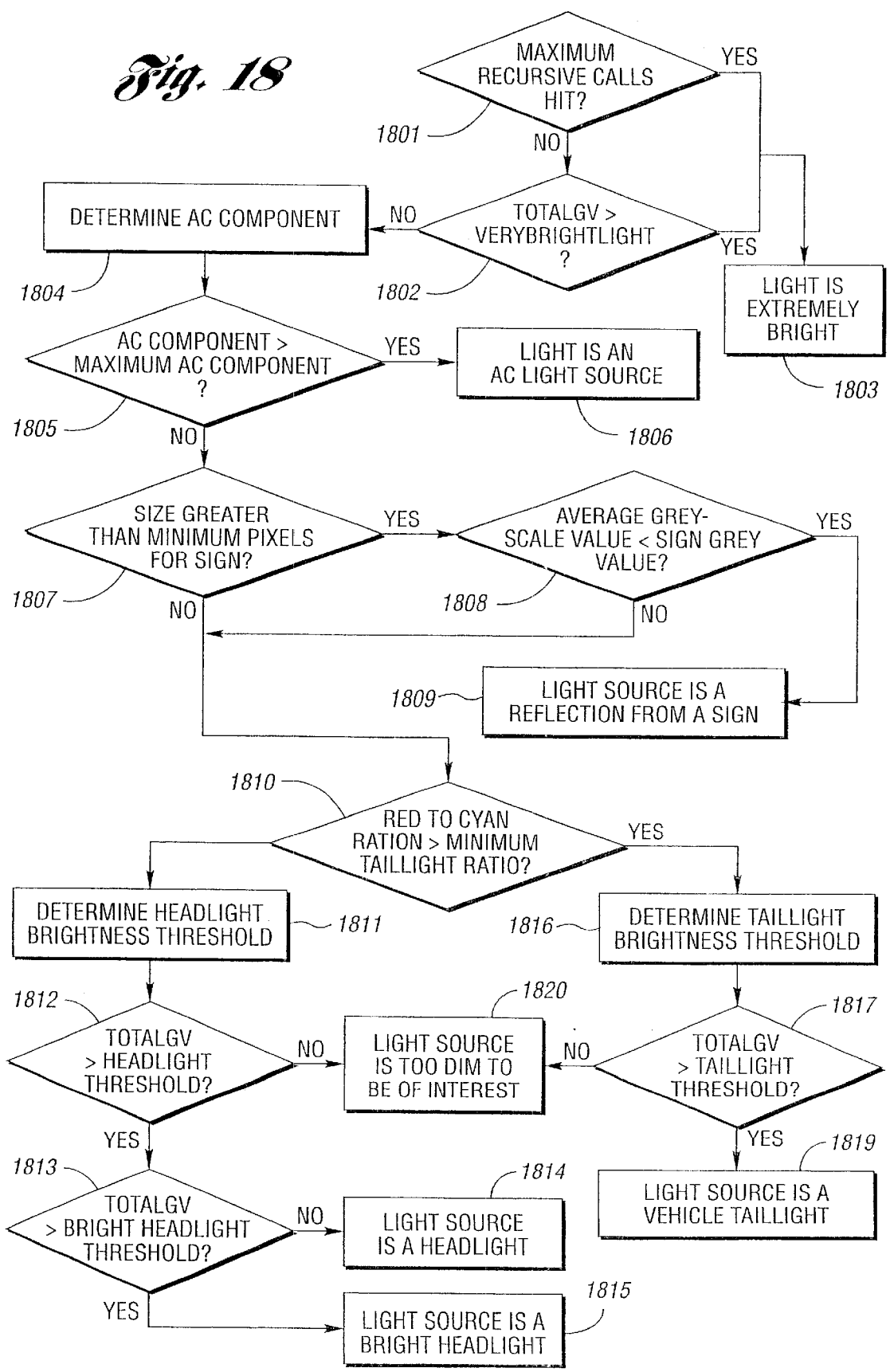
FIG. 18 is a flow chart illustrating operation to determine if light sources are oncoming or preceding vehicles.

Steps 1501 and 1502 for the red image in region 703 and corresponding steps 1506, 1507 and 1508 for the other image in region 702, have now been explained in detail. In step 1503 and 1509, the light source list is analyzed to determine if any of the identified light sources indicate the presence of an oncoming or proceeding vehicle. FIG. 18 is a flow diagram of the series of tests applied to the information gathered on each light source in the light list during the previous analysis steps to determine the type of light source. The tests in FIG. 18 are applied to each source in the list independently.

First, a check is made to see if the recursive seed fill analysis of this light source exceeded the maximum number of subsequent recursive calls allowed as determined in step 1801. If so, the light source is labeled an extremely bright light in step 1803 since the number of pixels in the source must be large to cause a large number of subsequent recursive calls. Next, if the TOTALGV variable is compared to a very-bright-light-threshold 1802. If TOTALGV exceeds this threshold, the light is also labeled an extremely bright in step 1803.

If neither of the conditions 1801 or 1802 are met, the light source is analyzed to determine if it has it a 60 Hz alternating current (AC) intensity component, indicating that the light source is powered by an AC source, in step 1804, to distinguish it from vehicles which are powered by DC sources. Many streetlights, such as high-pressure sodium and mercury vapor lights can be effectively distinguished from vehicle headlamps in this way. To detect the AC component, a series of eight 3×3 pixel images are acquired at 480 frames per second, for example. The 3×3 pixel window is centered on the center of the light source being investigated. The sums of the nine pixels in each of the 8 frames are stored as eight values. These eight values represent the brightness of the source at ¼ cycle intervals over two cycles. The magnitude of the 60 Hz Fourier series component of these eight samples can be computed by the following formula:

$$AC = (A^2 + B^2)^{1/2}$$

$$A = 1.0*(F1 - F\text{MIN}) + (-1.0)*(F3 - F\text{MIN}) + 1.0*(F5 - F\text{MIN}) + (-1.0)*(F7 - F\text{MIN})$$

$$B = 1.0*(F0 - F\text{MIN}) + (-1.0)*(F2 - F\text{MIN}) + 1.0*(F4 - F\text{MIN}) + (1.0)*(F6 - F\text{MIN})$$

where F1 to F7 refer to the eight summed grey scale values of each of eight frames and FMIN refers to the minimum value of F1 through F7. The value AC is divided by the mean grey value of F1 to F8 to give the AC component of interest in step 1804. The scheme is of particular convenience since the sampling rate is exactly four times the frequency of modulation analyzed. If this were not the case, the coefficients for each of F1 through F7 would have to be changed to accommodate this. Additionally, if the system were to be used in countries were the AC power is not at a 60 Hz frequency, the sampling rate or coefficients would be adjusted.

While the AC detection scheme is described for only one window, it is advantageous to perform the above analysis by imaging the source through both the cyan and red filters, or the red and clear filters, and then using the maximum computed AC component from the two sample sets to determine the AC component for step 1804. This allows for accurate measurement of sources that have either strong short or long wavelength components in their spectrum. If the light source AC component is greater than the minimum threshold as determined in step 1805, the light source is determined to be an AC source as indicated in step 1806.

The next step is to distinguish light sources which are reflections off of road signs or other large objects. Road signs are large compared to the size of the headlamp or tail lamp. As a result, they tend to be imaged onto many more pixels than a vehicle lamp, unless the lamp is so bright as to bloom in the image. Sign reflection sources may have a large number of pixels, indicated by the SIZE variable, but a lower average grey scale value than vehicle lamps which have a much higher intensity. If the SIZE variable exceeds a given size threshold as determined in step 1807, the average grey value (TOTALGV/SIZE) is compared against an average pixel level threshold, which is the maximum sign average grey value, in step 1808. If the average grey scale value is less than this threshold, the light source is determined to be a reflection off of a sign as indicated in step 1809.

An additional check for yellow signs, which typically occur in the front of the vehicle when turning through a curved road, is to measure the color of bright objects and determine if they are likely yellow. Even when using the low gain image the reflection off of a nearby sign may saturate several pixels are both subwindows and make relative color discrimination difficult. However, the same high-speed images acquired when performing an AC validation can be used to accurately determine the relative color even for bright images. This is accomplished by looking at the average value of the F1 through F7 frames mentioned herinabove through each lens. The ratio of the average of the F1 to F7 frames viewed through the red lens to the average of the F1 through F7 frames viewed through the cyan or clear lens is computed. This ratio will be higher for yellow signs than for white lights but not as high as for tail lamps. If this ratio is within a certain range indicating that it is likely a yellow sign, this object can be ignored or the threshold for dimming for this object can be decreased, allowing only extremely bright yellow objects to dim the high beams. By allowing the system to respond to bright yellow objects by dimming the high beams, the headlight dimmer will respond to a light source in the event that a headlamp is misdiagnosed as a yellow sign.

Once potential nuisance sources are filtered out, the light source can be identified as a headlamp or a tail lamp. The red to cyan ratio computed in step 1612 is used to determine if the source has sufficient red component to be classified as a tail lamp in step 1810. If this ratio is lower than a tail lamp redness threshold, control proceeds to step 1811, where the threshold for consideration as a headlamp is determined. This threshold can be determined in the number of ways, but the most convenient method is to use a two dimensional look-up table if the microcontroller has sufficient read-only memory (ROM) to accommodate the table, as is the case with the Hitachi H8S/2128 exemplified herein.

The center of the light source is used as the index into the look-up table to determine the threshold. The look-up tables are created to provide different threshold for different regions of the field of view. For example, the thresholds for regions of the field of view directly in front of the vehicle are lower than those used for regions off to the side. The look-up table can be optimized for the particular vehicle's high been emission pattern to determine how annoying the high beams will be to oncoming and preceding traffic and various angles. Ideally the look-up table used when the vehicle's high beams are activated is different than when they are not. When high beams are off, the thresholds to the side of the vehicle can be lower than they are when high beams are activated. This will prevent the high beams from coming ON when there is a vehicle in front of, but off at an angle to, the controlled vehicle, such as happens when on a curve on an expressway. Also, different lookup tables are used for high and low sensitivity images for much of the same reasons. In fact, the lookup tables may indicate that for certain regions, or all regions of the field of view in high sensitivity image, that head lamps be ignored completely. A high sensitivity image is only analyzed if the low sensitivity did not detect oncoming or preceding vehicles, so non-red light sources in a high sensitivity image are most likely very distant headlamps or nuisance sources. Therefore the high sensitivity images may only be analyzed for red sources.

In step 1812, the TOTALGV variable, which is the total pixel level, is compared to the threshold total pixel level for headlights as determined from the appropriate look-up table. If this variable is greater than the threshold, the value is compared to the threshold multiplied by a bright multiplier in step 1813. If TOTALGV is greater than this value, the light source is determined to be a bright headlamp in step 1815. If not the light source is a headlamp as indicated in step 1814. The need to distinguish between headlamps and bright headlamps will become clearer in the discussion of the control state of the headlamps. As an alternative to comparing TOTALGV to a threshold times a bright multiplier, yet another look-up table can be provided to dictate thresholds for bright head lamps A procedure similar to that just described is performed in step 1816 if the light source is determined to be red. A series of lookup tables are provided for taillight thresholds and the appropriate lookup table is used to determine the threshold for the given light source location. In 1817 the total pixel level for taillight threshold is compared to the TOTALGV variable to determine to light sources bright enough to be of interest. If so, the light source is labeled as a tail light in step 1819. If not, the light source is ignored in step 1820.

Should the cyan lens element 301 be replaced by a clear lens, a different ratio threshold is used in step 1810. In this case, a red light will have approximately the same brightness in both images, but a white or other color light will be substantially brighter when imaged through the clear lens. This ratio is determined based on the analog gain settings for both the red and cyan (or clear) images.

Figure 19:
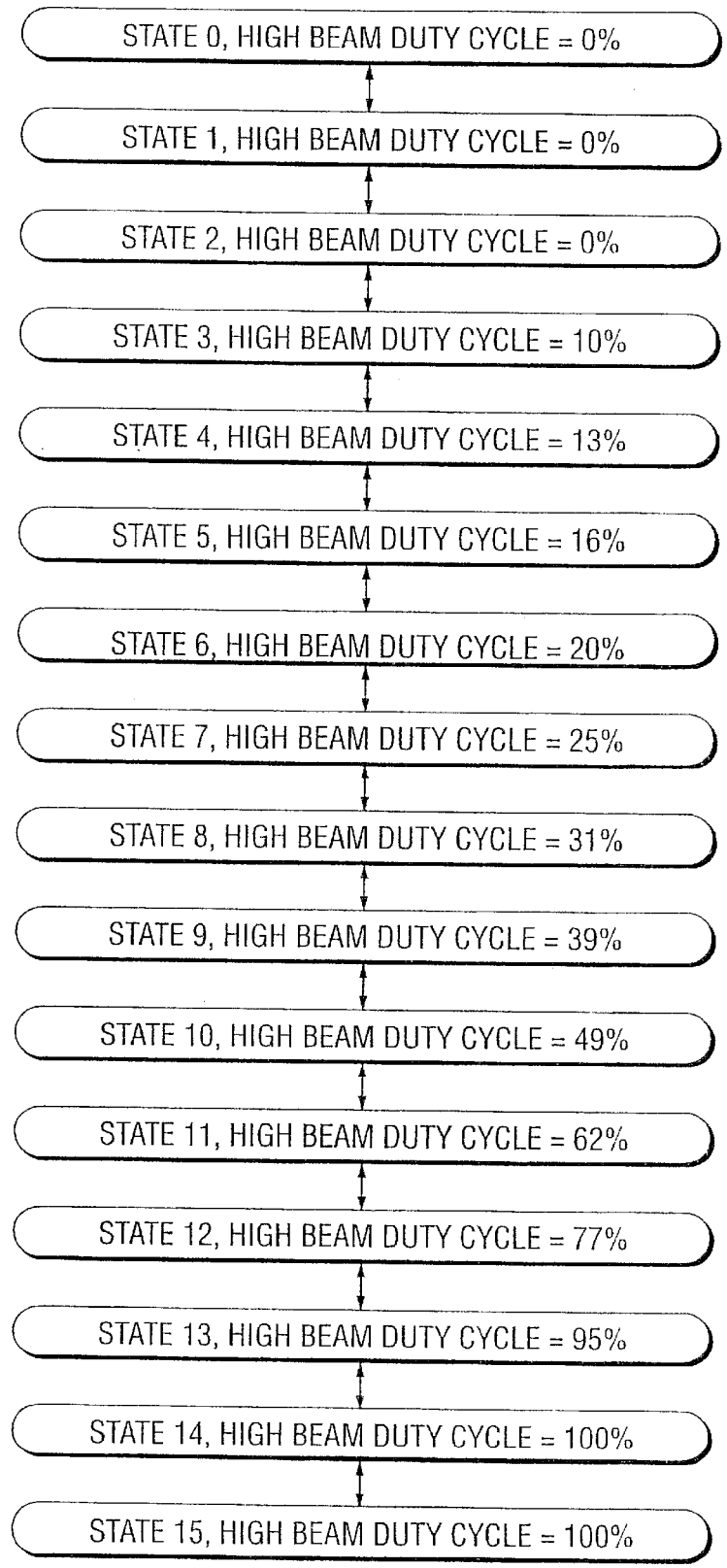
FIG. 19 is a state diagram illustrating the duty cycle associated with states for a variable high beam lamp.

Once the images of the forward field have been acquired and analyzed in step 1405, the state of the headlamps must be determined in step 1406. This is best described by considering a state machine implemented in the microcontroller 1105, which state machine is illustrated in FIG. 19. In the following example it is assumed that headlamp drive 902 is a pulse width modulator drive and the high been brightness can be varied by changing the duty cycle of the pulse width modulator drive. It is also assumed that the low been headlamps remain on at 100% duty cycle at all times. Each of the states in FIG. 17 represents a control state of the high beam headlamps. The duty cycle of the high beam headlamps is set to the value indicated by the current control state. The distribution of the duty cycles amongst the control states is non-linear to compensate for the fact that head lamp brightness is a nonlinear function of duty cycle and to provide the appearance of a constant percent change from cycle to cycle. Also, there are several states for both 0% and 100% duty cycle, indicating that several states must be traversed before the head lamps begin to go ON or OFF, providing a time delay verification insuring that the detected light source is persistent over several images. The number of states is exemplary only, and those skilled of the art will recognize that it may vary depending on the desired fade ON and OFF rate of the high beams and time between cycles. Additionally, the bright light indicator (which is typically located on the vehicle's dashboard) fades ON as the state move from state 11 to state 14. The bright light indicator fades OFF as the states move from state 7 to state 4. This provides some hysteresis to avoid flashing the indicator ON and OFF. Alternatively, if the indicator does not fade ON and OFF, the state at which the bright light indicator turns ON will preferably be a higher state than the state at which the bright light indicator turns OFF. In either case, hysterisis is provided for the headlamp control.

Figure 20A:
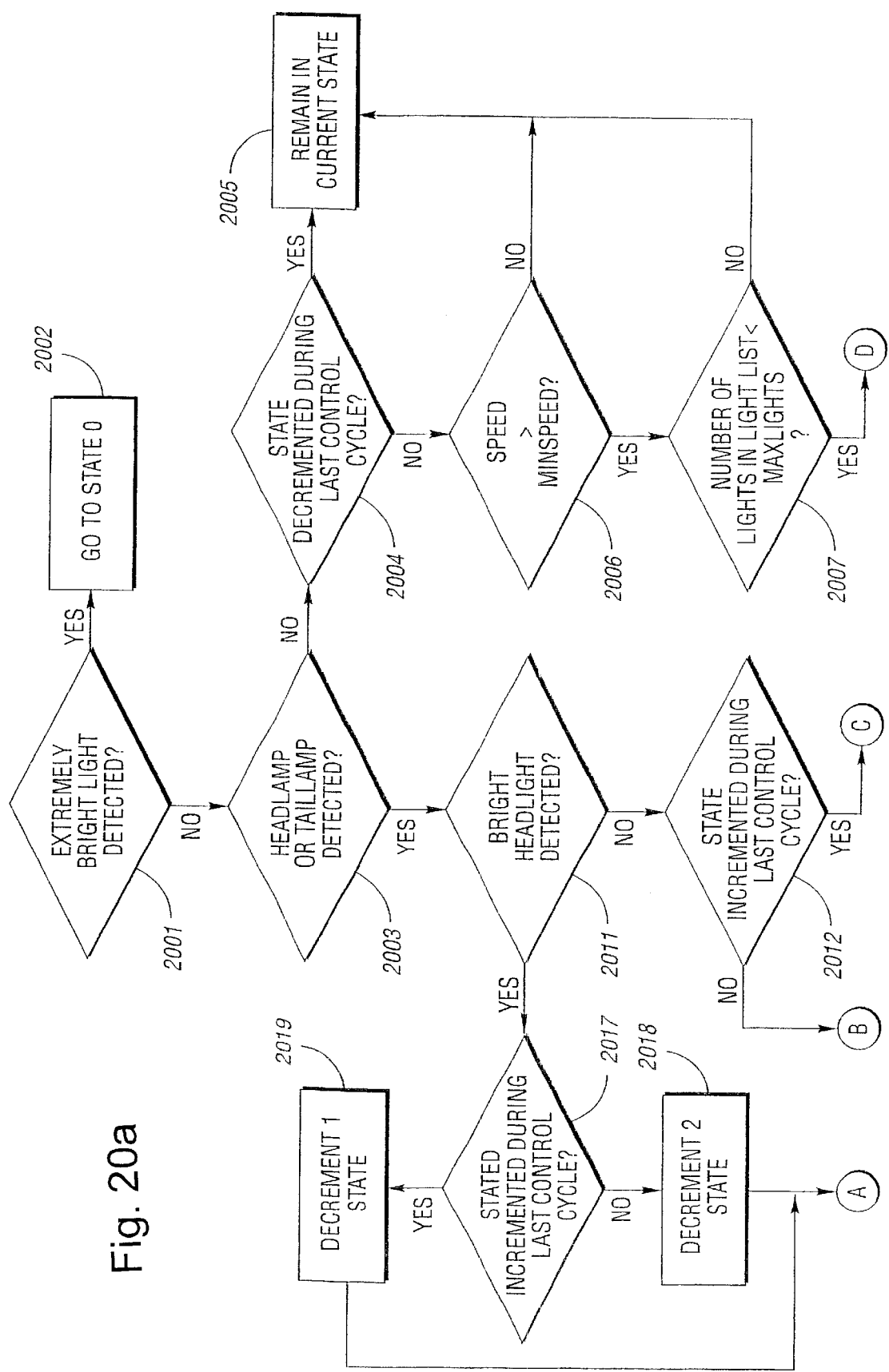
FIGS. 20a and 20b illustrate operation rules for changes of state in FIG. 19.
Figure 20B:
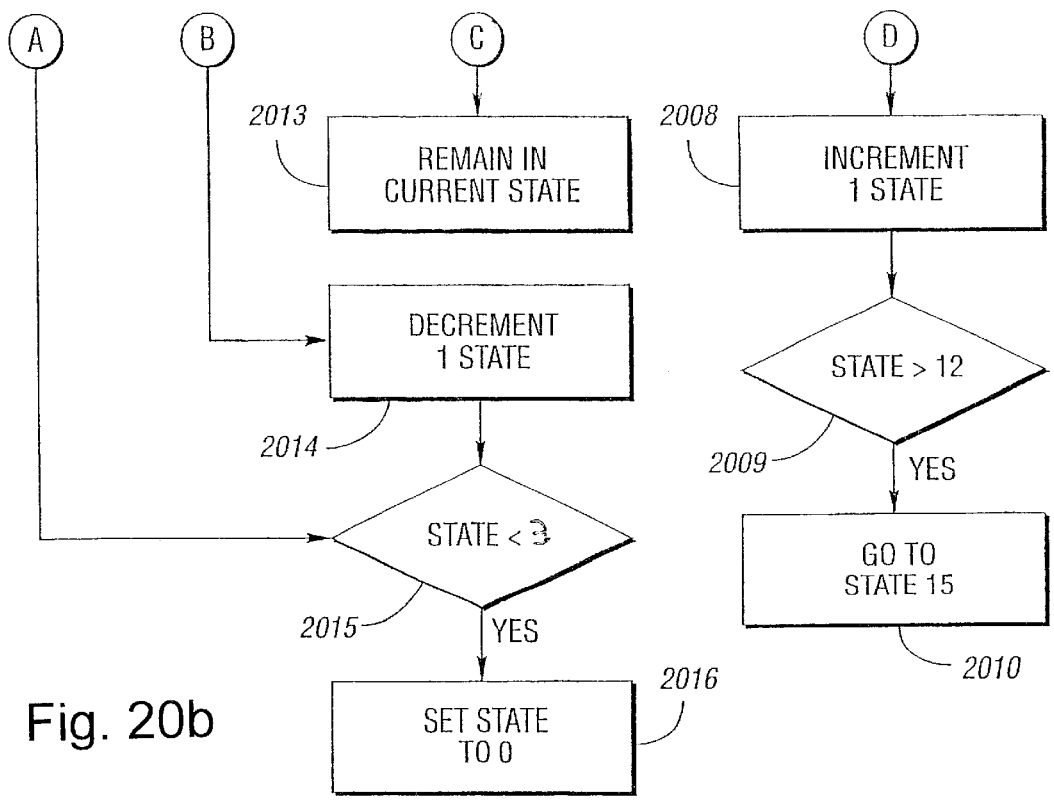

After each control cycle the headlamp control state can remain the same or move to a different state. The rules for moving between states are described with reference to FIGS. 20a and 20b. First, if any of the lights in the light list were determined to been extremely bright light in step 2001, the current control state is immediately set to a 0 state in step 2002. This behavior allows bypass of the fade out feature and rapid response to the sudden appearance of headlamps in the forward field of view, such as happens when driving over a hill. Step 2003 determines whether a headlamp or tail lamp was detected in the light source list. If not, control proceeds to step 2004, wherein it is determined whether state was decremented in the last control cycle.

One of the advantages of the variable beam configuration is the ability to fade in and out high beams. If a reflection from a sign or reflector is misdiagnosed as a vehicle lamp, the high beams will begin to dim. When they do, the reflected source will no longer be present in the image and the high beams will fade back on, likely without bothering the driver. To prevent rapid oscillation between increasing and decreasing headlamp beam brightness, the control state must rest in the current state for one cycle before changing direction. Therefore, step 2004 considers the action during the previous cycle and the system will remain in the current state as indicated in step 2005 if the previous action was to decrement states.

If the action was not to decrement states, vehicle speed is considered next in step 2006. If a vehicle is stopped at an intersection, it will annoy the driver if the high beams come ON, dim with a passing car, and then come ON again. To prevent this, the high beams are prevented from coming ON if a vehicle is traveling below a certain speed, for example 20-mph. A decrease in speed below the minimum speed threshold will not necessarily cause the high beams to dim unless there is an oncoming or preceding car present. Alternatively, the high beams can be configured to fade OFF every time the vehicle comes to a stop and then fade ON again once the vehicle begins moving, provided no other vehicles are present. In step 2007 the number of lights in the light list (counted in step 1607) is checked as an indication of whether the driver is driving in city conditions. If there are a large number of lights in the forward field of view, the high beams will not be turned ON. The number of the lights that are alternating current sources may also be considered.

If the criteria of steps 2004, 2006, and 2007 are met, the current control state is incremented one state in step 2008. If this action results in the current control state exceeding state 12 as determined in step 2009, the current control state is set to 15 in step 2010 forcing several time verification states before the beams can be dimmed again.

Should the microcontroller 1105 detect a headlamp or tail lamp in step 2003, the microcontroller determines whether a bright headlamp was detected in step 2011. If not, the prior cycle action is considered in step 2012 to prevent rapid oscillation between incrementing and decrementing to avoid rapid ongoing oscillations between states. If the prior action was not to increment, the current control state is decremented in step 2014. If the new control state is below state three, as determined in step 2015, the current control state is set to 0 in step 2016.

Finally, if a bright head lamp is detected in step 2011, it is desirable to more rapidly fade out the high beams by decrementing 2 states in step 2018, provided the previous action was not to increment in step 2017, in which case the current state is decremented only one state.

A large number of variations of the scheme just described are possible. For example, more states can be added to increase or decrease the time it takes to fade the high beams in and out. The number of required states will depend upon the image acquisition and analysis cycle time. Ideally, the fade in/out period is about one to two seconds. Another alternative is to decrement states as a function of the brightest light source detected in the light list rather than to decrement a single state for every cycle. In this way the brightness of the high beam is adjusted as a function of the distance of an oncoming or preceding vehicle rather than just fading in and out. This is particularly advantageous where the control mechanism is to vary the beam angle of the high beams rather than the intensity of the beams. Yet another alternative is to decrement states as a function of the current speed of the controlled vehicle. The rate at which states are decremented could increase at high vehicle speeds, since oncoming cars will overtake the controlled vehicle at a more rapid rate. Yet another alternative is to decrement states as a vehicle slows down. This would allow the high beams to fade out as a vehicle comes to a stop: a feature that maybe desirable for some drivers. Finally, it should be noted that the use of discrete states is only exemplary. The intensity, and/or aim of the high beam head lamps can be controlled by continuum of values from fully ON to fully OFF.

The previous discussions described in detail the operation of one cycle of the head lamp dimmer control sequence. This sequence is repeated indefinitely as long as the device is on. Depending on the time to complete one cycle, the above procedure may be interrupted to acquire rear glare sensor measurements for the electrochromic mirror. Additionally, the driver may interrupt the above sequence by activating the manual high beam switch generating input signal 1123 (FIG. 11). This feature is necessary to allow the driver to override improper behavior of the control system or to use the high beams to alert other drivers through flashing the high beams.

Some additional features may be provided with the above-described hardware and software configuration. One such feature is daytime running lights (DRLs). On some vehicles, DRLs are provided by operating the high beams at a reduced intensity. By using the PWM drive circuitry provided, the high beams can be set to a reduced intensity during daylight conditions. The ambient light sensor 1107 can be used determine daylight conditions and switch the headlamps to normal low beam operation at dusk. In particular, the ambient light level can have one or more light level thresholds associated therewith. When the ambient light level is a daytime one threshold, the daytime running lights will be ON. Below that threshold, but above another lower threshold, the low beams can be ON. Below that lower bright activate ambient light level threshold, the high beams may be operated automatically if the driver does not manually disable high beam operation.

Even without the use of DRL's, it is desirable to have automatic activation of the low beam head lamps at dusk. This control can be provided by the use of the ambient light sensor 1107. For better performance, an additional light sensor can be provided which senses light from a direction upwards rather than looking straightforward as the ambient light sensor 1107 does. Such a sky sensor arrangement is disclosed in U.S. patent application Ser. No. 09/491,192, entitled VEHICLE EQUIPMENT CONTROL WITH SEMICONDUCTOR LIGHT SENSORS, filed by Jon Bechtel et al. on Jan. 25, 2000, the disclosure of which is incorporated herein by reference thereto. Alternatively, a few rows of pixels in the image sensor can be used to image a region of the sky above the horizon. An imaging system disclosing such an arrangement is described in U.S. patent application Ser. No. 09/093,993, the disclosure of which is incorporated herein above by reference. The ability to image through both the red and cyan filters can help to distinguish between clear and overcast conditions and to detect a sunset.

It is envisioned that the system can detect a tunnel using the image sensor and a sky sensor. In particular, when a large dark area, which is a contiguous area of dark pixels meeting a size threshold level that is located in the center of the image, under day ambient light conditions, a potential tunnel condition is detected. If the dark area grows while the ambient light conditions continue to sense day ambient light conditions, the potential tunnel condition will continue. If the image sensor continues to see a large dark area forward of the vehicle when the daylight ambient conditions are no longer detected, the vehicle will be determined to be in a tunnel, and the headlights will be ON. The headlights will remain on until the daylight ambient conditions are detected, at which time the headlights will be turned OFF and daylight running lights will be turned on if the controlled vehicle has daytime running lights.

Speed Varying Thresholds

The speed input 1117 can be used in additional ways by microcontroller 1115. For example, when driving on an expressway, it is necessary to detect oncoming cars in the opposite lane, which is usually separated by a median. Therefore, the microcontroller must be more sensitive to oncoming headlamps at larger angles than would be necessary for back-road driving where there is no medium separating oncoming traffic. Incorporating a wide field of view for back-road driving has the disadvantage of increasing the likelihood that the image sensor will detect house lights, which are typically incandescent. Incandescent light sources will not be filtered by the AC rejection algorithm. Such house lights are not typically present on the side of the freeway. By increasing the sensitivity of the device to objects at higher angles when the vehicle is traveling at higher speeds, such as speeds in excess of 50 to 60 mph, the system will be able to sense cross-median traffic on expressways without increased sensitivity to house lights on back roads. It is envisioned that the field of view could be increased when the vehicle speed exceeds 65 mph and decreased when the vehicle speed passes below 60 mph.

Figure 21:
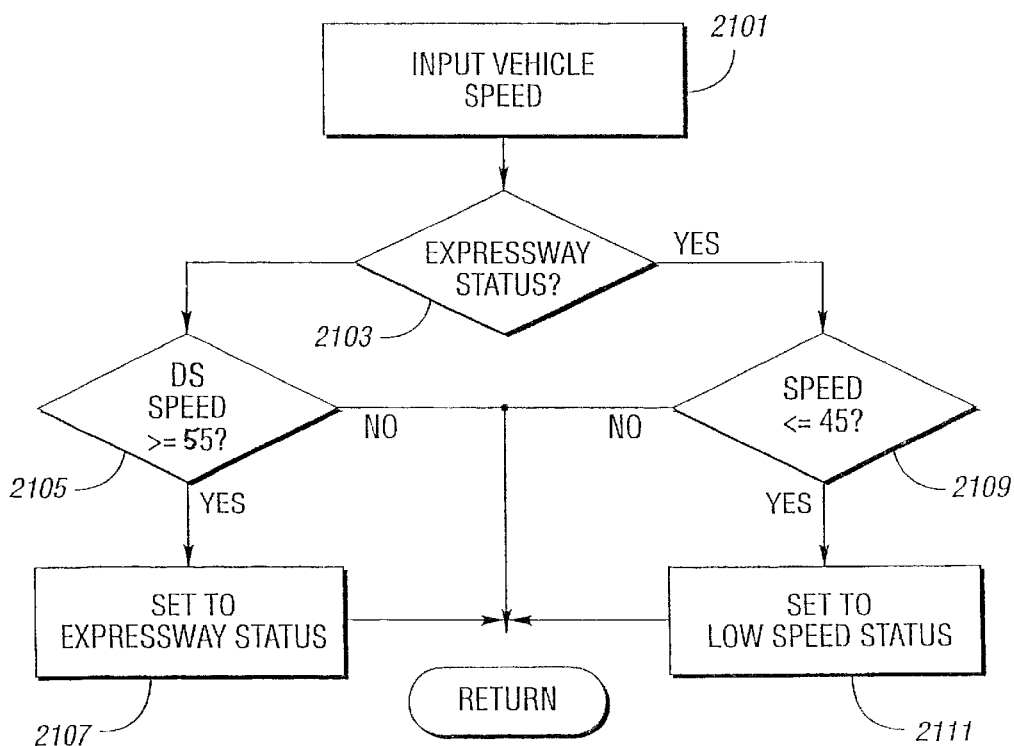
FIG. 21 is a flow chart illustrating operation to provide speed varying thresholds.

In particular, it is envisioned that prior to step 1601, additional steps can be provided to make the field of view speed sensitive. These steps are illustrated in FIG. 21. The vehicle speed is input in step 2101. The microcontroller determines in step 2103 whether the status is currently a wide view for expressway driving. If it is not, the microcontroller 1105 determines whether the speed is greater than 65 mph. If not, the status does not change. If the vehicle speed is determined to be greater than 65 mph in step 2105, the field of view of the image sensor 201 is increases as indicated in step 2107. The field of view in the horizontal direction can be increased by 30 to 150 percent, and advantageously 60 to 125 percent, relative to the narrower field of view at lower speeds. If it was determined in step 2101 that the controlled vehicle 100 is in expressway state, the microcontroller 1105 determines in step 2109 whether the vehicle speed has dropped below 45 mph. If it has, the microcontroller reduces the field of view of image sensor 201 to its narrower non-expressway field of view. In one advantageous embodiment, the field of view remains the same at all speeds but the thresholds for responding to lights at higher angles are decreased as speed increases. This is advantageous because it allows detection of very bright objects at high angles when the vehicle is traveling at slow speeds, but it is not sensitive to less bright objects, such as house lights or street signs, when traveling at slow speeds. In particular, at high speeds reducing the thresholds increases the sensitivity to cross median traffic. The thresholds are reduced more significantly to the left than to the right since cross median traffic is to the left. This property can be reversed for left-hand-drive countries. It is envisioned that the field of view will be varied by increasing and decreasing the width of the pixels used by the image sensor in the manner described above with respect to varying the field of view when the high beams are ON or OFF.

According to another aspect of the invention, the integration time for the pixels of the image array sensor can be increased at higher speeds. This increase in integration period increases the sensitivity of the image array sensor. The system is thus able to detect an oncoming vehicle sooner. This may be particularly advantageous as oncoming cars are likely to be traveling faster when the controlled vehicle is traveling faster. Accordingly providing the light control system with a higher sensitivity to shorten the response time will better emulate a desired dimming characteristic of the headlamps by dimming the headlamps at a desired vehicle distance. To provide this function, in step 2107 the microcontroller 1105 increases the sensitivity and/or widens the horizontal viewing angle, whereas in step

2111, the microcontroller decreases the sensitivity and/or narrows the horizontal viewing angle.

Figure 22:
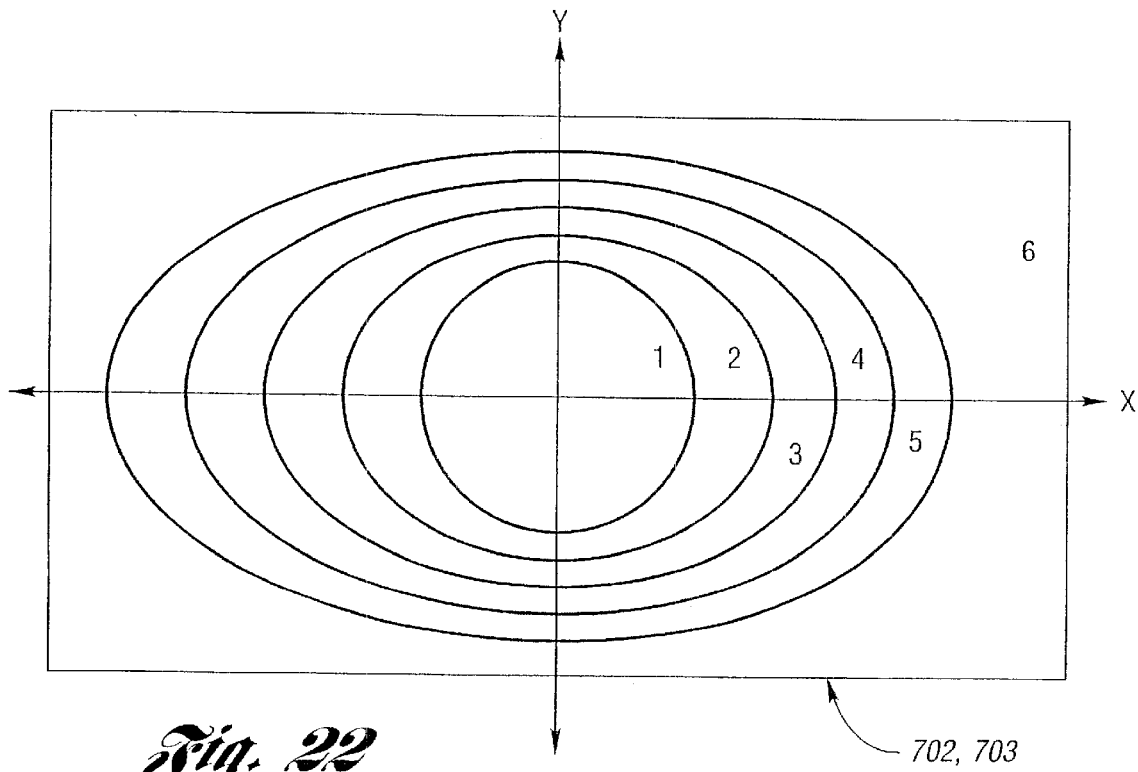
FIG. 22 is a chart illustrating the different regions of the image array.

It is further envisioned that adjustments can be made to the threshold in step 1707 as a function of speed. Such a system can be implemented using a look-up table stored in read only memory. FIG. 22 illustrates regions of the image sensor array 301, with the regions radiating outwardly from the center. The regions may not be symmetrical since oncoming traffic usually occurs more to the left and signs and nuisance light sources are more likely to the right in left side drive countries. The look-up table sets a respective threshold for each of the regions 1–6 with the regions having sequentially, incrementally greater thresholds moving outwardly from the center. Thus the center region 1 will have the lowest threshold and the outer peripheral 6 will have the highest threshold. In addition, the thresholds at different angles will vary as a function of speed, such that at higher speeds, the thresholds will be lower in regions 3 through 5 than they will be at higher speeds. For example, where two fields of view are provided, one table will contain respective thresholds for pixels in the regions for lower speeds and another table will contain respective thresholds in regions for the higher speeds. Each table will assign an integration time and/or thresholds for use in analyzing different portions of the field of view. Because the greater the distance from the center the greater the viewing angle of the scene image, lowering the threshold in the outer regions increases the systems' responsiveness to light sources at wider angles to the controlled vehicle.

Either the thresholds or the integration times for the pixel sensors of the image array, or both the thresholds and the integration times, can be changed to increase the sensitivity of the sensor at different speeds. Thus it is envisioned that the field of view can be the same at both high and low speeds. However, the thresholds or the sensitivity (i.e., the integration period or the amplifier gain) can be altered such that at low speeds images viewed at wide angles will have little impact on the dimming decision whereas at high speeds the images viewed at wide angles will have substantially more impact on the dimming decision at high speeds. It is further envisioned that instead of using look-up tables, an algorithm can be used to alter the sensitivity of the light sensor as a function of the angle of the image being viewed. Such an algorithm can be used to reduce the memory requirements for the system at the expense of requiring greater processing power to implement the function.

Turning

Figure 23:
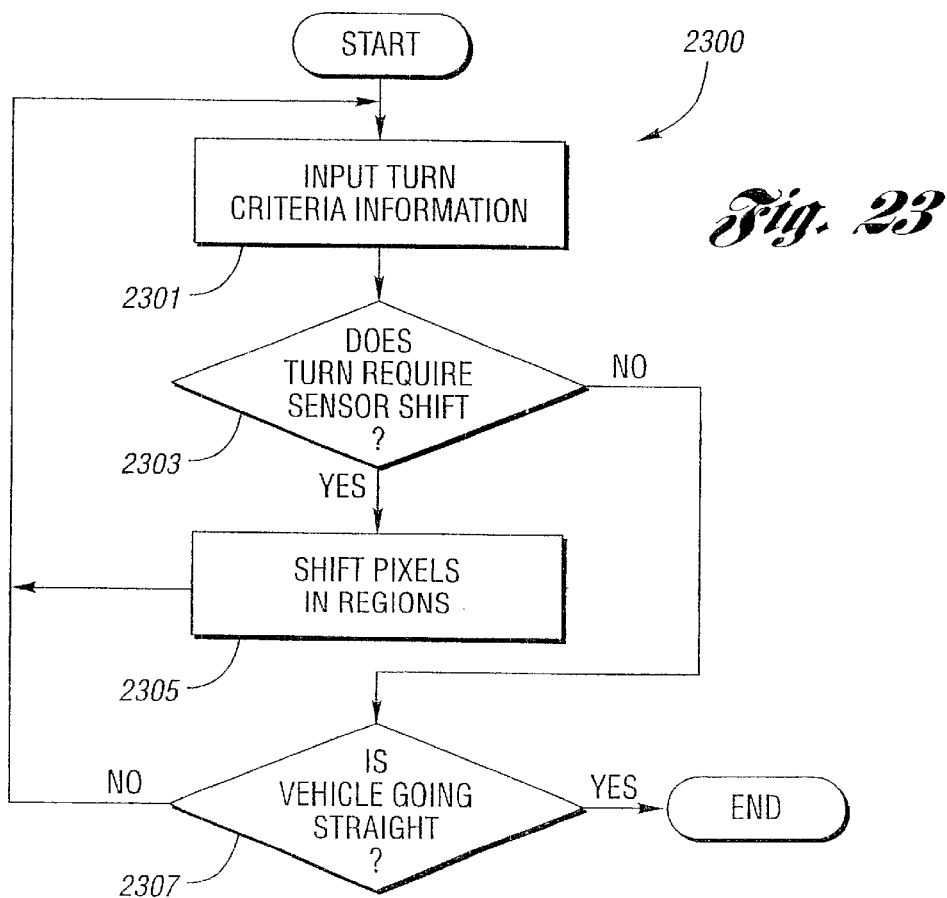
FIG. 23 is a flow chart illustrating operation of the microcontroller to shift the regions in FIG. 22.

As indicated above, it is disadvantageous to have a wide field of view when traveling slowly, such as occurs when traveling on back roads. However, when turning it is necessary to have a wide field of view so that the image sensor can detect other vehicles that will come in front of the controlled vehicle prior to the controlled vehicle's headlamps striking the other vehicle. A subroutine that the microcontroller 1105 uses for changing the viewing angle of the image sensor is disclosed in FIG. 23. It is envisioned that the subroutine will be executed each time a turn condition is initiated. For example, the microcontroller may detect any one or more of the following: activation of a vehicle turn signal alone or in combination with braking; a change in vehicle heading detected by the compass; global positioning information; and change in direction of the vehicle steering wheel or front tires. Responsive to such an event, the microcontroller 1105 will input the criteria to be used in making a decision as to whether the field of view needs to be altered. For example, a compass input, an input from a turn signal, global positioning system (GPS) receiver information, wheel turn indication from the vehicle steering system, vehicle speed, or a combination of these inputs may be input in step 2301.

In step 2303, the microcontroller 1105 will determine whether the criteria input in step 2301 indicate that the field of view should be altered. For example, when the vehicle turn signal is ON, and the vehicle is slowing down, the viewing angle sensitivity can be altered in the direction of the turn signal. Alternatively, actuation of the vehicle brake system in combination with a change in vehicle heading greater than a threshold angle of change could trigger a change in sensor viewing angle. In particular, the compass sensor information can be compared to a threshold change of direction to determine if the controlled vehicle 100 is turning, and responsive thereto the microcontroller 1105 can increase the sensitivity of the image sensor 201 and associated circuitry to light sources in the direction that the vehicle is turning. In order to implement such a turning control, the compass must generate vehicle heading information that the microcontroller can use. Commercially available compasses of the type used in vehicles generate an output which will operate within 2 to 3 of accuracy as the vehicle turns. As a consequence, the rate at which the vehicle heading is changing and the direction that the vehicle is turning can be determined from the compass output or GPS information. In one embodiment a compass is integrated into an electrochromic mirror with an automatic headlamp dimmer and the compass sensor signal is utilized to enhance the performance of the automatic headlamp dimmer.

If it is determined in step 2303 that a shift of the sensitivity pattern is required, the image sensor will shift its sensitivity as indicated in step 2305. For example, the high sensitivity region 1 of the image sensor will generally be in the center of the array such that lights straightforward of the vehicle will have the strongest impact on the light control process. This is particularly advantageous as the brightest light produced by the controlled vehicle illuminate straight out in front of the controlled vehicle. As the controlled vehicle turns, the center axis of each of the regions I through 5 will shift as indicated in step 2305. As a consequence, these regions shift in the direction that the vehicle is turning such that they are centered to the right or left instead of being centered on the Y axis (FIG. 22). The sensitivity of the pixels in array 301 will thus shift right as the vehicle turns right, and shift left as the vehicle turns left. The degree that the sensitivity field shifts can vary depending upon the rate of change of the vehicle as well as the speed of the vehicle.

It is envisioned that the sensitivity can be changed using the lookup table. In particular the lookup table can contain respective integration periods and thresholds according to the location of pixels such that the sensitivity is as shown in FIG. 22 when the vehicle is traveling straight. As the vehicle turns, the addresses associated with columns of pixels may be altered such that the integration periods and thresholds for pixels in the column will shift left or right.

If the change is not sufficient to change the sensitivity, as determined in step 2303, the microcontroller will determine in step 2307 if the vehicle is going straight. The microcontroller will continue to monitor the rate of change of the vehicle heading until the vehicle is heading generally straight, as indicated in step 2307. It will be recognized that subroutine may be run once as an interrupt routine such that other subroutines may be run in between execution of routine 2300.

It is further envisioned that adjustments may be made in the vertical direction, in addition to the horizontal direction, for example if a change in vehicle inclination is detected.

Light List History

Information about lights from previous frames can be useful in evaluating current frames. However, there is typically insufficient memory in low cost microcontrollers to store previous frames so as to retain a complete history of each frame's content. To minimize the memory requirements for implementing the system, while retaining some useful historical information, the brightness and location of one or more of the brightest lights detected in one or more previous frames are stored for use when processing a later frame. The entire light list from a previous frame need not be stored, unless significant memory is available. It is also useful to store the brightness and location of only the brightest lights detected in one or more preceding frames. This information can be used to provide fast return to bright. After an oncoming car 105 has passed the controlled vehicle 100, it is useful to return to the high beam state as soon as possible. The night vision of the driver in the controlled vehicle may be temporarily impaired by the lights of the oncoming vehicle. The impact of this loss of night vision may be minimized by providing as much scene illumination as possible, as soon as possible, following passage of a vehicle. The microcontroller 1105 uses the light list history information to implement a fast return-to-bright. In particular, after step 2007 in FIG. 20a, the microcontroller 1105 can determine whether the current frame is suddenly clear of bright light sources following a preceding frame that contained a very bright headlamp. In such a case, it is likely that the bright headlamp has just passed the controlled vehicle. If this situation occurs, the normal gradual, delayed fade-in period can be bypassed, or partially bypassed, and the high beams can be incremented by more than one state, such as by eight states (FIG. 19), to return to bright high beams more quickly.

Another scenario where the opposite result is desired occurs when the controlled vehicle comes up behind a preceding vehicle 110. As the controlled vehicle 100 approaches the preceding vehicle 110, the image sensor will detect the preceding vehicle's taillights and dim the controlled vehicle's high beams responsive thereto. When the controlled vehicle moves to the side to drive around the slower preceding vehicle, the taillights of the preceding vehicle will move out of the field of view of the image sensor. However, if the controlled vehicle's bright lights are activated, they will shine into the eyes of the driver of the vehicle being passed via the exterior review mirror. This is particularly problematic when the controlled vehicle is passing a truck, as it may take a long time to pass the truck. In this situation, the microcontroller can include a decision step following step 2007 to determine whether the previous frame included a taillight, and if so, to set a predetermined delay before the brights can be activated. Where the bright lights are dimmed responsive to preceding taillights, a long delay will thus be introduced before turning the high beams back ON. For example, the high beams may come on several seconds after the taillights move out of the scene being imaged.

The light history can also be used to select an integration period for the image array sensor pixels. In particular, it is envisioned that the amplifier gain 303 for the pixels can have different gains or different integration intervals to increase the dynamic range of the light sensor. For example, three different gains or integration periods could be supported. A bright light will saturate all but the lowest gain, whereas a dim light such as a taillight can not be detected at a low gain. The light history can be used to remember that the sensor was washed out even at low gain, and an ultra low sensitivity can be used to detect lights.

Another use for the light list history is determining traffic density. In particular, the traffic density can be ascertained from the time period count between detecting oncoming headlights. Thus, in or near a city where traffic is heavier, the system can respond to that condition by having a relatively long delay period. On the other hand, where traffic is light, such that oncoming traffic is less likely, the delay to turn on the bright lights can be short. It is envisioned that as the traffic increases the return-to-bright time period will lengthen, whereas as the traffic decreases, the return-to-bright period will shorten. It is further envisioned that a number of different criteria could be used, such as the number of frames since a vehicle was previously detected or the percentage of time that the bright lights were on over a predetermined sampling period. In these ways, the number of objects detected over time can be used in the control of the headlamps, and in particular, to at least partially inhibit turning on the high beams.

It is envisioned that where a vehicle includes an electrochromic mirror glare sensor to detect light from the rear of the vehicle, or any other device having a rearward directed optical sensor, such as a rear vision system, additional information can be accessed which is useful for controlling the return-to-bright interval. In particular, when the bright headlights are dimmed because of taillights from a preceding vehicle, the headlights can return to bright a predetermined time after the taillights disappear from in front of the vehicle or when headlights are detected by the rear glare sensor in the rearview mirror, whichever occurs first. Where headlights from a trailing vehicle are detected immediately prior to the disappearance of taillight from a preceding vehicle, the use of the rearward sensor for detecting a return to bright condition will be precluded. Additional considerations can be used in making the return-to-bright decision. For example, a minimum and a maximum interval can be required before return-to-bright.

It is envisioned that the system will only provide a variable return-to-bright interval under certain conditions, such that the return-to-bright interval will typically be a default time interval. However, a fast return-to-bright interval will occur following a condition where really bright headlights are detected and then disappear, as such bright lights will reduce the driver's night vision. Additionally, a slow return to bright condition would be used following disappearance of a preceding taillight since the driver's vision will not have been impaired and it is desirable to avoid shinning the high beams into the eyes of a vehicle being passed.

It is further envisioned that integration periods in the current frame may be adjusted based upon measurements made in a previous frame. In particular, an extremely short integration period can be used for the image sensor 301 where the lowest sensitivity measurements in a previous frame resulted in saturation of the light sensor. To the other extreme, where the previous frames' most sensitive measurements did result in detection of taillights, a very long integration interval can be used for the image sensor 301 to look for taillights in the current frame. Thus where three integration periods are typically used, two additional integration periods can be selectively used when the conditions necessitate either an extremely short or long integration interval.

Another use of the light list sensor is to distinguish signs and reflectors based on the movement of the objects in the image over time. Over a sequence of frames, reflectors and signs will typically move more rapidly toward a side of the image than will vehicles traveling generally in parallel with the controlled vehicle. This characteristic can be used to distinguish stationary objects from moving vehicles.

Automatic Aim Calibration

Variations in the orientation of the image array sensor relative to the windshield angle may result in variations in aim of the sensor, which may negatively impact on the performance of the dimmer. These variations can be calibrated out over time using a maximum bound placed on the expected variation in mounting. In general, on straight roads, distant oncoming headlamps will be coming from directly ahead of the optical sensor system 102. The calibration system uses faint headlamps detected near the center of the image, and preferably only those within a center window corresponding to the expected mounting variations. Such headlamps meeting certain criteria will have their position averaged with other faint headlamps meeting the same criteria. Over time, this average of these lights should correspond to the center of the field of view. This average value can be used to offset the image window relative to the X and Y-axis in FIG. 22.

More particularly, in order to detect a flat straight road, from which a misalignment of the optical sensor system can be detected, a variety of different orientation inputs can be used. The speed of the vehicle may be required to remain in a certain range between 35 to 50 mph. The vehicle can be determined to be traveling straight using the compass, GPS, or monitoring the operation of the vehicle steering system. If the heading changes during the test, the measurement will be considered to be in error. If the vehicle has equipment for providing an elevation measurement, any changes in the vehicle's elevation during the calibration process will result in an error. The elevation measurement may thus be used in determining whether to adjust the field of view.

A distant vehicle is initially detected by sensing white light near the center of the image which is faint at the highest sensitivity (longest integration period) of the image sensor. As this light gets brighter, the system monitors the orientation inputs to detect whether the road continues to be flat and straight. If it remains flat and straight for a period of time which is at least twice the time period required for the vehicles 100, 105 to pass, the measurement will be valid. The center point detected initially will then be averaged with previous valid measurements, and the average measurement will be considered to be the center of the image. This will be the average X and Y coordinates, which together will mark the center of the image sensor. This location can be saved in EEPROM or flash ROM.

Another method of aiming calibration is to take a very high gain image and look for the reflection of the road. The average point where this reflection occurs can be used to calibrate the aim.

Liquid Crystal Filter

An alternative optical system may include a liquid crystal filter 2405 that can be used to selectively provide both a red and a blue filter, whereby red and blue images may be viewed by an image sensor 2401 through a single lens structure 2403. In such a structure, the image sensor 2401 need only have one imaging area (e.g., array area 702 instead of array areas 702 and 703 as required with two lenses). The filter 2405 is implemented using a liquid crystal colored light switch 2503 electrically connected to microcontroller 1105 through conductors 2413 and 2411. The filter includes a neutral polarizer 2501, a liquid crystal shutter 2503, a red polarizer 2505, and a blue polarizer 2507. The neutral polarizer 2501 and red polarizer 2505 are oriented with their polarizing axis aligned in one direction and the blue polarizer 2507 is oriented with its polarizing axis oriented orthogonally to the red and neutral polarizer. The liquid crystal shutter 2503 is implemented using a twisted neumatic liquid crystal shutter selectively energized under the control of microcontroller 1105. In particular, when the shutter is not energized, the liquid crystal device transmits the red light. When the liquid crystal is energized, the liquid crystal device transmits blue light.

It is thus possible to measure the relative intensities of two colors of light using a single photo sensor or image area. In the unenergized state all visible light is polarized in the horizontal direction by the neutral polarizer, rotated 90 degrees by the unenergized TN. liquid crystal cell to the vertical direction, and then all but the red light will be absorbed by the horizontal red polarizer. The red light will then pass through the vertical blue polarizer. In the energized state all visible light will be polarized in the horizontal direction by the horizontal neutral polarizer, and not rotated by the energized TN liquid crystal cel, all visible light will be transmitted by the horizontal red polarizer and all but blue light will be absorbed by the vertical blue polarizer. The liquid crystal device can be used as a high-speed light switch to alternate between transmission of blue light and red light. The relative intensities of the red and blue light components of an object or light source can then be determined. Alternatively, a green polarizer can be substituted for either the red or blue polarizer to switch between transmission of blue and green or red and green light respectively. Furthermore, a clear polarizer can be substituted for the blue polarizer to switch between red and clear.

Windshield Wiper

To improve dimmer performance when it is raining, it is useful to synchronize the acquisition of images with the windshield wipers. For example, a signal can be provided from the wiper motors to indicate the position of the wipers. Immediately after the wiper passes over the sensor, and image can be taken to look for cars. Most importantly it is necessary to avoid taking images while the wiper is over the image sensor 301.

Where the controlled vehicle 100 includes a moisture sensor, the moisture sensor can monitor the windshield wiper. A moisture sensor providing such information is disclosed in U.S. Pat. No. 5,923,027, entitled MOISTURE SENSOR AND WINDSHIELD FOG DETECTOR, issued to Joseph Stam et al on Jul. 13, 1999, the disclosure of which is incorporated herein by reference thereto.

Deceleration

In addition to varying the image sensor operation depending upon the vehicle speed, other speed criteria can be used to control the operation of the vehicle headlamps. Turning on the high beams may be inhibited when the vehicle is decelerating, when the brakes are actuated, or when the vehicle is traveling slowly. This prevents high beams from coming on when coasting to a stop or approaching an intersection. Deceleration can be detected from the speed input to the microcontroller 1105 (FIG. 11).

Bad Pixel Calibration

An image sensor may contain one or more bad pixels. These bad pixels may manifest themselves as extremely sensitive pixels which may cause "white-spots" in the image. Such "white-spots" will cause false light detection in the image if the sensor is not calibrated to remove them from calculations. During production tests, the location of these white spots can be measured and stored in a programmable memory associated with microcontroller 1105. To compensate for such bad pixels during normal operation of the image array sensor, after an image is acquired, the pixel value at the white-spot location may be replaced with the average value of its neighboring pixels.

It is possible that a white-spot may form during use of the image sensor, such that it is not detected during production tests. Such a situation will cause the device to be inoperable. To avoid this problem, it is desirable to calibrate the white-spot out of the image after recognizing the bad pixel. In order to detect the white spot, it is necessary to detect that the pixel remains "lit-up" in several images, and preferably over an extended period of time. A bad pixel will stand out if it is repeatedly lit-up when neighboring pixels are dark. When such a pixel is detected, it can be added to the list of bad pixels.

It is envisioned that bad pixels can be periodically tested to determine if their performance has improved. This can be accomplished by monitoring a sequence dark images to determine whether the center pixel is dark while the adjoining pixels are not dark.

"Pickey Fence"

In controlling the vehicle headlamps, it is desirable to avoid a condition where the headlamp high beams flash ON and OFF at a relatively rapid rate, this is particularly important if non-variable two-state headlamps are used. For example, a sign along the road can cause flashing of the headlights between bright and normal levels. This occurs when reflections of the bright high beams from a sign are bright enough to cause dimming of the high beams and reflections of headlight low beams are low enough that the bright high beams are turned ON. The condition can be avoided by having the system look at the object that caused the bright light to turn OFF. When this condition occurs, the light level at that position is ignored while the pixels around the object are not ignored for a predetermined number of cycles, such as ten cycles. The length of time that the object is ignored can be variable as a function of the vehicle's speed. The higher the vehicle's speed, the shorter the period that the object will be ignored. During the time period, the lights will be controlled using pixels other than those associated with the object being ignored.

A reflector can be distinguished from an active source of light by flashing the vehicle headlights off. The time period that the headlights are off is so short that the image sensor can sense the loss of light even though the human eye will not perceive, or barely perceive, that the lights were off. A light emitting diode headlamp described hereinbelow can be turned OFF and ON very rapidly, such that it will be off for such a short period of time. In operation, the microcontroller 1105 controls the headlamp high or low beams to turn OFF, and controls the image sensor to image the scene during that brief time period that the headlamps are off. The off time period may for example be 10 ms.

Fog Detector

It is desirable for the vehicle to reliably detect a foggy condition, and in response thereto, to automatically turn ON or OFF front and rear fog lamps. Effective fog detectors have not been available heretofore. Fog may be detected by using the image sensor and optical system for the headlight ON/OFF and headlight dimmer control. Fog can be detected by a reduced scene contrast along with scene ambient light level determinations. The ambient light can be determined from the mean grey scale value of the pixels imaging the forward scene or by a separate ambient light sensor, such as the ambient light sensor used for the electrochromic mirror. It is envisioned that the mean can be a clipped mean value. The variance of the grey scale values of the pixels provide a measure of the contrast in the image. Alternatively, the variance can be determined from the standard deviation of the pixels, and in particular, when the standard deviation is less than a standard deviation threshold level, the presence of fog is identified responsive to which the fog lights can be turned ON. Alternatively, the individual differences between the average pixel level and each individual pixel level can be added for the entire image sensor, and when this total variance exceeds a variance threshold level, the presence of fog is detected. Either of these examples of fog criteria can be used as a measure of contrast.

Several additional factors may also be considered. The contrast value may be an average contrast value over several images. The contrast may be determined in row-wise fashion to determine the level of fog. Various regions of the scene may be considered independently. If two color lenses are present as in the headlamp dimmer, color information may be used. The actual values of the brightness/contrast ratios and the proper image sensor exposure times should be determined experimentally. The device can be set to only operate between a predetermined range of brightness levels, such that if the ambient level is too high or too low, the fog detector will not operate, and manual override will be required. The ambient light conditions for fog may for example be between 1 and 1000 lux. Both the image sensor and the ambient light sensor can be used to detect fog. If the ambient light level detected by the ambient light sensor is within the appropriate range, an image of the forward scene is acquired with a sensitivity set to the average grey scale value of the pixels (e.g., 128 lux). If the contrast at a given brightness level is below a predetermined threshold level, it is determined that fog is present.

Led Headlamps for Headlamp Steering and Headlamp Flashing

It has long been considered to be desirable to provide headlamps that can be steered in the direction that the vehicle is turning. It is also desirable to provide forward lighting that can be turned OFF, or substantially attenuated, for such a short period of time that the driver does not notice that the lights are OFF. In this way reflections do not exist during acquisition. Although a light emitting diode (LED) lamp can be used to provide these features in a cost-effective manner, LED lamps producing enough light to implement a vehicle headlamp are not commercially available. LEDs suffer from a number of disadvantages that limit their application in vehicle headlamps, not the least of which are the relatively small amount of light produced by LEDs and manufacturability limitations when incorporating LEDS having exotic constructions. Because of these disadvantages, LED lamps have not been used to implement a vehicle headlamp despite the fact that LEDs are more rugged, more energy efficient, and significantly longer lasting than other light technologies. Additionally, means of producing white light from LEDS have only recently become practical as discussed in U.S. Pat. No. 5,803,579, entitled ILLUMINATOR ASSEMBLY INCORPORATING LIGHT EMITTING DIODES, issued to Roberts et al. on Sep. 8, 1998, the disclosure of which is incorporated herein by reference.

An LED headlamp 2600 is disclosed in FIG. 26. The LED headlamp can be used to very briefly flash OFF, or dim, the headlamps during an image sampling interval. The LED headlamp 2600 includes a heat extraction member 2601 that serves as a support for mounting semiconductor optical radiation emitters 2603, 2605. Where the semiconductor optical radiation emitters 2603, 2605 are electrically connected to the heat extraction member, the heat extraction member provides an electrical connection to the semiconductor optical radiation emitters in addition to providing a thermal path for removing heat generated within the semiconductor optical radiation emitters during operation. It is envisioned that the emitters 2603, 2605 can be electrically isolated from the heat extraction member such that the heat extraction member only provides a thermal path. Each of the emitters 2603 is connected to electrical conductor strip 2607 through a wire bond 2609 and a resistor 2611. Each of the emitters 2605 is connected to electrical conductor strip 2613 through a bonding wire 2615 and a resistor 2617.

The heat extraction member 2601 may be constructed of any suitable material, and may be formed in any desired configuration. The front face of the illustrated heat extraction member is generally rectangular in shape, including 33 wells, each of which receives semiconductor optical radiation emitters 2603, 2605. The back of the heat extraction member includes fins 2601 that provide a large surface for thermal dissipation to the ambient air. It is envisioned that the heat extraction member may alternatively have other configurations which enable light steering, such as being generally convex, shaped like a portion of a cylinder side wall, an elongate bar to extend across the front of the vehicle, or plurality of joined planar surfaces extending at different angles, or the like. The heat extraction member can be chamfered, or otherwise contain extensions, slots, holes, grooves and the like, and may incorporate depressions such as collimating cup or other form to enhance optical performance. The illustrated heat extraction member includes elliptical cups 2602. The heat extraction member may be composed of copper, copper alloys such as beryllium, aluminum, aluminum alloys, steel, or other metal, or alternatively of another high thermal conductivity material such as ceramic. Preferably, the heat extraction member is constructed from an electrically and thermally conductive metal. Such materials are commercially available from a wide variety of sources.

The cups 2602 are formed in the top surface of the heat extraction member for receipt of the semiconductor optical radiation emitters. The illustrated wells 2602 are elliptical to accommodate two emitter chips 2603, 2605 side-by-side. However, the cups may be of any suitable shape such as round, elliptical, rectangular, square, pentagonal, octagonal, hexagonal, or the like. The elliptical cup have the advantage of accommodating more than one emitter while providing an efficient reflector for projecting light outwardly in a desired radiation pattern. It is envisioned that the region of the heat extraction member directly underlying the point of attachment of the semiconductor optical radiation emitter may be coated with nickel, palladium, gold, silver or other material including alloys, in order to enhance the quality and reliability of the die attach. Other thin-layered materials may be optionally inserted between the emitter and the heat extraction member to achieve a variety of desired effects without departing from the scope and spirit of the present invention. The material preferably provides an electrical connection between the emitters and the heat extraction member whereby the heat extraction member can provide a reference potential, which may for example be ground potential. The materials are preferably adhesive, electrically insulative, and either conductive or patterned composite of electrically insulative and conductive materials, and without significantly impeding thermal transfer, may be used to support, bond, electrically connect or otherwise mount to the emitter to the heat extraction member. The region of the heat extraction member within optical-enhancement cup feature may be coated with silver, aluminum, gold or other suitable material to increase reflectance and improve the optical efficiency of the device. The area outside of the encapsulant may be coated with nichrome, black oxide or other high emissivity treatment to improve radiative cooling.

The connection of the semiconductor optical radiation emitter is preferably by the use of a special type of electrically conductive adhesive die-attach epoxy. These adhesives normally achieve good electrical conductivity by inclusion metallic fillers such as silver in the adhesive. Suitable die-attach adhesives are well known in the art and may be obtained from Quantum Materials of San Diego, Calif., from Ablestik division of National Starch and Chemical, and EpoTek of Billerica, Mass. Alternatively, solder may be used as a means of attaching the LED chip to the heat extraction member in some embodiments. Whether attached by electrically conductive adhesive or solder, the bond establishes good electrical and thermal conductivity between the emitter and the heat extraction member. In the case where the emitters having electrodes manifest as conductive bond pads at the top of the LED chips rather than at their base, the electrical attachment of all of the electrodes is by wire bond rather than by die attach to the beat extraction member.

The semiconductor optical radiation emitters comprise any component or material that emits electromagnetic radiation having a wavelength between 100 nm and 2000 nm by the physical mechanism of electroluminescence, upon passage of electrical current through the material or component. For purposes of generating head light illumination, different emitters can be used in the wells to generate the light, such as: all amber emitters the wells; or amber and cyan emitters positioned in each of the wells; or red-orange and cyan emitters placed in each of the wells; or cyan and amber emitters placed in some of the wells and red-orange and cyan emitters in other wells; phosphorous emitters in each of the wells; or the like. It is envisioned that the four out of five wells can have blue-green and amber emitters and one in five wells can have red-orange and amber emitters. Such an arrangement will produce a white light for illuminating the path of the vehicle.

Figure 26A:
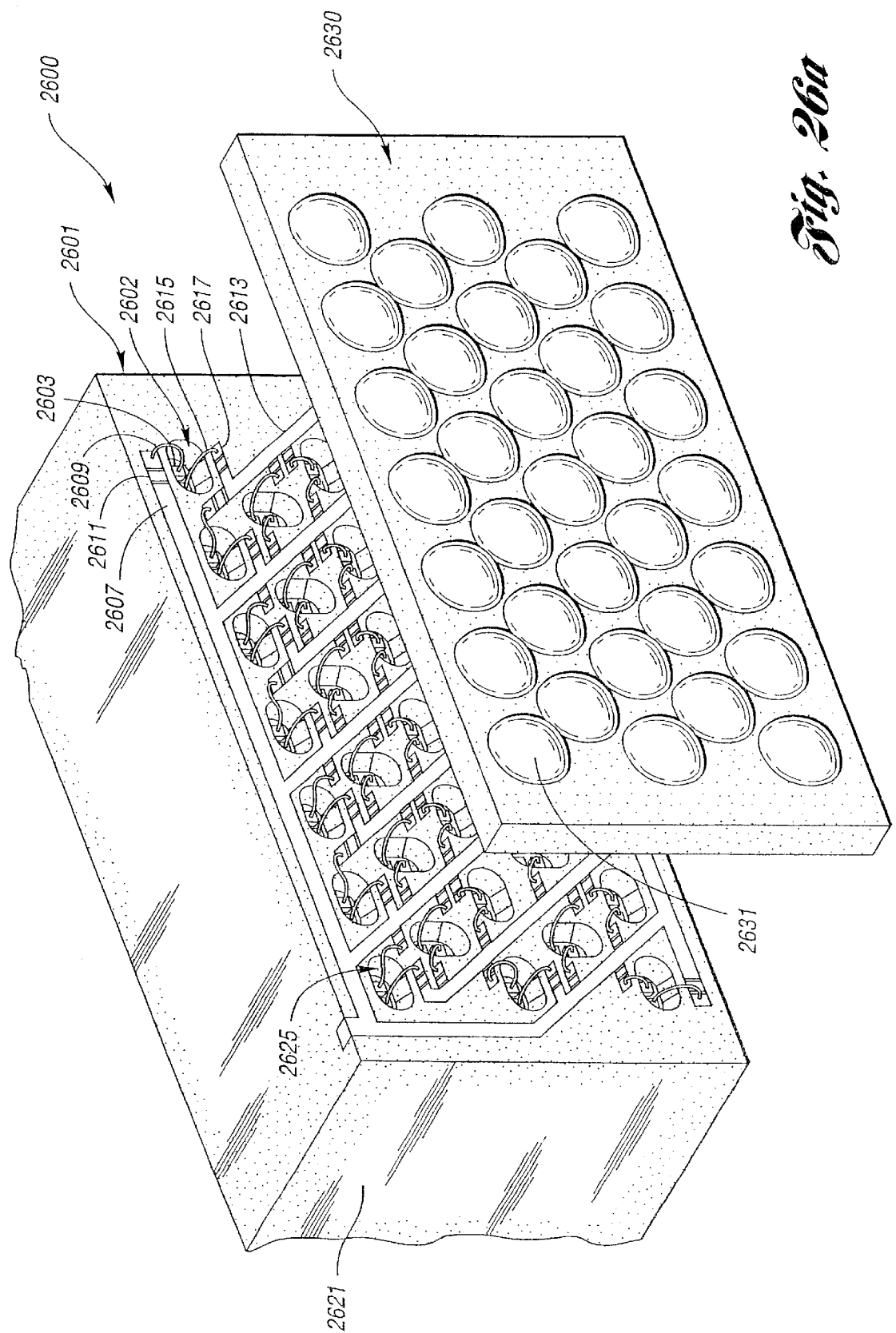
FIG. 26a is an exploded perspective view illustrating an LED headlamp.

The semiconductor optical emitter may comprises a light emitting diode (LED) chip or die as are well known in the art, light emitting polymers (LEPs), polymer light emitting diodes (PLEDs), organic light emitting diodes (OLEDs) or the like. Such materials and optoelectronic structures made from them are electricallyl similar to traditional inorganic materials known to those skilled in the art, and are available form a variety of different sources. Semiconductor optical radiation emitter, or emitter, as used herein refers to each of these and their equivalents. Examples of emitters suitable for headlamps include AlGaAs, AlInGaP, GaAs, GaP, InGaN, SiC, and may include emissions enhanced via the physical mechanism of fluorescence by the use of an organic or inorganic die or phosphor. LED chips suitable for use in the present invention are made by companies such as Hewlett-Packard, Nichia Chemical, Siemans Optoelectronics, Sharp, Stanley, Toshibe, Lite-On, Cree Research, Toyoda Gosei, Showa Denko, Tyntec, and others. Such chips are typically fashioned approximately in square base between 0.008" and 0.016" long on each side, a height of about 0.008" to 0.020". To implement the headlight, a larger chip having a square base larger than 0.020" may be used, and in particular it is advantageous to have a size greater that 0.025" to 0.035" to generate light. An array of such emitters mounted to a substantial heat:sink permits an LED lamp to generate sufficient light to operate as a vehicle headlight. Details of an emitter that can be used can be found in U.S. patent application Ser. No. 09/426,795, entitled SEMICONDUCTOR RADIATION EMITTER PACKAGE, filed on Oct. 22, 1999, by John K. Roberts et al., now U.S. Pat. No. 6,335,548, the disclosure of which is incorporated herein by reference. An electrical path for supplying control signals to the emitters is provided through conductors. The conductors are electrical strips applied to a surface of an insulative layer, the insulative layer being mounted to the top surface of the heat sink. The insulative layer may be a circuit board including openings over the cups, or it may comprise an epoxy or plastic layer. The conductor may be any suitable electrically conductive material such as copper, aluminum, an alloy, or the like, and may advantageously comprise circuit traces applied to the insulating material by conventional means. The circuit traces disclosed in FIG. 26a illustrate a pattern that may be used where separate supply is provided for the different emitters.

An encapsulant is a material or combination of materials that serves primarily to cover and protect the semiconductor optical radiation emitter and wire bonds. The encapsulant is transparent to wavelengths of radiation. For purposes of the present invention, a substantially transparent encapsulant refers to a material that, in a flat thickness of 0.5 mm, exhibits greater than 20% total transmittance of light at any wavelength in the visible light range between 380 nm and 800 nm. The encapsulant material typically includes a clear epoxy or other thermoset material, silicone or acrylate. Alternatively, the encapsulant may conceivably include glass or thermoplastic such as acrylic, polycarbonate, COC or the like. The encapsulant may include materials that are solid, liquid or gel at room temperature. The encapsulant may include transfer molding compounds such as NT 300H, available form Nitto Denko, or potting, encapsulation or other materials which start as a single part or multiple parts and are processed with a high temperature cure, two part cure, ultra-violet cure, microwave cure, or the like. Suitable clear encapsulants may be obtained from Epoxy Technology of Billerica, Mass., from Nitto Denko America, Inc., of Fremont, Calif., or from Dexter Electronic Materials of Industry, CA.

The encapsulant may provide partial optical collimation or other beam formation of electromagnetic energy emitted by the emitter and or reflected by the surface of heat extraction member. The encapsulant also serves as a chemical barrier, sealant, and physical shroud providing protection of emitters, internal adhesives such as bonds, bond pads, conductor wires, wire bonds and internal surfaces of heat extraction member and electrical leads from environmental damage due to oxygen exposure, exposure to humidity or other corrosive vapors, solvent exposure, mechanical abrasion or trauma, and the like. Encapsulant provides electrical insulation. Encapsulant may also provide for attaching or registering to adjacent components such as secondary optics, support members, secondary heat extractors, and the like.

The encapsulant may comprise a heterogeneous mass of more than one material, wherein each material occupies a portion of the overall encapsulant volume and provides a specialized function or property. For example, a stress relieving gel such as a silicone "glob top" may be placed over the emitter and wire bonds. Such a localized stress relieving gel remains soft and deformable and may serve to cushion the emitter and wire bonds from stress incurred during subsequent processing of the component or due to thermal expansion to shock. A hard molding compound such as an epoxy, may then be formed over the stress relieving gel to provide structural integration for the various features of the component, to retain the electrical leads, to protect the internal mechanisms of the component from environmental influences, to electrically insulate the semiconductor radiation emitters, to provide various optical moderation of radiant energy emitted by the emitter if desired. Additionally, the filler used within the stress relieving gel may advantageously include a high thermal conductivity material such as diamond powder. Diamond is a chemically inert substance with an extremely high thermal conductivity. The presence of such a material may significantly increase the thermal conductivity of the gel and provide an additional path for heat generated in the emitter chip to reach the heat extraction member and ambient environment where it can be dissipated. Such additional heat extraction path will increase the efficiency of the emitter, and thus the light output of the lamp. The encapsulant, and manufacture of a device using such an encapsulant is described in greater detail in U.S. Pat. No. 6,335,548, incorporated by reference hereinabove.

A steerable light emitting diode headlamp 2700 is illustrated in FIG. 27. The headlamp includes a heat extraction member 2701 having two lamp sections 2703 and 2705. The heat extraction member 2701 is configured to include the two lamp sections 2703 and 2705 each of which is substantially identical to lamp 2601, presenting two front faces 2705 and 2707 at an angle of 5 to 45, and may advantageously be angled at approximately 15.

Figure 28:
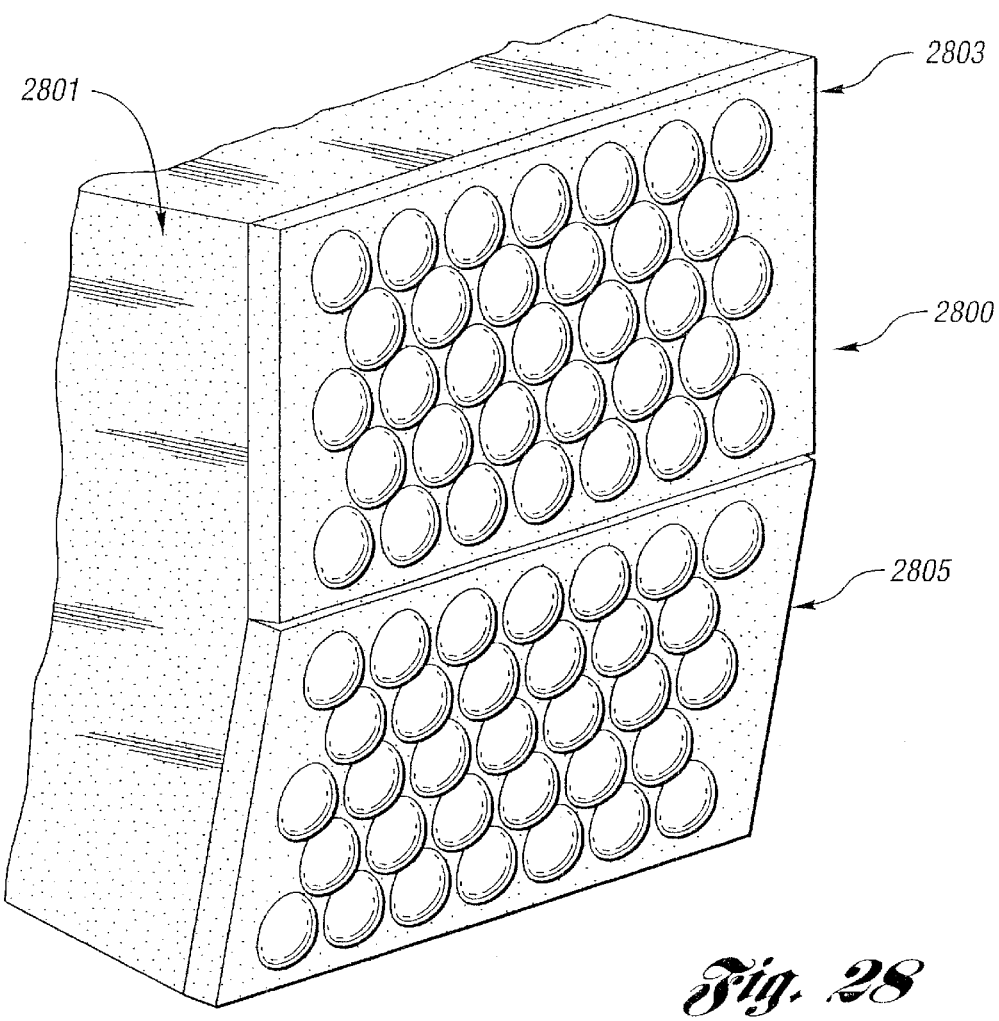
FIG. 28 is a top, front perspective view of an LED headlamp for projecting light in more than one vertical direction.

Another alternative design for a headlamp for providing low a high beams is illustrated in FIG. 28. The headlamp includes a heat extraction member 2701 having two lamp sections 2703 and 2705. The heat extraction member 2801 is configured to include the two lamp sections 2803 and 2805 each of which is substantially identical to lamp 2601. The heat extraction member provides two front faces 2805 and 2807 at an angle of 1 to 2, and may advantageously be angled at approximately 1.5. The angle is exaggerated in the FIG. 28 so that the angled surfaces are readily visible.

By controlling the selection of the LEDs that are illuminated, the headlights can be aimed. It is also envisioned that the front of the car can have LED chips positioned in a bar running across the front grill.

Figure 26C:
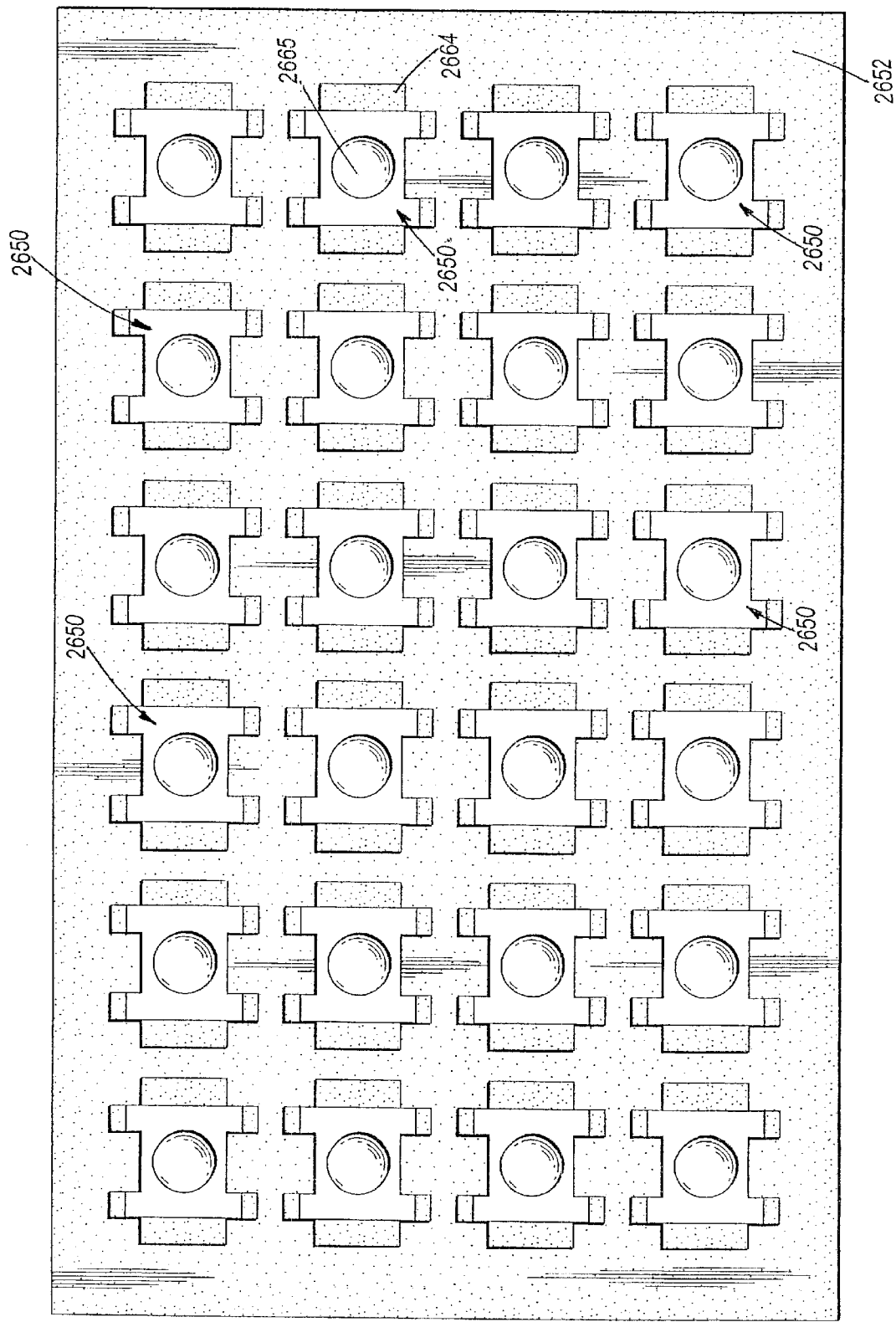
FIG. 26c is a front plan view illustrating an alternate embodiment of an LED lamp.

Whereas the above embodiment takes advantage of directly mounting a number of chips on a common heat sink, it is also envisioned that an array of discrete LED lamps can be used to implement an LED headlamp 2650 (FIGS. 26c and 26d). Each discrete LED lamp preferably includes a heat extraction member for dissipating power generated by the emitters to obtain a brighter light level without damaging the LED components. A particularly advantageous high power LED lamp which is uniquely adapted for conventional manufacturing processes is disclosed in U.S. patent application Ser. No. 09/426,795, entitled SEMICONDUCTOR RADIATION EMITTER PACKAGE, filed on Oct. 22, 1999, by John K. Roberts et al., now U.S. Pat. No. 6,335,548, the disclosure of which is incorporated herein by reference. Other LED lamps that could be used are commercially available from LED manufacturers such as Hewlett Packard Company.

The LED lamps 2650 (only some of which are numbered) are mounted to a circuit board 2652 and heat sink 2654 (FIG. 26d). The circuit board can provide a secondary heat sink, where the conductive layer 2660 of the circuit board exposed to ambient air, by thermally coupling the heat extraction member 2664 of each LED lamp to the conductive layer 2662 of the circuit board. The heat extraction member of the LED lamp is also thermally coupled to the heat sink 2654. In the illustrated embodiment of FIGS. 26c and 26d, the thermally conductive material 2670 is positioned in a hole through the circuit board below the heat extraction member. The thermally conductive material is thicker than the circuit board, and resilient. For example, the thermally conductive material can be provided using a preformed thermal coupler such as a silicon based, cut resistant material commercially available from Bergquist, and identified as Silipad 600. Packages for LED lamps using the heat extraction member are disclosed in U.S. patent application Ser. No. 09/425,792, entitled INDICATORS AND ILLUMINATORS USING A SEMICONDUCTOR RADIATION EMITTER, filed on Oct. 22, 1999, by John K. Roberts et al., now U.S. Pat. No. 6,335,548, the disclosure of which is incorporated herein by reference thereto.

Where red-green-blue or binary complementary lighting is used, it is envisioned that only selected chips will be flashed OFF when attempting to distinguish reflective objects from lamps. Thus, for binary complementary emitters, only amber emitters need to have a briefly reduced intensity. Additionally, it will be recognized that instead of turning the headlamps OFF, the light level can be reduced to a level at which reflections will be below the pixel threshold at which the image sensor assembly will detect an object.

Surface Mounted Filter for Sensor

Figure 29A:
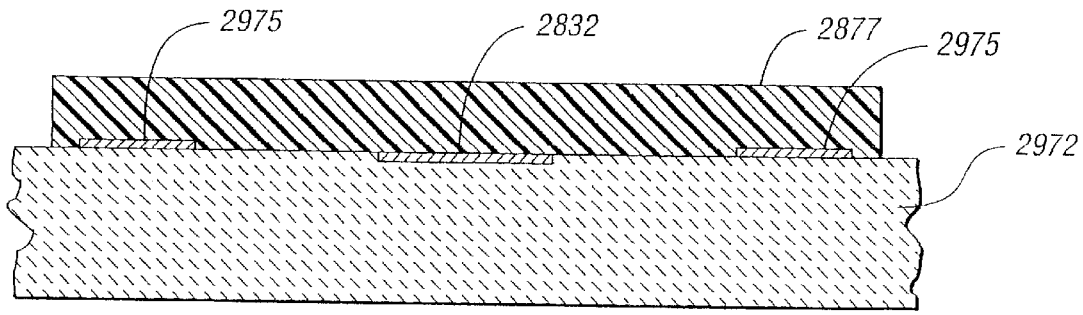
FIGS. 29a–29d illustrates a method of manufacturing surface mounted filters for an image sensor.
Figure 29B:
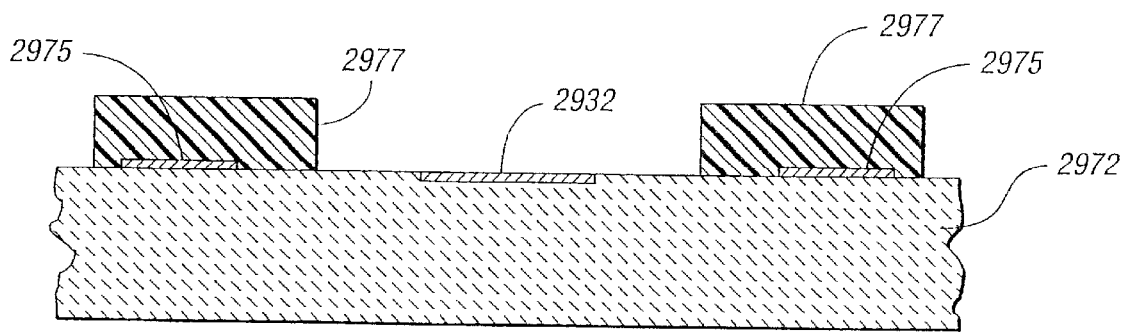
Figure 29C:
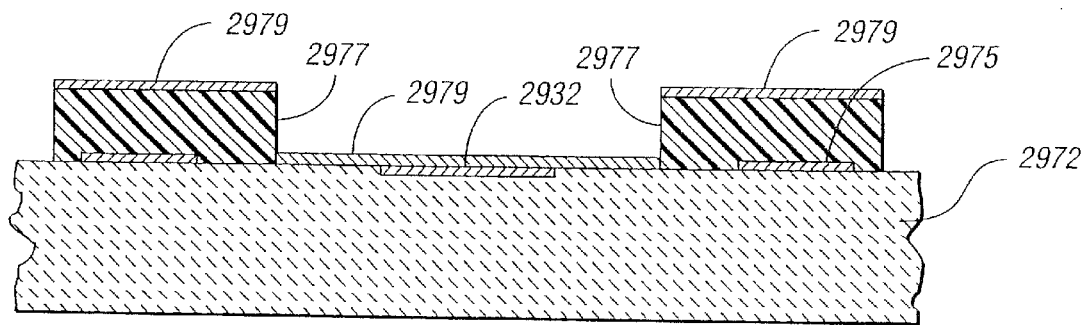

A method by which a filter can be directly deposited onto a semiconductor light sensor 201 will now be described with respect to FIGS. 29a through 29d. In the first step, a photoresist is deposited over the entire wafer. The photoresist may be any suitable commercially available photoresist material. The photoresist is patterned to cover only those areas on the surface of the wafer requiring protection from the optical coating deposition, such as the bonding pad 2975, as shown in FIG. 29b. The optical film coating 2979 is then applied to the surface of the die 2972 as shown in FIG. 30c.

The thin film 2979 is deposited directly on the light sensor in multiple layers. The red and cyan filters, if red and cyan filters are desired, will he applied separately. An example of a cyan filter will be now be described. To make a cyan filter, the layers of titanium dioxide ($TiO_2$) and silicon dioxide ($SiO_2$) described in Table 1 can be used. To make a red filter, the layers described in Table 2 can be used. The layer number is the order in which the material is applied to the wafer surface.

TABLE 1

| Layer | Material | Thickness (nm) |
|---|---|---|
| 1 | $SiO_2$ | 170 |
| 2 | $TiO_2$ | 124 |
| 3 | $SiO_2$ | 10 |
| 4 | $TiO_2$ | 134 |
| 5 | $SiO_2$ | 160 |
| 6 | $TiO_2$ | 79 |
| 7 | $SiO_2$ | 164 |
| 8 | $TiO_2$ | 29 |
| 9 | $SiO_2$ | 168 |
| 10 | $TiO_2$ | 68 |
| 11 | $SiO_2$ | 164 |
| 12 | $TiO_2$ | 33 |
| 13 | $SiO_2$ | 163 |
| 14 | $TiO_2$ | 69 |
| 15 | $SiO_2$ | 154 |

TABLE 1-continued

| Layer | Material | Thickness (nm) |
|---|---|---|
| 16 | $TiO_2$ | 188 |
| 17 | $SiO_2$ | 148 |
| 18 | $TiO_2$ | 88 |
| 19 | $SiO_2$ | 319 |

TABLE 2

| Layer | Material | Thickness (nm) |
|---|---|---|
| 1 | $TiO_2$ | 68 |
| 2 | $SiO_2$ | 64 |
| 3 | $TiO_2$ | 35 |
| 4 | $SiO_2$ | 138 |
| 5 | $TiO_2$ | 57 |
| 6 | $SiO_2$ | 86 |
| 7 | $TiO_2$ | 50 |
| 8 | $SiO_2$ | 78 |
| 9 | $TiO_2$ | 73 |
| 10 | $SiO_2$ | 94 |
| 11 | $TiO_2$ | 54 |
| 12 | $SiO_2$ | 89 |
| 13 | $TiO_2$ | 52 |
| 14 | $SiO_2$ | 87 |
| 15 | $TiO_2$ | 50 |
| 16 | $SiO_2$ | 74 |
| 17 | $TiO_2$ | 28 |
| 18 | $SiO_2$ | 61 |
| 19 | $TiO_2$ | 49 |
| 20 | $SiO_2$ | 83 |
| 21 | $TiO_2$ | 48 |
| 22 | $SiO_2$ | 78 |
| 23 | $TiO_2$ | 48 |
| 24 | $SiO_2$ | 91 |

Figure 29D:
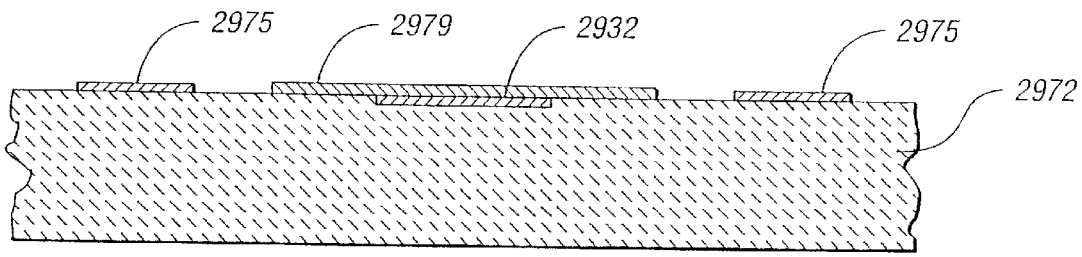

After all of the layers are deposited, the photoresist is lifted off using a conventional lift off process, leaving the film deposited over the light sensitive region, but not over the bonding pads, as shown in FIG. 29d. The resulting die can be encapsulated to provide the image array sensor in conventional packaging.

Figure 31:
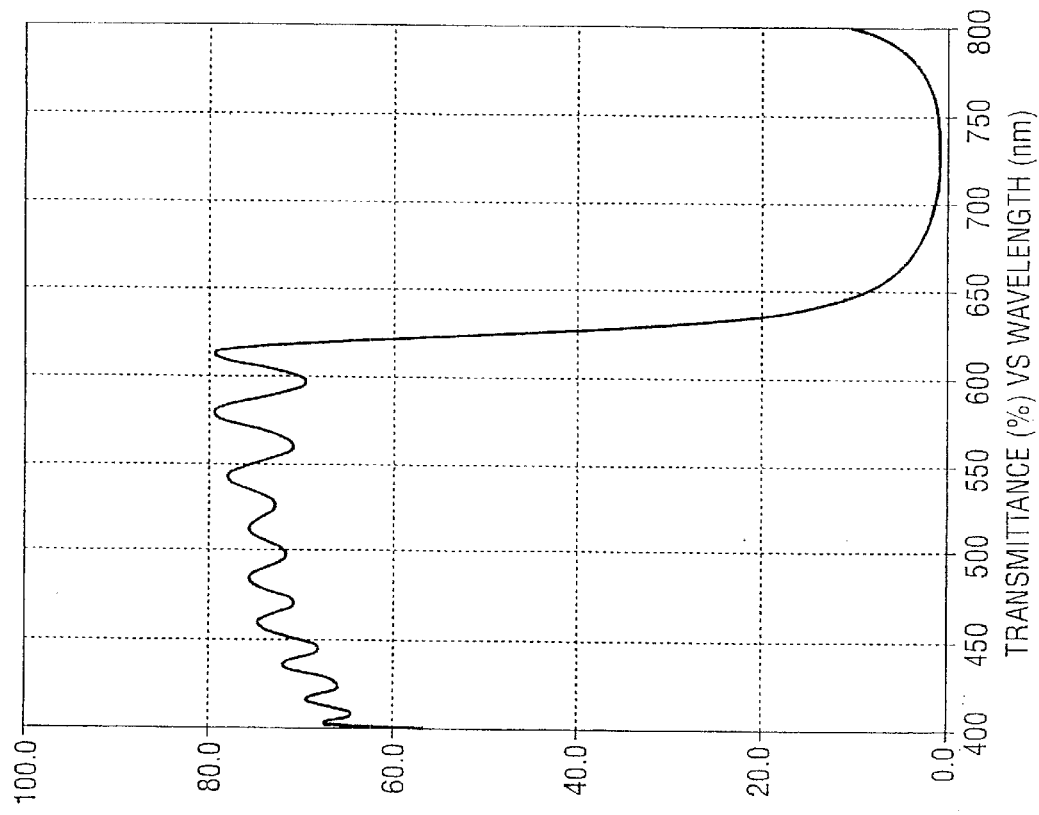
FIG. 31 is chart illustrating the wavelengths passed by a cyan filter surface mounted to an image sensor.
Figure 30:
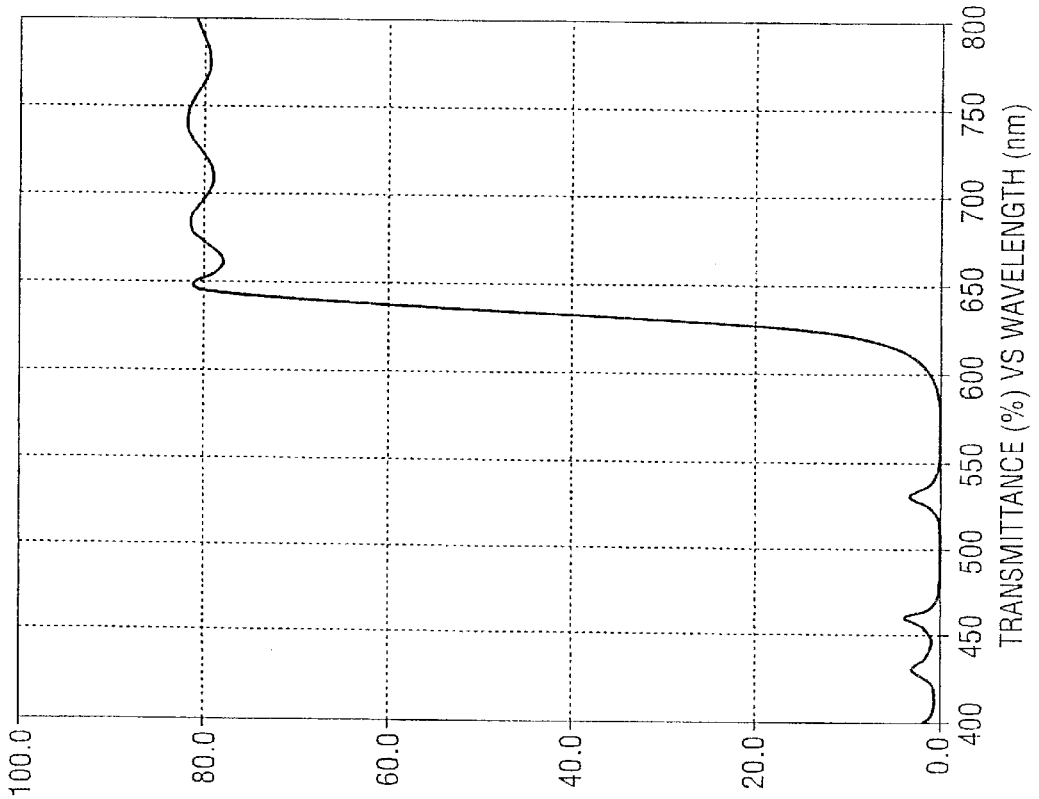
FIG. 30 is chart illustrating the wavelengths passed by a red filter surface mounted to an image sensor.

The characteristics of the filters produced according to Table 1 and Tables 2 are illustrated in FIGS. 30 and 31. In particular, the red filter will attenuate light below 625 nm whereas the blue filter will pass light between approximately 400 nm and 625 nm. Both filters will pass light above 800 nm. An infrared filter can be utilized to reduce the affect of infrared light on the performance of the headlight dimmer.

Those skilled in the art will recognize that the filters described herein are exemplary, and that other filters, materials, or material thickness could be used to implement the filter function. Other materials could be applied in a similar manner to provide these or other filter characteristics.

Those skilled in the art will recognize that the layer thicknesses are rounded to the nearest nanometer. Although there will be some tolerance permitted, good precision in the stack construction is required. It will also be recognized that the layer thicknesses are exemplary. By surface mounting the filters, the cost of providing the image sensor can be greatly reduced, as components and manufacturing complexity are reduced. Additionally, and infrared filter can be applied as a coating between the pixels and the red and blue filters.

Package

Figure 32:
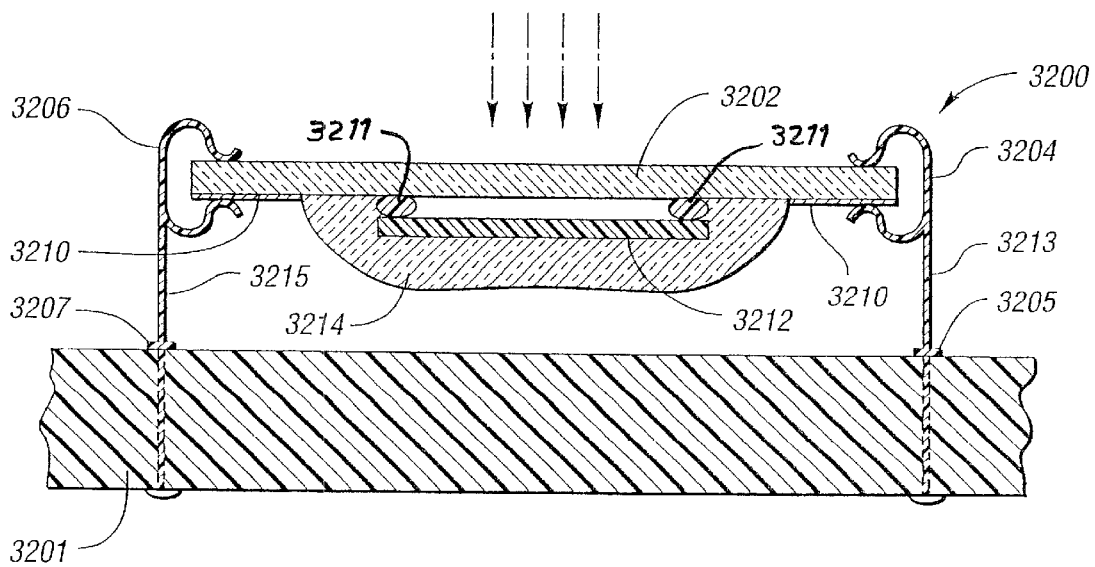
FIG. 32 illustrates another image sensor assembly.

An alternate optical sensor assembly 3200 is disclosed in FIG. 32. Optical sensor assembly 3200 includes a base substrate 3202, which is transparent. The substrate may be manufactured of any suitable material such as a transparent polymer, glass, or the like. Alternately, it is envisioned that the base substrate may be manufactured of a commercially available infrared interference filter such as those described hereinabove. Alternatively, a thin film filter may be attached to a transparent glass element to make the base substrate 3202.

The lower surface of the base substrate has conductive strips 3210 for connection to the image array sensor 3212. The base substrate is preferably an electrical insulator, whereby the strips can be any suitable electrically conductive material applied directly to the lower surface of the base substrate by conventional manufacturing processes. Alternatively, if the base substrate is an electrical conductor, the strips can be applied to an electrical insulator which is in turn applied to the base substrate.

The image array sensor 3212 is flip chip bonded to the lower surface of the base substrate 3202 by soldering pads 3211. A dielectric material, such as an epoxy, encloses the image array sensor. The dielectric material preferably bonds with the conductive strips 3210 and the transparent element 3202. Clips 3204 and 3206 clip onto the edges of the base substrate and make electrical contact with respective conductive strips 3210. A respective clip can be provided for each of the conductive strips 3210. Leads 3213, 3215 extend from the clips for insertion into support substrate 3201, which can be a printed circuit board, a housing, or the like. The support substrate is preferably a printed circuit board carried in a housing, such as a rearview mirror mount housing. The stops 3205, 3207 limit the length of the leads that can be inserted into the support substrate. Alternatively, the clips can be configured for surface mounting. Examples of surface mountable clips include NAS Interplex Edge Clips, from NAS Interplex, an Interplex Industries Company located in Flushing N.Y., USA.

Packages for mounting the image array sensor are described in U.S. patent application Ser. No. 09/137,909, OPTICAL SENSOR PACKAGE AND METHOD OF MAKING THE SAME, filed on Aug. 21, 1998 by Fred Bauer et al, the disclosure of which is incorporated herein by reference.

The assembly of the lens to the base substrate can be provided in the same manner as described hereinabove. In particular, the lens structure 3224 is carried on the base substrate 3202. The lens structure can be identical to the lens structure 202, and thus can be half clear and half red, or half cyan and half red, or entirely clear where a color filter is applied directly to the surface of the image sensor as described herein above with respect to FIGS. 29a–29d. To make the lens assembly, a transparent member 3220 and a UV curable adhesive 3222 can be used. The transparent member 3220 can be an epoxy member like members 230, 802. The UV curable adhesive can be identical to adhesive 232.

Radar

A wave transceiver 101 (FIG. 1) can be used to acquire additional intelligence usable for controlling the operation of the controlled vehicle 101. The wave transceiver can be used without the image array sensor 201, or it can be used with the image array sensor. The wave transceiver device 101 is mounted on a vehicle 102 and oriented in a generally forward direction. The wave transceiver device 101 is positioned to receive the reflections of waves emitted by the transceiver device after they have reflected off of objects in front of the vehicle 102. The wave-emitting device may be a radar system operating, for example, in a frequency range exceeding 1 GHz (77 GHz is designated for vehicular radar in many European countries) or an optical radar utilizing, for example, laser diodes for the wave-emitting device. Alternatively, the wave-emitting device 101 may be an ultrasonic transducer emitting ultrasonic waves. The wave-emitting device may be scanned across the forward field to cover various angles. For the purposes of this invention the term radar will be used to encompass all of these concepts. The wave transceiver should not be interpreted as being limited to any specific type or configuration of wave transmitting or wave receiving device. The transmitter and receiver may each be mounted within a different respective housing or they both may be mounted in a common housing.

Figure 33:
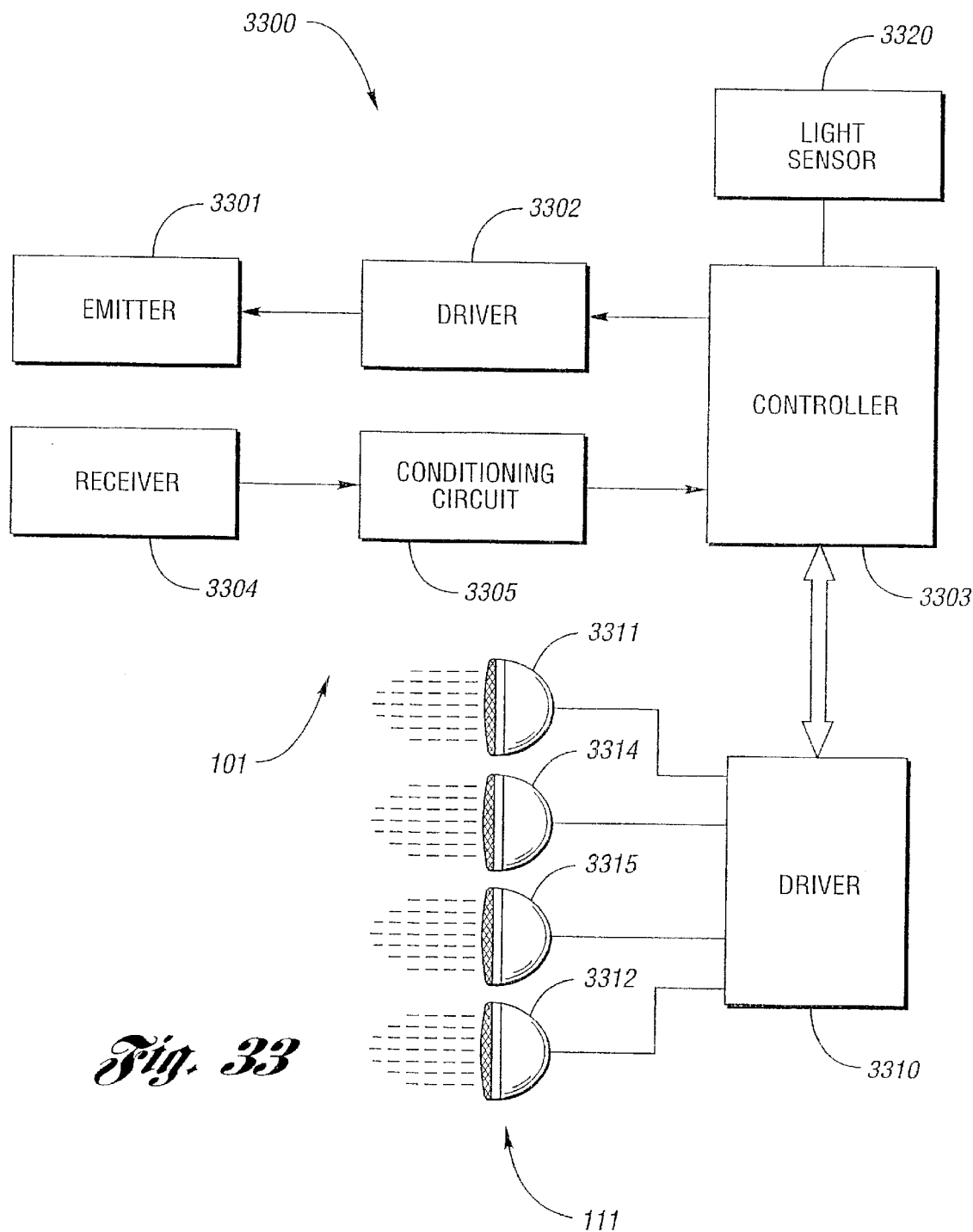
FIG. 33 illustrates an electrical system including a wave sensitive headlamp control.

A radar processing system 3300 (FIG. 33) controls the wave transmitting section 3301, 3302 and interprets the signal received by the wave receiving section 3304, 3305 to determine the presence of objects as well as the speed and direction of such objects. A headlamp controller 3303 receives target information from the radar processing system, and may optionally also receive signals from the vehicle speed sensor (such as a speedometer) and a vehicle direction sensor (such as a compass) and generates a control signal which determines the state of the vehicle headlamps 111. The communication between the radar processing system, the vehicle speed sensor, the vehicle direction system and the vehicle headlamps my be by one of many mechanisms including direct wiring through a wiring harness or by a vehicle communication bus such as the CAN bus. Additionally, systems such as the radar processing system and the headlamp controller may be implemented by a single integrated processor, multiple processors, digital signal processors, microcontrollers, microprocessors, programmable logic units, or combinations thereof.

More particularly, the system contains a radar system which includes a wave-transmitting section and a wave receiving section. The wave transceiver 101 includes an emitter 3301 and a receiver 3304. The transmitter may be implemented using an antenna for a conventional radar, a light source for optical radar, an ultrasonic emitter, an antenna system for a Doppler radar system, or the like. The receiver 3304 may be implemented using an antenna in a conventional radar system, a light receiving element in an optical radar system, an ultrasonic receiver, a wave guide antenna in a Doppler radar system, or the like. A driver 3302 is connected to the emitter 3301 to condition signals from controller 3303 so that emitter 3301 produces signals which when reflected can be detected by the detector 3304. The driver 3302 may be implemented using a pulse modulator, a pulse shaper, or the like. The detector 3304 is connected to a conditioning circuit 3305 which conditions the signals detected by the receiver for further processing by microcontroller 3303. The conditioning circuit may include a demodulator, a filter, an amplifier, an analog-to-digital converter (ADC), combinations thereof, and the like. The microcontroller 3303 may be implemented using a microprocessor, a digital signal processor, a microcontroller, a programmable logic unit, combinations thereof, or the like.

The operation of radars to determine the presence of objects relative to a vehicle are well known, and will not be described in greater detail hereinbelow. For example, the time between the transmitted wave and the detection of the reflected wave may be used to determine the distance of an object. The movement of an object over successive transmission/reception cycles may be used to determine an object's relative speed and direction. Doppler radar may also be used to determine the objects speed. The magnitude of the reflected wave may be used to determine the size or density of the detected object. Operation of radars is well known, and will not be described in greater detail herein.

In order to properly control the high beam state of the controlled vehicle 100 it is necessary to determine if an object detected by the radar is a vehicle or a stationary object and, if a vehicle, whether the vehicle is an oncoming vehicle 105 or preceding vehicle 110. This can be accomplished by comparing the speed and direction of the object with the speed and direction of the control vehicle 100. The speed and direction of travel of the object is obtained using the radar principles described above. The speed of the control vehicle 100 may be obtained from a speed sensor on the vehicle, a global positioning system (GPS) system, or the like. The direction of the control vehicle 100 may be obtained from a compass sensor, a steering wheel turn indicator, a GPS, or the like.

Once this information is obtained, a simple set of criteria is applied to determine if the object is a vehicle or a stationary object. If an object is stationary, it will be moving in a direction opposite the control vehicle 100 at the same speed as the control vehicle. If an object is an oncoming vehicle 106, it will be traveling in a direction approximately opposite the control vehicle 100 at a speed substantially faster than that of the control vehicle. Finally, if an object is not moving relative to the controlled vehicle or the object is moving at a rate substantially slower than the controlled vehicle, the object is likely a preceding vehicle 104. The distance at which the high beams are dimmed may be a function of the speed of the control vehicle and may be a function of the angle between an axis straight forward of the control vehicle 100 and the oncoming vehicle 106 or preceding vehicle 104.

In a more advanced system the headlamp control system not only controls the high/low beam state of the headlamps 3311, 3312 and bright lamps 3314, 3315 based on the presence of one or more vehicles, but may vary the brightness of the high beam headlamps and low beam headlamps to provide a continuous transition between the two beams as a function of the distance to the nearest other vehicle, thus maximizing the available luminance provided to the driver of the controlled vehicle without distraction to the other driver. A continuously variable headlamp system is disclosed in U.S. patent application Ser. No. 09/157,063, entitled CONTINUOUSLY VARIABLE HEADLAMP CONTROL, filed on Sep. 18, 1998, by Joseph Stam et al., the disclosure of which is incorporated herein by reference thereto. The system may also vary the aim of the controlled vehicles headlamp in the vertical direction. The system may be configured to transition between more than two beams or may be configured to perform a combination of aiming and varying the brightness or one or more lamps. The headlamp processing system may also use the vehicle direction input to determine the proper horizontal aim of the headlamps to provide better illumination when traveling on curves. An LED headlamp that facilitates aiming is disclosed in United States patent Attorney Docket Auto 707P2 incorporated herein by reference thereto.

A light sensor 3320 can be used to detect ambient light levels and may optionally provide other light conditions. The light sensor may be implemented using a non-imaging sensor such as a silicon photodiode, a particularly advantageous photodiode disclosed in U.S. patent application Ser. No. 09/237,107, entitled PHOTODIODE LIGHT SENSOR, filed by Robert Nixon et al., now abandoned, the disclosure of which is incorporated herein by reference thereto, although other non-imaging photocells could be used such as cadmium sulphide (CdS) cells, or the like. The light sensor 3320 can be alternately be implemented using a optical image sensor 102 in addition to, or instead of, a non-imaging light sensor.

The optical system may contain filters to determine the color of a light source. The combination of an optical system with a radar system may better overcome the limitations present if only one or the two systems are used independently. For example, if a radar system is used independently of an imaging system, an oncoming or preceding vehicle waiting at an intersection would be perceived by the radar system as a stationary object. However, by combining an optical sensor with the radar system, the lights on the waiting vehicle would indicate that a vehicle is present and the radar can determine the actual distance to the vehicle. In general, if an optical system is used, the optical system may be used to determine the presence of oncoming or preceding vehicles and the radar system may be used to determine the actual distance to such oncoming or preceding vehicle as well as the speed of that vehicle. In this manner, the radar detector and the imaging sensor can be used to verify the presence of other objects. Additionally, the light sensors can be used to determine light conditions, such as ambient light levels.

The presence of the radar system on the vehicle may enable other features other than headlamp control to be implemented utilizing the same components as the headlamp radar, thus reducing the cost of the two systems combined. Such system may include, for example, adaptive cruise control, obstacle warning systems, collision avoidance systems, autonomous driving systems, or the like. In this case, the wave transmitting section, wave receiving section, and radar processing systems could be shared by all features while each feature has it's own processing system for determining a course of action based upon the information received from the radar processing system. It is also possible to integrate the processing systems from each feature into a single processor.

A radar system is described in U.S. patent application Ser. No. 09/531,211 entitled AUTOMATIC HEADLAMP CONTROL SYSTEM, filed on the same date as this application, the disclosure of which is incorporated herein by reference.

While the invention has been described in detail herein in accordance with certain embodiments thereof, many modifications and changes may be effected by those skilled in the art without departing from the spirit of the invention. Accordingly, it is intended that the appended claims not be limited by way of details and instrumentalities describing the embodiments shown herein.

We claim:

1. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

identifying at least one group of contiguous pixels that is associated with a light source;

analyzing the associated group of pixels to determine at least one of the following properties of the pixel group: the number of pixels in the group, the width, the height, a total gray scale value, and a centroid location; and selectively generating a headlamp control signal in accordance with the at least one property determined in the analysis.

2. The method of claim 1, wherein the step of identifying a group of pixels associated with a single light source identifies a plurality of pixels meeting a pixel criteria.

3. The method of claim 2, wherein the step of identifying a group of pixels identifies a contiguous group of pixels meeting a pixel criteria.

4. The method of claim 2, wherein the step of identifying a plurality of pixels meeting a pixel criteria identifies individual pixels having levels above a pixel threshold level.

5. The method of claim 1, wherein the step of analyzing determines the size of at least one group of pixels.

6. The method of claim 5, wherein the at least one property is whether the light source size is greater than a threshold size.

7. A method of automatically controlling vehicle headlamps in a system comprising an image sensor generating a plurality of pixel levels from a scene being imaged and a controller to generate headlamp control signals, the method comprising the steps of:
  receiving pixel levels from the image sensor;
  identifying at least one group of pixels that is associated with a light source;
  analyzing the associated pixels to identify the centroid of at least one group of pixels; and
  selectively generating a headlamp control signal as a function of the identified centroid.

8. A method of automatically controlling vehicle headlamps in a system comprising an image sensor generating a plurality of pixel levels from a scene being imaged and a controller to generate headlamp control signals, the method comprising the steps of:
  receiving pixel levels from the image sensor;
  identifying at least one group of pixels that is associated with a light source; and
  analyzing the associated pixels to determine the average level of the pixel levels,
  wherein the headlights are not controlled responsive to a group of pixels that is greater than the threshold size if the average pixel level in that group of pixels is less than an average pixel level threshold.

9. A method of automatically controlling vehicle headlamps in a system comprising an image sensor generating a plurality of pixel levels from a scene being imaged and a controller to generate headlamp control signals, the method comprising the steps of:
  receiving pixel levels from the image sensor;
  identifying at least one group of pixels that is associated with a light source;
  analyzing the associated pixels to determine the total pixel level for at least one group of pixels; and
  selectively generating a headlamp control signal in accordance with the results of the analysis.

10. The method of claim 9, where the total pixel level is the sum of the grey scale values for all of the pixels in a group of pixels.

11. The method of claim 9, where the step of analyzing the associated pixels includes determining whether the total pixel level exceeds a threshold total pixel level.

12. The method of claim 10, further including a threshold total pixel level for the headlights and a threshold total pixel level for tail lights.

13. A method of automatically controlling vehicle headlamps in a system comprising an image sensor generating a plurality of pixel levels from a scene being imaged and a controller to generate headlamp control signals, the method comprising the steps of:
  receiving pixel levels from the image sensor;
  identifying at least one group of pixels that is associated with a light source;
  analyzing the associated pixels to determine the average pixel level for at least one group of pixels; and
  selectively generating a headlamp control signal in accordance with the results of the analysis.

14. The method of claim 13, wherein the condition is a threshold average pixel level, and the controller ignores certain light sources where the average pixel level for the group of pixels is below the average pixel level.

15. A method of automatically controlling vehicle headlamps in a system comprising an image sensor generating a plurality of pixel levels from a scene being imaged and a controller to generate headlamp control signals, the method comprising the steps of:
  receiving pixel levels from the image sensor;
  analyzing an image input with red filtering to identify objects of interest;
  analyzing an image input without red filtering in those areas where objects were identified in the step of analyzing with red filtering; and
  selectively generating a headlamp control signal in accordance with the results of the steps of analyzing.

16. The method of claim 15, further including the step of comparing pixels levels in the image generated with red filtering to pixel levels in the image generated without red filtering for each of the objects of interest.

17. The method of claim 15, wherein the step of analyzing an image input with red filtering includes identifying groups of contiguous pixels meeting a threshold criteria to identify objects.

18. The method of claim 17, wherein the step of analyzing an image input without red filtering includes searching for groups of contiguous pixels in areas corresponding to objects identified in the step of analyzing an image input without red filtering.

19. A method of automatically controlling vehicle headlamps in a system comprising an image sensor generating a plurality of pixel levels from a scene being imaged and a controller to generate headlamp control signals, the method comprising the steps of:
  receiving pixel levels from the image sensor;
  receiving an ambient light level; and
  analyzing an image input from the image sensor according to the ambient light level to selectively generate a headlamp control signal in accordance with the results of the analysis, wherein daytime running lights are enabled when the ambient light level is above a first threshold, low beam headlamps are enabled when the ambient light level is below the first threshold, and the low beam headlamps and high beam headlamps are enabled when the ambient light level is below a second threshold, and wherein the high beam headlamps are controlled automatically responsive to the pixel levels from the image sensor, the second threshold representing a lower ambient light level than the first threshold.

20. The method of claim 18, further including controlling one or more fog lights responsive to the ambient light sensor and the image sensor.

21. The method of claim 19, wherein the step of controlling includes evaluating the pixels of the image sensor to determine if they meet a fog criteria if the ambient light level measured by the ambient light sensor is within a predetermined range.

22. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

analyzing the image input from the image sensor to determine the number of AC light source objects in the image; and selectively generating a headlamp control signal in accordance with the results of the steps of analyzing, and inhibiting operation of the high beams when the number AC light source objects exceeds a threshold.

23. The method as defined in claim 22, wherein the step of analyzing the image to detect objects monitors the frequency of occurrence of objects within a predetermined period.

24. The method as defined in claim 23, wherein the predetermined period is a predetermined number of frames.

25. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

analyzing the image input from the image sensor to determine the number of objects in the image; and selectively generating a headlamp control signal in accordance with the results of the steps of analyzing, wherein the vehicle headlamps are not adjusted responsive to detection of an object unless it appears in a threshold number of frames, wherein the threshold number of frames is a function of the brightness of the objects detected.

26. The method of claim 25, wherein the brighter the object detected, the smaller will be the threshold number of frames.

27. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

analyzing the image input from the image sensor to determine the number of objects in the image; and selectively generating a headlamp control signal in accordance with the results of the steps of analyzing, wherein the vehicle headlamps are not adjusted responsive to detection of an object unless it appears in a threshold number of frames, wherein the brightness of the headlamps are gradually altered after an object is detected for the threshold number of frames.

28. The method of claim 27, wherein after an object is detected for the threshold number of frames, the high beams may be adjusted responsive to each successive frame in which the object appears.

29. The method of automatically controlling vehicle headlamps in a system comprising an image sensor generating a plurality of pixel levels from a scene being imaged and a controller to generate headlamp control signals, the method comprising the steps of:

receiving pixel levels from the image sensor;

analyzing the image input from the image sensor to determine the number of objects in the image; and selectively generating a headlamp control signal in accordance with the results of the steps of analyzing, wherein the vehicle headlamps are not adjusted responsive to detection of an object unless it appears in a threshold number of frames, wherein the headlamp brightness is increased after the image clears for the threshold number of frames.

30. The method of claim 29, wherein the headlamp brightness is dimmed after an object is detected in the image for the threshold number of frames.

31. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

identifying pixels that are associated with an object;

analyzing the associated pixels and storing information associated with at least one detected object in an object list;

analyzing the objects in the object list to generate a light list; and selectively generating a headlamp control signal in accordance with an analysis of the light list.

32. The method of claim 31, wherein the stored information includes the brightness of at least one object detected.

33. The method of claim 32, wherein the stored information includes the location of at least one object detected.

34. The method of claim 31, wherein the stored information includes the locations and brightness of the brightest object detected.

35. A method of automatically controlling vehicle headlamps in a system comprising a sensor for sensing light sources forward of the vehicle and a controller to generate headlamp control signals, the method comprising the steps of:

detecting the passage of an oncoming vehicle; and if, following passage of the oncoming vehicle, the sensor does not sense any light sources and the high beams are OFF, the high beams are controlled to produce a fast return to bright.

36. The method of claim 35, wherein the control of the high beams to produce a fast return to bright includes an expedited fade to bright.

37. The method of claim 35, wherein the control of the high beams to produce a fast return to bright comprises turning the high beams ON without delay.

38. A method of automatically controlling vehicle headlamps in a system comprising a sensor for sensing light sources forward of the vehicle and a controller to generate headlamp control signals, the method comprising the steps of:

detecting the passage of a preceding vehicle; and if, following passage of the preceding vehicle, the sensor does not sense any light sources and the high beams are OFF, the high beams are controlled to produce a tail light delayed return to bright.

39. The method of claim 38, wherein the tail light delayed return to bright is longer than a return to bright following detection of headlights from an oncoming vehicle.

40. The method of claim 38, wherein the tail light delayed return to bright is variable.

41. The method of claim 38, wherein the tail light return to bright is dependent on the detection of glare light.

42. The method of claim 41, wherein the high beams are turned on when glare is detected.

43. The method of claim 42, wherein if glare is not detected in a maximum threshold time after detecting the cleared image, the high beams are turned ON even if glare has not been detected.

44. A method of automatically calibrating the aim of an image sensor in a controlled vehicle, comprising the steps of:

detecting a distant light of an oncoming vehicle;

detecting a straight road condition; and generating a new average value from the location of the distant oncoming light averaged with a stored average if the straight road condition is detected, and storing the new average value as the stored average signal.

45. The method of claim 44, wherein the step of detecting a distant light comprises detecting a faint light near the center of the image sensor.

46. The method of claim 44, further including the step of detecting elevation change of the controlled vehicle.

47. The method of claim 44, wherein the step of detecting a straight road detects the lateral movement of the controlled vehicle over a period of time.

48. The method of claim 47, wherein the period of time is from the time that the distant light is detected until a time period after the distant vehicle and the controlled vehicle have passed.

49. The method of claim 47, wherein lateral movement is detected by determining the lateral movement of the distant headlight.

50. The method of claim 47, wherein lateral movement is detected using a global positioning system.

51. The method of claim 47, wherein lateral movement is detected from a compass.

52. The method of claim 47, wherein lateral movement is detected from operation of the steering system.

53. The method of claim 44, wherein the average value is used to calibrate the aim of the image sensor.

54. The method of claim 44, wherein the average value is used to determine a region of analysis in the image obtained by the image sensor.

55. The method of claim 44, wherein the aim of the image sensor is calibrated only when the vehicle is traveling at a speed falling within a predetermined range of speeds.

56. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

analyzing the pixel levels associated with a scene at a specified sensitivity, wherein the specified sensitivity is altered in response to a vehicle turn; and selectively generating a headlamp control signal in accordance with the results of the analysis.

57. The method of claim 56, wherein the image analyzed is shifted when the vehicle turns.

58. The method of claim 51, wherein the image analyzed is shifted when the vehicle turn signal is actuated.

59. The method of claim 51, wherein the specified sensitivity is altered by altering thresholds to which the pixel levels are compared during the step of analyzing.

60. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

analyzing the pixel levels associated with a scene, wherein the analysis is altered when the vehicle turns; and selectively generating a headlamp control signal in accordance with the results of the analysis, wherein the analysis of the image is altered when the vehicle heading as detected from a compass is altered.

61. The method of claim 60, wherein the analysis is altered after actuation of the vehicle brakes following actuation of the vehicle's turn signal.

62. A method of automatically controlling vehicle headlamps in a system comprising an image sensor generating a plurality of pixel levels from a scene being imaged and a controller to generate headlamp control signals, the method comprising the steps of:

receiving pixel levels from the image sensor, wherein the pixel levels are acquired and stored while the vehicle headlamps are momentarily deactivated;

analyzing the pixels to detect objects; and selectively generating a headlamp control signal in accordance with the results of the analysis.

63. The method of claim 62, wherein the vehicle includes semiconductor radiation emitter light source, wherein the light is flashed off for a very short interval.

64. The method of claim 63, wherein the off interval is less than 60 ms.

65. A method of automatically controlling vehicle headlamps in a system comprising an image sensor generating a plurality of pixel levels from a scene being imaged through a windshield, a windshield wiper for clearing the windshield, and a controller to generate headlamp control signals, the method comprising the steps of:

receiving signals indicative of the location of the windshield wiper;

receiving pixel levels from the image sensor when the windshield wiper is not in front of the image sensor;

analyzing the associated pixels to identify objects; and selectively generating a headlamp control signal in accordance with the results of the analysis.

66. The method of claim 65, further including the step of monitoring the window using an image sensor focused on the window to detect the presence of the windshield wiper in the field of view of the image sensor for detecting objects.

67. The method of claim 65, further including the step of monitoring the windshield wipers to detect their position.

68. A vehicle system, comprising:

an image sensor for detecting lights;

an ambient light sensor;

a glare sensor;

an electrochromic element for controlling the reflectivity of a mirror;

headlights; and a controller coupled to the image sensor, the ambient light detector, the glare sensor, the electrochromic element, and the headlights, wherein the controller is operable to control the headlights responsive to the image sensor and the ambient light sensor, and the controller being further operable to control the transmittance of the electrochromic element responsive to the ambient light sensor and the glare sensor, and further comprising a rearview mirror assembly adapted for mounting to a vehicle and supporting said electrochromic element, wherein said controller is carried on said rearview mirror assembly.

69. A method of operating an image sensor generating a plurality of pixel levels from a scene being imaged, the method comprising the steps of:

receiving pixel levels from the image sensor;

identifying a bad pixel if a pixel continuously detects light when adjacent pixels do not detect light; and selectively compensating for the identified pixels.

70. The method of claim 69, wherein the step of identifying a pixel that continuously detects light comprises determining that the pixel detects light over a predetermined number of frames.

71. The method of claim 70, wherein the step of identifying includes detecting when a pixel detects light above a pixel threshold over a predetermined number of frames and adjacent frames do not detect light above a pixel threshold over the predetermined number of frames.

72. The method of claim 69, wherein the step of selectively compensating comprises generating an average of the adjacent pixels and substituting the generated average for the pixel level measurement of the bad pixel.

73. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

analyzing the image input from the image sensor using different thresholds for different pixels based on their pixel location;

changing the different thresholds for the pixels based on their pixel location as the vehicle changes direction; and selectively generating a headlamp control signal in accordance with the results of the steps of analyzing.

74. The method of claim 73, wherein the step of analyzing the image includes using a spatial look-up table, the spatial look-up table having different thresholds for different pixels based on their pixel location.

75. The method of claim 74, wherein the step of changing thresholds includes shifting the pixels associated with the values stored in the spatial look-up table as the vehicle changes direction.

76. The method of claim 75, wherein the step of shifting the pixels includes shifting the pixels responsive to operation of the vehicle steering system.

77. The method of claim 75, wherein the step of shifting the pixels includes shifting the pixels responsive to a global positioning system input.

78. The method of claim 75, wherein the step of shifting the pixels includes shifting the pixels responsive to a compass input.

79. The method of claim 73, wherein the high beams are controlled responsive to those pixels from the image sensor exceeding its respective pixel threshold.

80. A method of automatically controlling vehicle headlamps in a system comprising an image sensor generating a plurality of pixel levels from a scene being imaged and a controller to generate headlamp control signals, the method comprising the steps of:

receiving pixel levels from the image sensor;

analyzing the image input from the image sensor using different thresholds for different pixels based on their pixel location, the different thresholds rendering the image sensor more sensitive to one side of the car than the other side of the car; and selectively generating a headlamp control signal in accordance with the results of the steps of analyzing.

81. The method of claim 80, wherein the step of analyzing the image includes using a spatial look-up table, the spatial look-up table having different thresholds for different pixels based on their pixel location.

82. The method of claim 81, wherein the spatial look-up table has values which render the image sensor more sensitive to one side of the car than the other side of the car.

83. The method of claim 80, wherein the image sensor is more sensitive to the side of the car on which the driver sits.

84. The method of claim 80, wherein the high beams are controlled responsive to those pixels from the image sensor exceeding its respective pixel threshold.

* * * * *

UNITED STATES PATENT AND TRADEMARK OFFICE
CERTIFICATE OF CORRECTION

PATENT NO.    : 6,611,610 B1
DATED         : August 26, 2003
INVENTOR(S)   : Joseph S. Stam et al.

It is certified that error appears in the above-identified patent and that said Letters Patent is hereby corrected as shown below:

Column 1,
Line 23, replace "modem" with -- modern --.
Line 44, replace "at 3, 3250 cd at 6, 1500 cd at 9" with -- cd at 0°, 10,000 cd at 3°, 3250 cd at 6°, 1500 cd at 90 --.
Line 45, replace "at 12" with -- at 12° --.
Lines 54 and 60, replace "of 0" with -- of 0° --.
Line 54, replace "of 3" with -- of 3° --.
Line 57, replace "of 6" with -- of 6° --.
Line 62, replace "vehicles" with -- vehicle's --.

Column 2,
Line 4, replace "preceding" with -- a preceding --.
Line 21, replace "vehicle" with -- the vehicle --.

Column 3,
Lines 36-37, replace "taken along plane 26b-26b" with -- of a portion of the LED headlamp shown --.
Lines 41-42, replace "taken along plane 26d-26d" with -- of a portion of the LED headlamp shown --.
Lines 51 and 54, replace "chart" with -- a chart --.
Line 67, replace "shinning" with -- shining --.

Column 4,
Line 14, replace "A-pilar" with -- A-pillar --.
Lines 56-57, replace "all of the these applications and patents" with -- this application and all of these patents are --.

Column 5,
Line 17, replace "at" with -- of --.

Column 6,
Line 32, replace "209," with -- 209 --.
Line 46, replace "1.5" with -- 2.5 --.
Line 55, replace "offset" with -- be offset --.

Column 7,
Line 12, replace "form" with -- from --.
Line 14, replace "Cyan" with -- cyan --.
Line 31, replace "patent application Serial No. 09/093,993" with -- Patent No. 6,130,421 --.
Line 52, replace "head lamps" with -- headlamps --.
Line 56, delete "of-the".

UNITED STATES PATENT AND TRADEMARK OFFICE
CERTIFICATE OF CORRECTION

PATENT NO.   : 6,611,610 B1
DATED        : August 26, 2003
INVENTOR(S)  : Joseph S. Stam et al.

It is certified that error appears in the above-identified patent and that said Letters Patent is hereby corrected as shown below:

Column 8,
Line 38, replace "10" with -- 10° --.
Line 38, replace "25" with -- 25° --.
Lines 59-60, replace "patent application Serial No. 09/093,993" with -- Patent No. 6,130,421 --.
Line 61, replace "John" with -- Jon --.

Column 9,
Lines 6-7, replace "Santa Rosa California" with -- Santa Rosa, California, --.
Line 39, replace "Coming" with -- Corning --.
Line 39, replace "Midland Mich." with -- Midland, Mich. --.
Line 51, replace "Transene Co," with -- Transene Co., --.

Column 10,
Line 12, replace "This is" with -- This --.

Column 11,
Lines 23-24, replace "patent application Serial No. 09/093,993" with -- Patent No. 6,130,421 --.
Line 46, replace "provide and" with -- provide an --.
Lines 53 and 58-59, replace "rear view" with -- rearview --.

Column 12,
Lines 1 and 8, replace "rear view" with -- rearview --.
Line 61, replace "111" with -- 111 which are --.

Column 13,
Line 13, replace "provides" with -- and provides --.
Line 29, replace "rear view" with -- rearview --.
Line 33, replace "1127" with -- 1127. --.

Column 14,
Line 21, replace "1127" with -- 1127. --.
Line 23, replace "US patent application Ser. No. 09/157,063" with -- US Patent No. 6,049,171 --.
Line 33, replace "1 132" with -- 1132 --.
Lines 35-36, replace "patent application Serial No. 09/157,063" with -- Patent No. 6,049,171 --.

UNITED STATES PATENT AND TRADEMARK OFFICE
CERTIFICATE OF CORRECTION

PATENT NO. : 6,611,610 B1
DATED : August 26, 2003
INVENTOR(S) : Joseph S. Stam et al.

It is certified that error appears in the above-identified patent and that said Letters Patent is hereby corrected as shown below:

Column 15,
Line 9, replace "14" with -- Fourteen --.

Column 16,
Line 7, replace "No. 5 679,283" with -- No. 5,679,283 --.
Lines 30-31, replace "pulse width modulated" with -- pulse-width-modulated --.
Line 58, replace "above" with -- above, --.

Column 17,
Line 10, replace "on" with -- ON --.
Lines 16-17, replace "US patent application Serial No. 09/157,063" with -- U.S. Patent No. 6,049,171 --.
Line 27, replace "25" with -- 25° --.
Line 27, replace "15" with -- 15° --.

Column 18,
Line 19, replace "13" with -- 13° --.
Line 20, replace "703" with -- 703 (Fig. 7) --.

Column 20,
Line 6, replace "blue" with -- cyan --.
Line 54, replace "CALL" with -- CALLS --.

Column 21,
Line 16, replace "special" with -- spatial --.
Line 17, replace "decision" with -- condition in --.
Line 20, replace "it's" with -- its --.
Line 23, replace "grey" with -- grey scale --.
Line 42, replace "move" with -- look at pixels --.
Line 52, replace "algorithm" with -- variable --.
Line 53, replace "it occurs" with -- the step is executed --.

Column 22,
Line 8, replace "got" with -- go --.
Line 20, replace "pixels grey" with -- pixel's grey scale --.
Lines 20, 21, 32, 38 and 49, replace "grey" with -- grey scale --.
Line 40, replace "grey" with -- grey scale -- (1st occurrence).
Line 40, replace "grey" with -- grey scale -- (2nd occurrence).
Lines 52, 57 (both occurrences), 58 and 59, replace "won't" with -- will not --.
Line 65, replace "as" with -- as it --.

UNITED STATES PATENT AND TRADEMARK OFFICE
CERTIFICATE OF CORRECTION

PATENT NO. : 6,611,610 B1
DATED : August 26, 2003
INVENTOR(S) : Joseph S. Stam et al.

It is certified that error appears in the above-identified patent and that said Letters Patent is hereby corrected as shown below:

Column 23,
Line 11, replace "right" with -- right, --.
Line 26, replace "23," with -- 23, has the --.
Line 27, replace "looking" with -- now looks --.
Line 28, replace "not clear" with -- cleared --.
Line 42, replace "the" with -- If the --.
Line 57, replace "blue" with -- cyan --.

Column 24,
Line 2, replace "correspond to" with -- correspond to the --.
Lines 4 and 14, replace "grey" with -- grey scale --.
Line 9, replace "blue" with -- cyan --.
Line 37, replace "step" with -- steps --.
Line 39, replace "proceeding" with -- preceding --.
Line 53, replace "an extremely bright" with -- "Extremely Bright" --.
Line 56, replace "has it" with -- has --.
Line 61, replace "lights" with -- lights, --.

Column 25,
Line 10, replace "(1.0)*" with -- (-1.0)* --.
Lines 44 and 47, replace "grey" with -- grey scale --.
Line 51, replace "occur" with -- occurs --.
Line 54, replace "image" with -- image, --.
Line 55, replace "are" with -- in --.
Line 61, replace "herinabove" with -- hereinabove --.

Column 26,
Line 14, replace "the number" with -- a number --.
Lines 20 and 21, replace "threshold" with -- thresholds --.
Line 25, replace "been" with -- beam --.
Line 27, replace "and various" with -- at various --.
Lines 39 and 58, replace "head lamps" with -- headlamps --.
Line 43, replace "Therefore" with -- Therefore, --.
Line 63, replace "1817" with -- 1817, --.
Line 65, replace "determine to" with -- determine the --.

Column 27,
Lines 14 and 16, replace "been" with -- beam --.
Line 18, replace "Fig. 17" with -- Fig. 19 --.
Line 21, replace "head lamp" with -- headlamp --.
Line 22, replace "nonlinear" with -- non-Linear --.

UNITED STATES PATENT AND TRADEMARK OFFICE
CERTIFICATE OF CORRECTION

PATENT NO.    : 6,611,610 B1
DATED         : August 26, 2003
INVENTOR(S)   : Joseph S. Stam et al.

It is certified that error appears in the above-identified patent and that said Letters Patent is hereby corrected as shown below:

Column 27 (cont'd),
Line 26, replace "head lamps" with -- headlamps --.
Line 33, replace "state move" with -- states move --.
Line 42, replace "cycle" with -- cycle, --.
Line 46, replace "bee" with -- have been --.
Line 46, replace "extremely bright light" with -- "Extremely Bright" lights --.
Line 53, replace "whether" with -- whether the --.

Column 28,
Line 1, replace "action" with -- action during the previous cycle --.
Line 13, replace "step 2007" with -- step 2007, --.
Lines 35 and 67, replace "head lamp" with -- headlamp --.
Line 61, replace "maybe" with -- may be --.
Line 63, replace "intensity," with -- intensity --.
Line 63, replace "head lamps" with -- headlamps --.

Column 29,
Line 17, replace "used" with -- used to --.
Line 29, replace "DRL's" with -- DRLs --.
Line 29, replace "head lamps" with -- headlamps --
Line 35, replace "patent application" with -- Patent Application --.
Line 42, replace "patent" with -- Patent --.
Line 43, replace "application Serial No. 09/093,993" with -- No. 6,130,421 --.
Lines 59 and 61, replace "on" with -- ON --.

Column 30,
Line 4, replace "medium" with -- median --.
Line 28, replace "increases" with -- increased --.
Line 33, replace "expressway" with -- the expressway --.
Lines 46 and 47, replace "cross median" with -- cross-median --.
Line 61, replace "Accordingly" with "Accordingly,"

Column 31,
Lines 10-11, replace "left side" with -- right side --.
Line 28, replace "system'" with -- system's --.

Column 32,
Line 6, replace "indicate" with -- indicates --.
Line 22, replace "2 to 3" to -- 2° to 3° --.
Line 26, replace "embodiment" with -- embodiment, --.

UNITED STATES PATENT AND TRADEMARK OFFICE
CERTIFICATE OF CORRECTION

PATENT NO. : 6,611,610 B1
DATED : August 26, 2003
INVENTOR(S) : Joseph S. Stam et al.

It is certified that error appears in the above-identified patent and that said Letters Patent is hereby corrected as shown below:

Column 32 (cont'd),
Line 37, replace "illuminate" with -- illuminates --.
Line 39, replace "I" with -- 1 --.
Line 51, replace "turning" with -- turning, --.

Column 33,
Lines 40, 43, 54 and 57, replace "taillights" with -- tail lights --.
Line 47, replace "review" with -- rearview --.
Lines 52 and 66, replace "taillight" with -- tail light --.
Line 66, replace "can not" with -- cannot --.

Column 34,
Line 11, replace "increases" with -- increases, --.
Lines 27, 29, 33, 58 and 60, replace "taillights" with -- tail lights --.
Line 47, replace "taillight" with -- tail light --.
Line 50, replace "shinning" with -- shining --.
Line 57, replace "frames" with -- frame's --.
Line 66, replace "sensor" with -- history --.

Column 35,
Line 10, replace "impact on" with -- impact --.

Column 36,
Line 9, replace "neumatic" with -- neumatic (TN) --.
Line 18, replace "TN." with -- TN --.
Line 24, replace "cel," with -- cell, --.
Line 51, replace "et al" with -- et al. --.

Column 37,
Line 24, replace "sequence" with -- sequence of --.
Line 28, replace "Pickey Fence" with -- PICKET FENCE --.
Line 40, replace "bright light" with -- high beams--.

Column 38,
Line 40, replace "Led" with -- LED --.
Line 55, replace "amount" with -- amounts --.
Line 65, replace "Roberts" with -- John K. Roberts --.

Column 39,
Line 1, replace "Fig. 26" with -- Figs. 26a and 26b --.
Line 26, replace "2601" with -- 2621 --.

UNITED STATES PATENT AND TRADEMARK OFFICE
CERTIFICATE OF CORRECTION

PATENT NO. : 6,611,610 B1
DATED : August 26, 2003
INVENTOR(S) : Joseph S. Stam et al.

It is certified that error appears in the above-identified patent and that said Letters Patent is hereby corrected as shown below:

Column 39 (cont'd),
Line 32, replace "or" with -- or a --.
Line 48, replace "wells" with -- cups --.
Line 52, replace "cup" with -- cups --.

Column 40,
Line 16, replace "inclusion" with -- inclusion of --.
Line 30, replace "beat" with -- heat --.
Line 36, replace "head light" with -- headlight --.
Line 38, replace "emitters the" with -- emitters placed in each of the --.
Line 43, "replace "that" with -- that the --.
Line 43, replace "four out of five" with -- four out of the five --.
Line 48, replace "comprises" with -- comprise a --.
Line 53, replace "electricallyl" with -- electrically --.
Line 55, replace "form" with -- from --.

Column 41,
Line 5, replace "heat: sink" with -- heat sink --.
Line 40, replace "form" with -- from --.

Column 42,
Line 30, replace "faces 2705" with -- faces --.
Line 31, replace "and 2707 at" with -- at --.
Line 31, replace "5 to 45" with -- 5° to 45° --.
Line 32, replace "15" with -- 15° --.
Line 34, replace "low a" with -- low and --.
Line 34, replace "headlamp" with -- headlamp 2800 --.
Line 35, replace "2701" with -- 2801 --.
Line 36, replace "2703 and 2705" with -- 2803 and 2805 --.
Lines 39-40, replace "faces 2805 and 2807 at" with -- faces at --.
Line 40, replace "1 to 2," with -- 1° to 2°, --.
Line 42, replace "1.5." with -- 1.5°. --.
Lines 42-43, replace "the Fig. 28" with -- Fig. 28 --.
Line 58, replace "Ser." with -- Ser. No. --.

Column 43,
Line 30, replace and center "Surface Mounted Filter for Sensor" with -- SURFACE MOUNTED FILTER FOR SENSOR --.
Lines 34-35, replace "photoresist" with -- photoresist 2877 -- (both occurrences).
Line 34, replace "wafer" with -- wafer 2972 --.

UNITED STATES PATENT AND TRADEMARK OFFICE
CERTIFICATE OF CORRECTION

PATENT NO. : 6,611,610 B1
DATED : August 26, 2003
INVENTOR(S) : Joseph S. Stam et al.

It is certified that error appears in the above-identified patent and that said Letters Patent is hereby corrected as shown below:

Column 43 (cont'd),
Line 36, replace "The photoresist" with -- Portions of the photoresist may be removed such that the remaining photresist --.
Line 41, replace "30c" with -- 29c --.
Line 42, replace "sensor" with -- sensor 2932 --.
Line 44, replace "will he" with -- will be --.
Line 45, replace "will he" with -- will --.

Column 44,
Line 19, replace "material" with -- material 3214 --.
Line 42, replace "Tables" with -- Table --.
Line 46, replace "affect" with -- effect --.
Line 60, replace "Additionally, and" with -- Additionally, an --.

Column 45,
Line 35, replace "Flushing" with -- Flushing, --.
Line 37, replace "patent" with -- Patent --.
Line 37, replace "application Serial No. 09/137,909," with -- No. 6,130,448, entitled --.
Line 45, replace "structure 3224" with -- structure --.
Line 50, replace "herein above" with -- hereinabove --.
Lines 51-52 replace "3220 and a UV curable adhesive 3222" with -- and a UV curable adhesive --.
Line 53, replace "member 3220" with -- member --.
Line 60, replace "101" with -- 100 --.
Line 61, replace "201" with -- 200 --.
Lines 63 and 67, replace "102" with -- 100 --.

Column 46,
Lines 8-9, replace "invention the term radar" with -- invention, the term "radar" --.
Line 27, replace "my" with -- may --.
Lines 47-48, replace "signals which when reflected" with -- signals, which, when reflected, --.
Lines 48 and 50, replace "detector" with -- receiver --.
Lines 52-53 and 56, replace "microcontroller" with -- controller --.
Line 67, replace "objects" with -- object's --.

Column 47,
Line 2, replace "radars" with -- radar --.
Lines 10, 15, 21, 22, 24, 25, 30 and 32, replace "control" with -- controlled --.
Line 23, replace "106" with -- 105 --.
Lines 28 and 33, replace "104" with -- 110 --.

UNITED STATES PATENT AND TRADEMARK OFFICE
CERTIFICATE OF CORRECTION

PATENT NO. : 6,611,610 B1
DATED : August 26, 2003
INVENTOR(S) : Joseph S. Stam et al.

It is certified that error appears in the above-identified patent and that said Letters Patent is hereby corrected as shown below:

Column 47 (cont'd),
Line 32, replace "106" with -- 105 --.
Line 36, replace "bright" with -- high beam --.
Line 44, replace "patent application serial" with -- Patent --.
Line 44, replace "09/157,063" with -- 6,049,171 --.
Line 49, replace "vehicles headlamp" with -- vehicle headlamps --.
Line 52, replace "or one" with -- of one --.

Column 48,
Line 2, replace "alternately be" with -- alternately --.
Line 2, replace "using a" with -- using an --.
Line 8, replace "the two" with -- two --.
Line 33, replace "it's" with -- its --.

Column 50,
Line 23, replace "pixels" with -- pixel --.
Line 35, replace "beadlamps" with -- headlamps --.
Line 55, replace "claim 18" with -- claim 19 --.
Line 58, replace "claim 19" with -- claim 20 --.

Column 51,
Line 8, replace "AC" with -- of AC --.

Column 53,
Lines 49 and 51, replace "claim 51" with -- claim 56 --.

Signed and Sealed this

Third Day of August, 2004

JON W. DUDAS
*Acting Director of the United States Patent and Trademark Office*